United States Patent
Angorn et al.

(10) Patent No.: US 10,600,139 B2
(45) Date of Patent: Mar. 24, 2020

(54) SYSTEMS, METHODS AND APPARATUS FOR CREATING, EDITING, DISTRIBUTING AND VIEWING ELECTRONIC GREETING CARDS

(75) Inventors: Matthew David Angorn, South Orange, NJ (US); Masanao Homma, Westlake, OH (US); Daniel Jonathan Reiss, Los Angeles, CA (US); Robert Matousek, Lakewood, OH (US)

(73) Assignee: AMERICAN GREETINGS CORPORATION, Cleveland, OH (US)

( * ) Notice: Subject to any disclaimer, the term of this patent is extended or adjusted under 35 U.S.C. 154(b) by 1951 days.

(21) Appl. No.: 13/460,045

(22) Filed: Apr. 30, 2012

(65) Prior Publication Data

US 2012/0276880 A1 Nov. 1, 2012

Related U.S. Application Data

(60) Provisional application No. 61/481,028, filed on Apr. 29, 2011, provisional application No. 61/486,050, filed on May 13, 2011.

(51) Int. Cl.
*G06F 17/00* (2019.01)
*G06Q 50/32* (2012.01)
(Continued)

(52) U.S. Cl.
CPC .......... *G06Q 50/32* (2013.01); *G06F 3/0482* (2013.01); *G06F 17/211* (2013.01);
(Continued)

(58) Field of Classification Search
CPC ...... G06Q 10/10; G06Q 10/107; G06Q 20/32; G06Q 50/32; G06Q 30/0601;
(Continued)

(56) References Cited

U.S. PATENT DOCUMENTS

| 5,550,746 A | 8/1996 | Jacobs |
| 5,726,898 A | 3/1998 | Jacobs |

(Continued)

FOREIGN PATENT DOCUMENTS

| WO | WO2001016650 A2 | 3/2001 |
| WO | WO2001016651 A1 | 3/2001 |

(Continued)

OTHER PUBLICATIONS

Screen captures from WayBack machine (www.archive.org) of americangreetings.com web site showing various claimed features, archived Feb. 24, 2009, 9 pages numbered 1 through 9 of 9.*

(Continued)

*Primary Examiner* — Cesar B Paula
*Assistant Examiner* — James H. Blackwell
(74) *Attorney, Agent, or Firm* — Calfee, Halter & Griswold LLP; John Cipolla; Joshua Friedman

(57) ABSTRACT

A system is provided for downloading an electronic greeting card application to a portable computing device. The system comprising a server, a paper greeting card, and a code printed on the paper greeting card. The electronic greeting card application is downloaded to the portable computing device from the server in response to the portable computing device scanning the code on the paper greeting card. Further herein, a system is provided where a category of greeting cards are contained within the electronic greeting card application, and at least a greeting card within the category of greeting cards. The greeting card comprises a plurality pages, with at least one of the a plurality pages having an option to customize, and each of the a plurality pages being movable by a touch of a finger. The customized greeting card may be previewed and may be sent via various sending mechanisms.

30 Claims, 49 Drawing Sheets

(51) Int. Cl.
*H04W 4/12* (2009.01)
*H04W 4/50* (2018.01)
*G06F 17/21* (2006.01)
*G06Q 30/06* (2012.01)
*G06F 17/24* (2006.01)
*G06F 3/0482* (2013.01)

(52) U.S. Cl.
CPC ............ *G06F 17/212* (2013.01); *G06F 17/24* (2013.01); *G06F 17/248* (2013.01); *G06Q 30/0601* (2013.01); *G06Q 30/0621* (2013.01); *G06Q 30/0641* (2013.01); *H04W 4/12* (2013.01); *H04W 4/50* (2018.02)

(58) Field of Classification Search
CPC ............ G06Q 30/0641; G06Q 30/0621; G06F 17/248; G06F 17/212; G06F 17/3089; G06F 17/211; G06F 17/24; G06F 17/30879; G06F 3/0482; H04W 4/12; H04W 4/50; H04N 1/00196
USPC ....... 715/201, 202, 234, 243, 274, 738, 744, 715/751, 760, 838, 843–844; 709/203, 709/206, 217, 246, 248; 705/26.1, 26.5, 705/26.7, 26.8, 27.1, 27.2
See application file for complete search history.

(56) References Cited

U.S. PATENT DOCUMENTS

| | | | |
|---|---|---|---|
| 5,768,142 A | 6/1998 | Jacobs | |
| 5,933,829 A | 8/1999 | Durst et al. | |
| 5,978,773 A | 11/1999 | Hudetz et al. | |
| 5,993,048 A * | 11/1999 | Banks et al. | 700/233 |
| 6,012,102 A | 1/2000 | Shachar | |
| 6,101,509 A | 8/2000 | Hanson et al. | |
| 6,199,048 B1 | 3/2001 | Hudetz et al. | |
| 6,209,005 B1 | 3/2001 | Harker et al. | |
| 6,311,214 B1 | 10/2001 | Rhoads | |
| 6,453,300 B2 | 9/2002 | Simpson | |
| 6,542,927 B2 | 4/2003 | Rhoads | |
| 6,583,799 B1 | 6/2003 | Manolis et al. | |
| 6,583,852 B2 | 6/2003 | Baum et al. | |
| 6,587,596 B1 | 7/2003 | Haeberli | |
| 6,550,761 B1 | 11/2003 | Rodriguez et al. | |
| 6,646,754 B1 | 11/2003 | Redd et al. | |
| 6,657,702 B1 | 12/2003 | Chui et al. | |
| 6,704,712 B1 | 3/2004 | Bleiweiss | |
| 6,721,871 B2 * | 4/2004 | Piispanen et al. | 712/1 |
| 6,795,711 B1 | 9/2004 | Sivula | |
| 6,839,803 B1 | 1/2005 | Loh et al. | |
| 6,886,750 B2 | 5/2005 | Rathus et al. | |
| 6,941,276 B2 | 9/2005 | Haeberli | |
| 6,943,866 B2 | 9/2005 | Redd et al. | |
| 6,947,571 B1 | 9/2005 | Rhoads et al. | |
| 6,965,912 B2 * | 11/2005 | Friedman et al. | 709/203 |
| 6,973,222 B2 | 12/2005 | Haeberli | |
| 6,980,318 B1 | 12/2005 | Silverbrook et al. | |
| 6,993,573 B2 | 1/2006 | Hunter | |
| 7,016,059 B1 | 3/2006 | Baum et al. | |
| 7,016,869 B1 | 3/2006 | Haeberli | |
| 7,024,807 B2 | 4/2006 | Street | |
| 7,082,227 B1 | 7/2006 | Baum et al. | |
| 7,120,274 B2 | 10/2006 | Kacker et al. | |
| 7,146,575 B2 | 12/2006 | Manolis et al. | |
| 7,164,413 B2 | 1/2007 | Davis et al. | |
| 7,174,031 B2 | 2/2007 | Rhoads et al. | |
| 7,190,370 B1 | 3/2007 | Haeberli et al. | |
| 7,230,628 B1 | 6/2007 | Haeberli | |
| 7,236,258 B2 | 6/2007 | Wen et al. | |
| 7,242,993 B2 | 7/2007 | Wen et al. | |
| 7,243,079 B1 | 7/2007 | Manolis et al. | |
| 7,269,800 B2 | 9/2007 | Manolis et al. | |
| 7,275,041 B1 | 9/2007 | Cue et al. | |
| 7,292,681 B2 | 11/2007 | Pines | |
| 7,296,747 B2 | 11/2007 | Rohs | |
| 7,309,015 B2 | 12/2007 | Frantz et al. | |
| 7,317,960 B2 | 1/2008 | Wen et al. | |
| 7,328,173 B2 | 2/2008 | Taratino et al. | |
| 7,366,322 B2 | 4/2008 | Kacker et al. | |
| 7,377,421 B2 | 5/2008 | Rhoads | |
| 7,391,528 B2 | 6/2008 | Kacker et al. | |
| 7,395,229 B2 | 7/2008 | Haeberli | |
| 7,427,018 B2 | 9/2008 | Berkun | |
| 7,437,024 B2 | 10/2008 | Baum et al. | |
| 7,446,893 B2 | 11/2008 | Silverbrook et al. | |
| 7,467,222 B2 | 12/2008 | Kacker | |
| 7,474,801 B2 | 1/2009 | Teo et al. | |
| 7,490,720 B2 | 2/2009 | Cole et al. | |
| 7,492,922 B2 | 2/2009 | Kacker et al. | |
| 7,512,859 B2 | 3/2009 | Flynn et al. | |
| 7,561,299 B2 | 7/2009 | Elarde et al. | |
| 7,574,496 B2 | 8/2009 | McCrory et al. | |
| 7,575,172 B2 | 8/2009 | Silverbrook et al. | |
| 7,576,752 B1 | 8/2009 | Benson et al. | |
| 7,599,854 B1 | 10/2009 | Baum et al. | |
| 7,607,084 B2 * | 10/2009 | Malone | G06Q 30/02 715/255 |
| 7,614,837 B2 | 11/2009 | Anderson et al. | |
| 7,617,276 B2 | 11/2009 | Bui | |
| 7,628,320 B2 | 12/2009 | Rhoads | |
| 7,643,706 B2 | 1/2010 | Wagner et al. | |
| 7,702,542 B2 | 4/2010 | Aslanian, Jr. | |
| 7,725,825 B2 | 5/2010 | Erol et al. | |
| 7,751,069 B2 | 7/2010 | Wen et al. | |
| 7,760,905 B2 | 7/2010 | Rhoads et al. | |
| 7,774,705 B2 | 8/2010 | Erol et al. | |
| 7,775,428 B2 | 8/2010 | Berkun | |
| 7,779,352 B1 * | 8/2010 | Underwood et al. | 715/250 |
| 7,797,242 B2 | 9/2010 | Gautier et al. | |
| 7,802,386 B2 | 9/2010 | Mandelbaum et al. | |
| 7,827,162 B2 | 11/2010 | Suitts et al. | |
| 7,830,399 B2 | 11/2010 | Benson et al. | |
| 7,837,094 B2 | 11/2010 | Rhoads | |
| 7,848,954 B2 | 12/2010 | Posokhow et al. | |
| 7,848,955 B2 | 12/2010 | Leffert et al. | |
| 7,860,798 B2 | 12/2010 | Rubinstein | |
| D632,330 S | 2/2011 | Qiao et al. | |
| D632,734 S | 2/2011 | Qiao et al. | |
| 7,890,876 B1 | 2/2011 | Mandelbaum et al. | |
| 7,890,957 B2 | 2/2011 | Campbell | |
| 7,895,661 B2 | 2/2011 | Dowdy et al. | |
| 7,911,627 B2 | 3/2011 | Niblett et al. | |
| 7,929,959 B2 | 4/2011 | DeAtley et al. | |
| 7,956,847 B2 | 6/2011 | Christie | |
| 7,959,065 B2 | 6/2011 | Rosenblatt et al. | |
| 7,962,634 B2 | 6/2011 | Cortos et al. | |
| 7,974,486 B2 | 7/2011 | Seely | |
| 7,996,427 B1 | 8/2011 | Flick et al. | |
| 8,001,011 B2 | 8/2011 | Hayashi et al. | |
| 8,004,529 B2 | 8/2011 | Wood et al. | |
| 8,024,233 B2 | 9/2011 | Berger et al. | |
| 8,151,197 B1 | 4/2012 | Sulak et al. | |
| 8,176,663 B2 | 5/2012 | Sapp et al. | |
| 8,196,038 B2 | 6/2012 | Berger et al. | |
| 8,230,624 B2 | 7/2012 | Sapp et al. | |
| 8,234,181 B2 | 7/2012 | Berger et al. | |
| 8,239,290 B2 | 8/2012 | Berger et al. | |
| 8,255,290 B2 | 8/2012 | Berger et al. | |
| 8,256,150 B2 | 9/2012 | Qiao et al. | |
| 8,272,154 B2 | 9/2012 | Sapp et al. | |
| 8,479,154 B1 * | 7/2013 | Friedman | 717/106 |
| 8,489,504 B1 * | 7/2013 | Gupta | 705/39 |
| 2001/0005834 A1 | 6/2001 | Simpson | |
| 2001/0019171 A1 | 9/2001 | Takamura | |
| 2002/0087628 A1 * | 7/2002 | Rouse | H04L 51/38 709/203 |
| 2003/0004997 A1 * | 1/2003 | Parker et al. | 707/513 |
| 2004/0101156 A1 | 5/2004 | Kacker | |
| 2004/0109147 A1 | 6/2004 | Redd et al. | |
| 2004/0133629 A1 * | 7/2004 | Reynolds | G06F 17/30902 709/202 |
| 2004/0139318 A1 | 7/2004 | Fiala et al. | |

(56) References Cited

U.S. PATENT DOCUMENTS

| | | |
|---|---|---|
| 2004/0216108 A1 | 10/2004 | Robbin |
| 2004/0254883 A1 | 12/2004 | Kondrk et al. |
| 2005/0021478 A1 | 1/2005 | Gautier et al. |
| 2005/0036155 A1 | 2/2005 | Reilly |
| 2005/0038872 A1* | 2/2005 | Ono .................. G06K 7/10722 709/218 |
| 2005/0050345 A1 | 3/2005 | Dowdy et al. |
| 2005/0114784 A1* | 5/2005 | Spring et al. ................ 715/762 |
| 2005/0160014 A1 | 7/2005 | Moss et al. |
| 2005/0165726 A1 | 7/2005 | Kawell, Jr. et al. |
| 2005/0203959 A1 | 9/2005 | Muller et al. |
| 2006/0015359 A1 | 1/2006 | Merritt |
| 2006/0067593 A1 | 3/2006 | Erol et al. |
| 2006/0075026 A1* | 4/2006 | Ryu .................. G06F 17/30879 709/206 |
| 2006/0075033 A1* | 4/2006 | Bienstock ............ G06Q 10/107 709/206 |
| 2006/0187317 A1 | 8/2006 | Montulli et al. |
| 2006/0187833 A1 | 8/2006 | Montulli et al. |
| 2006/0189348 A1 | 8/2006 | Montulli et al. |
| 2006/0189349 A1 | 8/2006 | Montulli et al. |
| 2006/0190824 A1 | 8/2006 | Montulli et al. |
| 2006/0224461 A1 | 10/2006 | Montulli et al. |
| 2007/0005795 A1 | 1/2007 | Gonzalex |
| 2007/0063031 A1 | 3/2007 | Silverbrook et al. |
| 2007/0076254 A1 | 4/2007 | Reilly |
| 2007/0083471 A1 | 4/2007 | Robbin et al. |
| 2007/0124376 A1* | 5/2007 | Greenwell ............ G06Q 10/107 709/204 |
| 2007/0153910 A1 | 7/2007 | Levett |
| 2007/0226305 A1 | 9/2007 | Bui |
| 2007/0247666 A1 | 10/2007 | Tsitoukis |
| 2007/0266028 A1 | 11/2007 | Muller et al. |
| 2007/0266047 A1 | 11/2007 | Curtis et al. |
| 2008/0004988 A1 | 1/2008 | Cue et al. |
| 2008/0019569 A1 | 1/2008 | Rhoads et al. |
| 2008/0040379 A1 | 2/2008 | Suitts et al. |
| 2008/0066080 A1 | 3/2008 | Campbell |
| 2008/0068665 A1 | 3/2008 | Niblett et al. |
| 2008/0093460 A1 | 4/2008 | Frantz et al. |
| 2008/0215985 A1* | 9/2008 | Batchelder et al. .......... 715/731 |
| 2008/0249657 A1 | 10/2008 | Wendland et al. |
| 2008/0249882 A1 | 10/2008 | Spolar |
| 2008/0270219 A1 | 10/2008 | Antinori |
| 2008/0288352 A1 | 11/2008 | Fogel |
| 2009/0008440 A1 | 1/2009 | Kosloff et al. |
| 2009/0015869 A1 | 1/2009 | Quek et al. |
| 2009/0070213 A1* | 3/2009 | Miller .................. G06Q 30/02 705/14.17 |
| 2009/0091792 A1 | 4/2009 | Silverbrook et al. |
| 2009/0165343 A1 | 7/2009 | Miller et al. |
| 2009/0247195 A1 | 10/2009 | Palmer et al. |
| 2009/0258678 A1 | 10/2009 | Chava et al. |
| 2009/0260004 A1 | 10/2009 | Datta et al. |
| 2009/0286572 A1 | 11/2009 | Rhoads et al. |
| 2009/0325640 A1 | 12/2009 | Chava et al. |
| 2010/0011632 A1 | 1/2010 | Shields et al. |
| 2010/0012714 A1 | 1/2010 | Weesner |
| 2010/0023341 A1 | 1/2010 | Ledbetter et al. |
| 2010/0037131 A1 | 4/2010 | Berger et al. |
| 2010/0082444 A1 | 4/2010 | Lin et al. |
| 2010/0082485 A1 | 4/2010 | Lin et al. |
| 2010/0082624 A1 | 4/2010 | Martin et al. |
| 2010/0124939 A1 | 5/2010 | Osborne et al. |
| 2010/0175018 A1* | 7/2010 | Petschnigg ........... G06F 3/0483 715/776 |
| 2010/0175287 A1 | 7/2010 | Gupta et al. |
| 2010/0250255 A1 | 9/2010 | Stern |
| 2010/0269036 A1 | 10/2010 | Berger et al. |
| 2010/0299192 A1 | 11/2010 | Aslanian, Jr. |
| 2011/0015980 A1 | 1/2011 | Li |
| 2011/0062229 A1 | 3/2011 | Rhoads |
| 2011/0107048 A1 | 5/2011 | Shackelford |
| 2011/0141493 A1 | 6/2011 | Berger et al. |
| 2011/0145097 A1 | 6/2011 | Berger et al. |
| 2011/0145098 A1 | 6/2011 | Berger et al. |
| 2011/0145099 A1 | 6/2011 | Berger et al. |
| 2011/0145100 A1 | 6/2011 | Berger et al. |
| 2011/0145101 A1 | 6/2011 | Berger et al. |
| 2011/0145342 A1 | 6/2011 | Berger et al. |
| 2011/0153388 A1 | 6/2011 | Vuong et al. |
| 2011/0153399 A1 | 6/2011 | Berger et al. |
| 2011/0178896 A1 | 7/2011 | Nakajima et al. |
| 2011/0234613 A1 | 9/2011 | Hanson et al. |
| 2011/0283173 A1 | 11/2011 | Babcock et al. |
| 2011/0300809 A1* | 12/2011 | Gordiyenko et al. ..... 455/67.12 |
| 2011/0320560 A1* | 12/2011 | Bennett .............. G06Q 30/0261 709/217 |
| 2012/0008161 A1* | 1/2012 | Rouhana ..................... 358/1.15 |

FOREIGN PATENT DOCUMENTS

| | | |
|---|---|---|
| WO | WO2001016652 A1 | 3/2001 |
| WO | WO2001016693 A2 | 3/2001 |
| WO | WO2001017227 A1 | 3/2001 |
| WO | WO2001060051 A1 | 8/2001 |
| WO | WO200203630 A1 | 1/2002 |
| WO | 2004061814 A1 | 7/2004 |
| WO | WO2008036438 A1 | 3/2008 |
| WO | WO2010017525 A1 | 2/2010 |
| WO | WO2011005362 A1 | 1/2011 |
| WO | WO2011100246 A1 | 8/2011 |

OTHER PUBLICATIONS

Chu et al., "Realistic Books: A Bizarre Homage to an Obsolete Medium?," in JCDL'04, Jun. 7-11, 2004, Tucson, Arizona, USA. Copyright 2004 ACM, pp. 78-86.*
Card et al., "3Book: A Scalable 3D Virtual Book," in CHI 2004, Apr. 24-29, 2004, Vienna, Austria, ACM, pp. 1095-1098.*
www.thecardchest.com, series of screen captures illustrating aspects of an online greeting card service, web pages list a copyright of 2009, 10 pages.*
Unknown, web page advertisement for MegaZine_3 application (a Flash-based pageflip engine), archived Sep. 9, 2009, 3 pages.*
FlipBuilder.com, web site advertising Flip PDF Professional, converts PDF documents to include a page flipping feature, archived May 22, 2011, 3 pages.*
www.epaperflip.com, web site advertising ePaperFlip program to include a page flipping and other features, archived Mar. 25, 2010, 3 pages.*
Sothink, "SWF Quicker V2.6 Download page," archived Mar. 23, 2009 by WayBack Machine <"https://web.archive.org/web/20090323035919/http://www.sothink.com/products/swfquicker/download.htm">, 2 pages.*
Sothink,"How to Make a page Flip Effect Turorial," archived May 11, 2009 by WayBack Machine <"https://www.archive.org/web/20090511133252/http://www.sothink.com/turorials/page-flip-effect.html">, 5 pages.*
Lindler, Brad, "How to Scan QR Codes to Download Android Apps," © Apr. 1, 2010, Mobiputing.com, 6 pages.*
Examination Report dated Jun. 10, 2014 for corresponding New Zealand Patent Application No. 617063.
International Search Report and Written Opinion from PCT/US2012/035788 dated Sep. 27, 2012.
European search report dated Dec. 8, 2014 for Application No. EP127780.6.
Examination Report dated Mar. 20, 2017 for corresponding Australian Patent Application No. 2012249266.

* cited by examiner

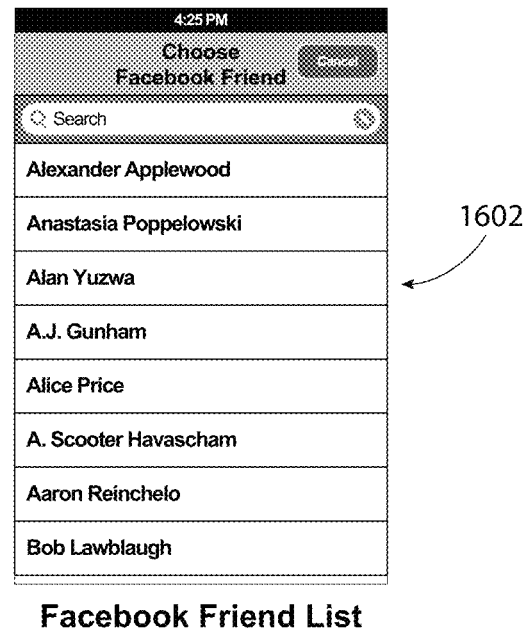
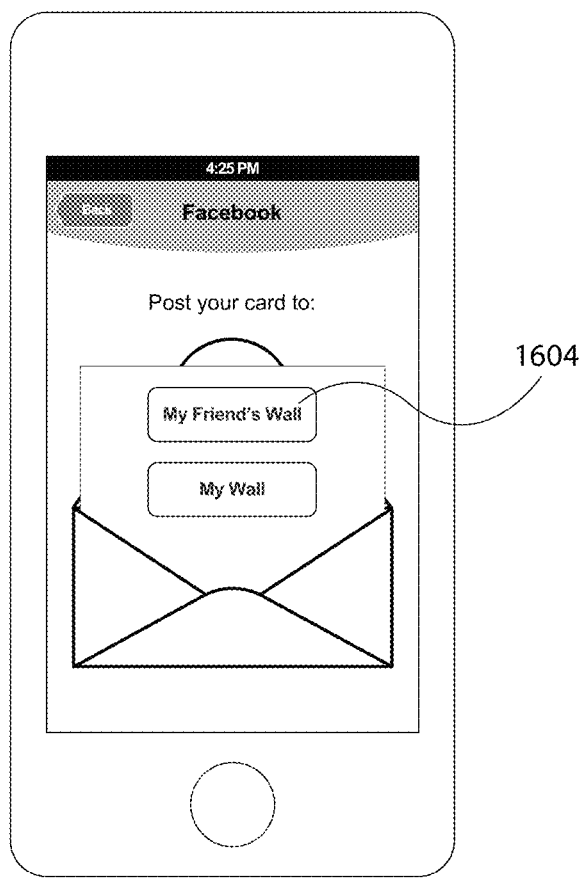
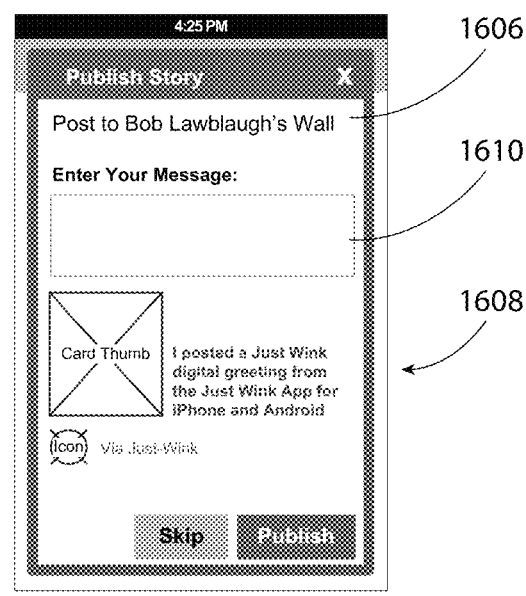
Facebook Friend List — 1602
Facebook Post Selection — 1604
Facebook Wall Message — 1606, 1610, 1608
FIG. 16

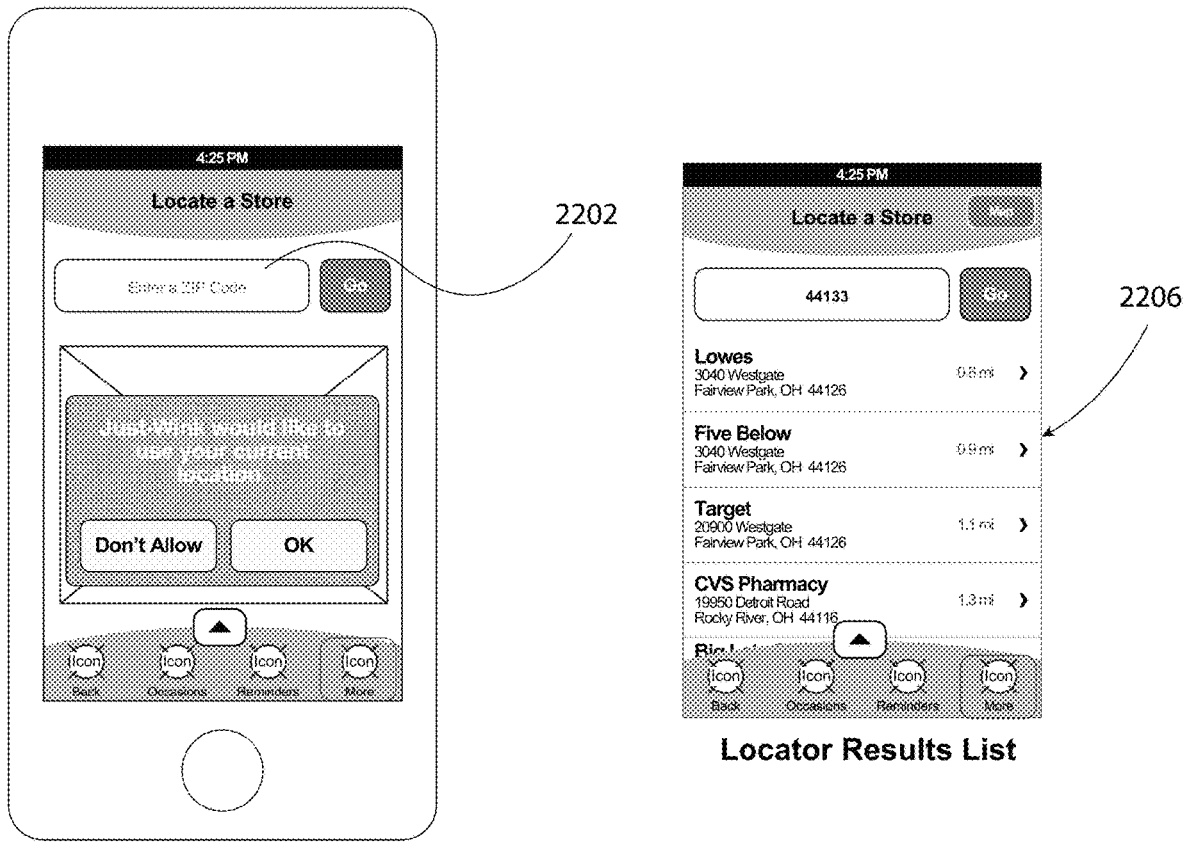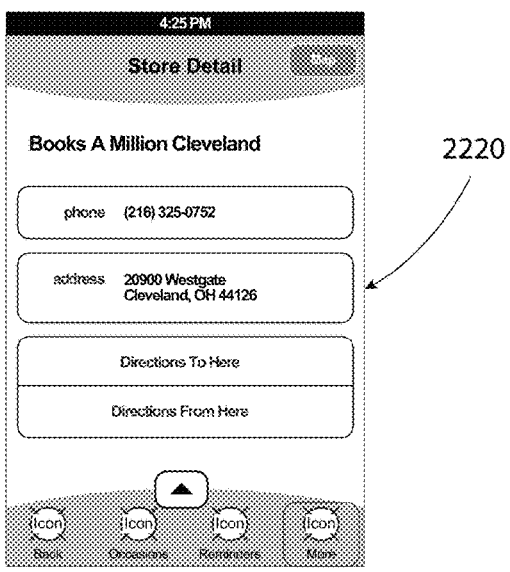
FIG. 22

Account Creation

Sign In

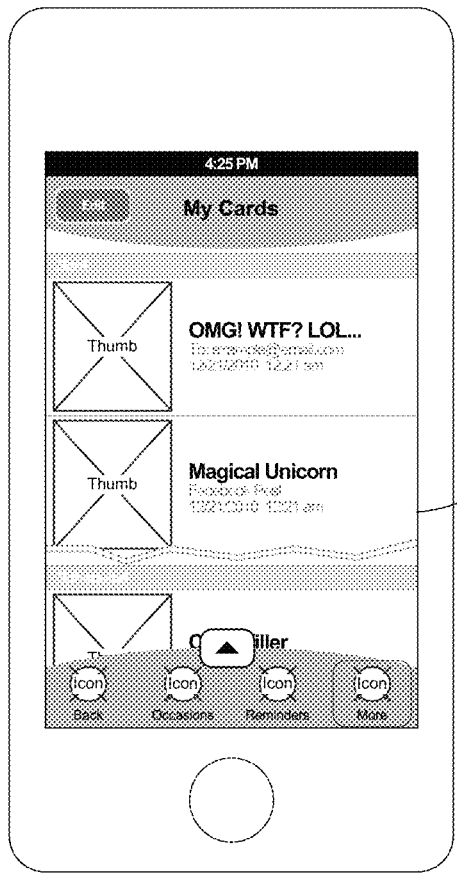
My Cards Main
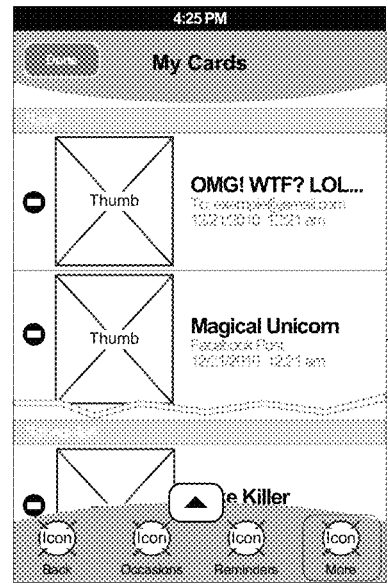
My Cards
(Edit Mode)
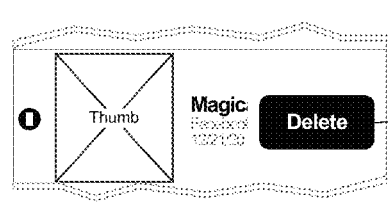
My Cards
(Canceling Future Send)
FIG. 28

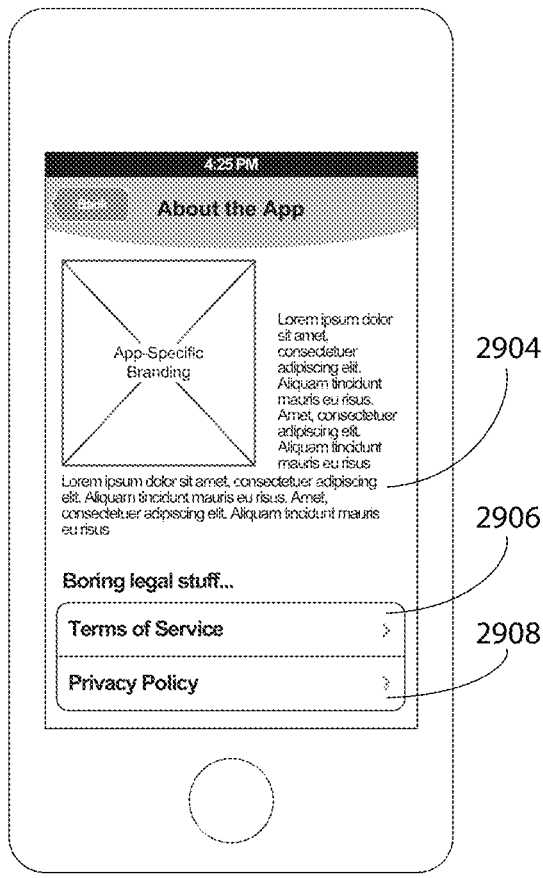
FIG. 29A About
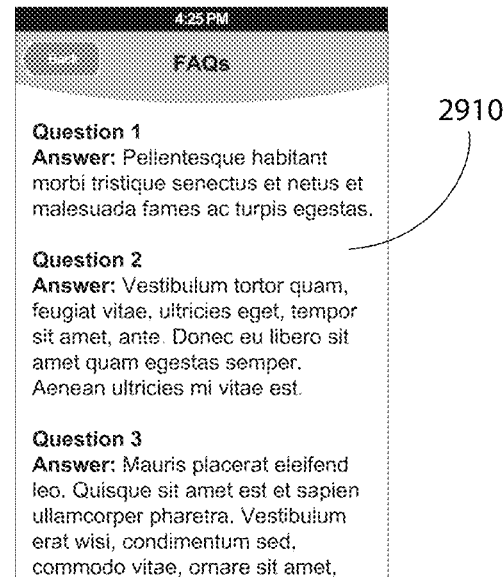
FIG. 29B FAQs
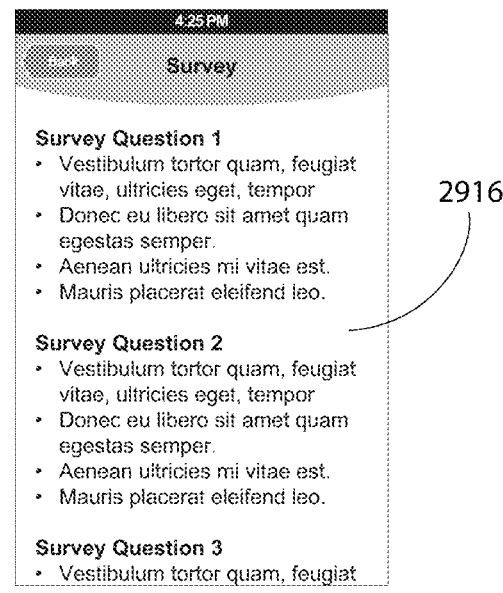
FIG. 29C Survey

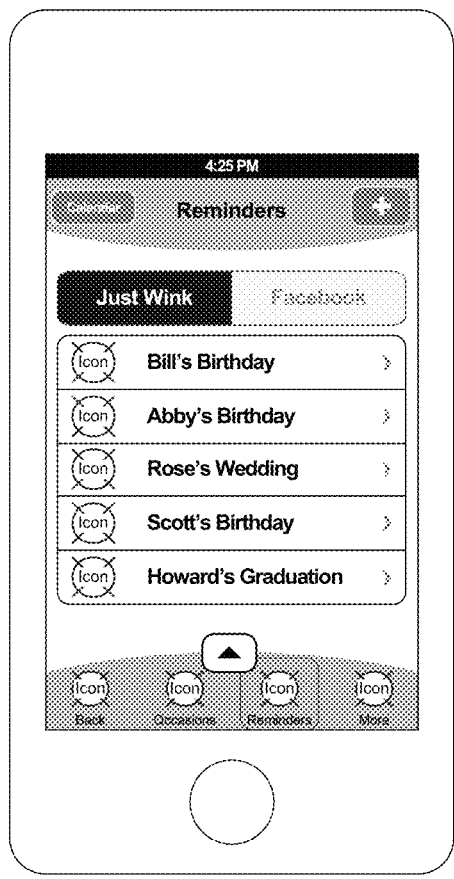
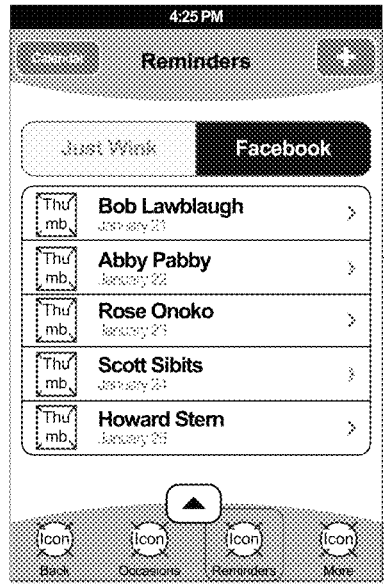
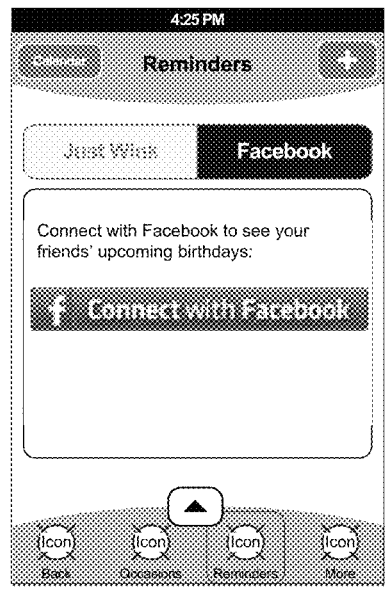
Reminders Dashboard
Facebook Reminders
(Logged In)
Facebook Reminders
(Not Logged In)
FIG. 31

SYSTEMS, METHODS AND APPARATUS FOR CREATING, EDITING, DISTRIBUTING AND VIEWING ELECTRONIC GREETING CARDS

RELATED APPLICATIONS

This application claims the benefit of and priority to U.S. Provisional Application No. 61/481,028, entitled "ELECTRONIC GREETING SERVICE," which was filed on Apr. 29, 2011 and U.S. Provisional Application No. 61/486,050, entitled "ELECTRONIC GREETING SERVICE," which was filed on May 13, 2011. The entire disclosures of these two applications (U.S. Provisional Application Nos. 61/481,028 and 61/486,050) are incorporated herein by reference.

FIELD OF THE INVENTION

The general inventive concepts relate to electronic greeting service and, more particularly, to systems, methods, and apparatuses for creating, displaying, editing, distributing and viewing of high-resolution electronic greeting cards or "ecards".

BACKGROUND

Portable computing devices have become widely adopted in the technology-driven modern world. "Smart" phones (e.g., Apple's iPhone®, Google's Droid®, Research in Motion's Blackberry®) and "Tablet Computers" (e.g. Apple's iPad®) are two types of portable computing devices. While portable computing devices combine the functionality of Personal Digital Assistants ("PDAs") with the functionality of cellular or mobile phones, Tablet Computers bring most features of personal computing to a portable platform. Along with the advent and the widespread acceptance of the portable computing devices, came the need for applications ("apps") which operate on said devices and perform specific functions as desired by a consumer ("user"). One such app is an app to send and receive electronic greetings.

Currently, users may use electronic mail ("email") to send and receive electronic greetings on their portable computing devices. However, there is a need for an app which is deployed on the device's native operating system and which allows the user to send and receive an electronic version of a high definition greeting card.

In view of the above, there is an unmet need for systems, methods and apparatuses for creating, editing and distributing electronic greeting cards through an app which runs natively on the portable computing device's operating system and which allows the user to communicate with other users and non-users in multiple ways.

BRIEF SUMMARY

The general inventive concepts contemplate systems, methods, and apparatuses for creating, displaying, editing, distributing and viewing of high-resolution electronic greeting cards for present day and future portable computing devices. By way of example, to illustrate various aspects of the general inventive concepts, several exemplary embodiments of systems methods and/or apparatuses are disclosed herein.

Systems, methods, and apparatuses, according to one exemplary embodiment, allow downloading an electronic greeting card application to a portable computing device. The downloading system comprises a server, a paper greeting card, and a code printed on the paper greeting card. The electronic greeting card application is downloaded to the portable computing device from the server in response to the portable computing device scanning the code on the paper greeting card. The electronic greeting card application can also be downloaded to the portable computing device directly from the server through an online, internet, consumer decision or transaction to download the app from an app store without purchasing or scanning a paper greeting card.

Systems, methods, and apparatuses, according to one exemplary embodiment, provide a category of greeting cards in the electronic greeting card application. As contained within the electronic greeting card application, the category of greeting cards has at least one greeting card. The greeting card comprises a plurality of pages, with at least one of the plurality of pages having an option to customize, and each of the plurality of pages being movable by a touch of a finger. The customized greeting card can be previewed and has an area for selecting a medium to be used to send the greeting card.

Systems, methods, and apparatuses, according to one exemplary embodiment, provides for delivering electronic greeting cards to an electronic greeting card application. The delivery of electronic greeting cards is achieved via inputs to a content merchandising system, which accepts new greeting card categories and new greeting cards. A web server is updated with the new greeting card categories and new greeting cards inputted into the content merchandising system. A portable computing device through operation of the app compares the new greeting card categories and the new greeting cards with application greeting card categories. The portable computing device through operation of the downloaded app retrieves changes to the application greeting card categories and application greeting cards and stores them in a local cache, and updates the portable computing device with information stored in the local cache.

Additional features and advantages will be set forth in part in the description that follows, and in part will be obvious from the description, or may be learned by practice of the embodiments disclosed herein. The objects and advantages of the embodiments disclosed herein will be realized and attained by means of the elements and combinations particularly pointed out in the appended claims. It is to be understood that both the foregoing brief summary and the following detailed description are exemplary and explanatory only and are not restrictive of the embodiments disclosed herein or as claimed. The claims have their full ordinary meanings and the descriptions of the embodiments herein are not intended to limit them in any way.

BRIEF DESCRIPTION OF THE DRAWINGS

The accompanying drawings, which are incorporated in and constitute a part of this specification, illustrate some embodiments disclosed herein, and together with the description, serve to explain principles of the embodiments disclosed herein.

FIGS. 6 through 33 show several exemplary embodiments of the various screens in accordance with the embodiments of the present disclosure.

DETAILED DESCRIPTION

Figure 1:
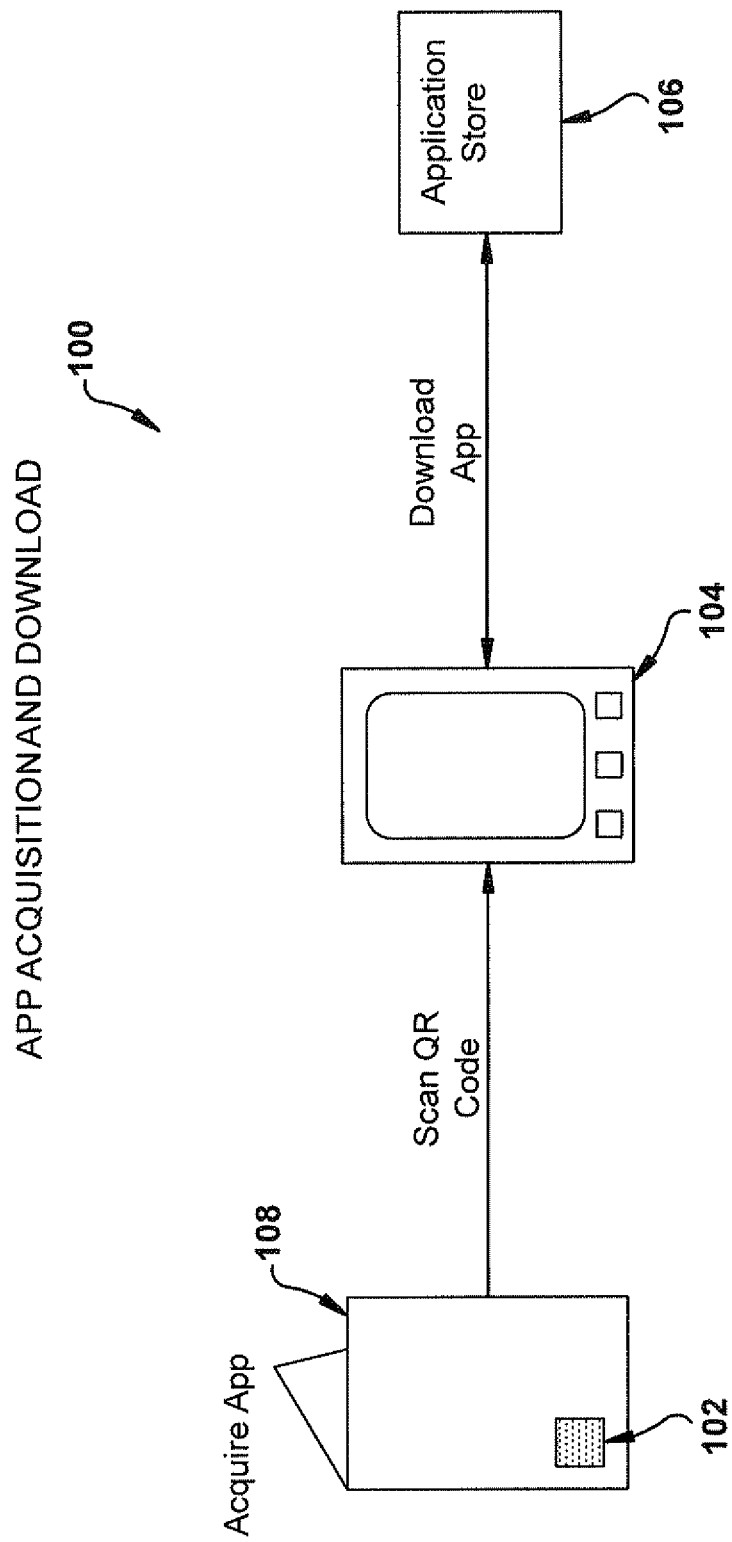
FIG. 1 shows a diagram of an exemplary system environment for electronically merchandising and delivering electronic greeting cards over the internet, in accordance with the embodiments of the present disclosure.

The embodiments disclosed herein will now be described by reference to some more detailed embodiments, with occasional reference to the accompanying drawings. These embodiments may, however, be embodied in different form and should not be construed as limited to the embodiments set forth herein. Rather, these embodiments are provided so that this disclosure will be thorough and complete, and will fully convey the scope of the embodiments to those skilled in the art.

Unless otherwise defined, all technical and scientific terms used herein have the same meaning as commonly understood by one of ordinary skill in the art to which these embodiments belong. The terminology used in the description herein is for describing particular embodiments only and is not intended to be limiting of the embodiments. As used in the specification and the appended claims, the singular forms "a," "an," and "the" are intended to include the plural forms as well, unless the context clearly indicates otherwise. All publications, patent applications, patents, and other references mentioned herein are incorporated by reference in their entirety.

The following are definitions of exemplary terms used throughout the disclosure. Both singular and plural forms of all terms fall within each meaning:

"Software" or "computer program" as used herein includes, but is not limited to, one or more computer or machine readable and/or executable instructions that cause a computer, microprocessor, logic circuit, or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, an app, a function call, a servlet, an applet, instructions stored in a memory or any other computer readable medium, part of an operating system or other type of executable instructions. It will be appreciated by one of ordinary skill in the art that the form of software is dependent on, for example, requirements of a desired application, the environment it runs on, and/or the desires of a designer/programmer or the like.

"Mobile Application" or "Mobile App" or "App" as used herein, includes, but is not limited to, applications that run on smart phones, tablet computers, and other mobile devices. The terms "Mobile Application" or "Mobile App" or "App" can be used synonymously with "software". Mobile applications allow users to connect to services which are traditionally available on the desktop or notebook platforms. Typically, these services access the internet or intranet or cellular or wireless fidelity (Wi-Fi) networks, to access, retrieve, transmit and share data.

"Computer" or "processing unit" as used herein includes, but is not limited to, any programmed or programmable electronic device, microprocessor, logic circuit, that can store, retrieve, and process data.

A "Network" as used herein, includes, but is not limited to, a collection of hardware components and computers or machines interconnected by communication channels that allow sharing of resources and information, including without limitation, the worldwide web or internet.

A "Web browser" as used herein, includes, but is not limited to, a software for retrieving and presenting information resources on the World Wide Web. An information resource may be a web page, an image, a video, or any other type of electronic content.

A "Server" as used herein, includes, but is not limited to, a computer or a machine or a device on a network that manages network resources. The general term "Server" may include specific types of servers, such as a File Server (a computer and storage device dedicated to storing files), Print Server (a computer that manages one or more printers), a Network Server (a computer that manages network traffic), and a Database Server (a computer system that processes database queries). Although servers are frequently dedicated to performing only server tasks, certain multiprocessing operating systems allow a server to manage other non-server related resources.

A "Web Server" as used herein, includes, but is not limited to, a server which serves content to a Web browser by loading a file from a disk and serving it across a network to a user's Web browser, typically using a hyper text transfer protocol (HTTP).

"E-greeting" or "Electronic Greeting Card" or "E-greeting card" or "ecard" as used herein, includes, but is not limited to, any greeting card, or a personalized message, or a message which delivers a piece of communication from one user to another user or non-user through electronic media.

"SVG" or "SVG File" or "Scalable Vector Graphics" or "Scalable Vector Graphics File" as used herein, includes, but not limited to, a vector graphics file format which enables the display of certain multi-dimensional images in XML pages on the web.

"XML" or "Extensible Markup Language" as used herein, includes, but not limited to, a set of rules for encoding documents in a machine-readable form.

"Call" or "System Call" or "Pull" or "Pulled" as used herein, includes, but not limited to, a mechanism by which a program makes a request for a service from either an operating system or an application program or software.

"API Files" or "API" or "Application Programming Interface" as used herein, includes, but not limited to, an interface between different software programs or software files, which facilitates the interaction of the different software programs or software files by way of a specific set of rules and specifications.

"XINCLUDE" as used herein, includes, but not limited to, a mechanism whereby multiple XML documents are merged. The merger is accomplished by incorporating inclusion tags in the source XML document which prompts the source XML document to include other documents or parts of other XML documents resulting in a single XML Information Set.

"Source Code" or "Product Code" as used herein, includes, but not limited to, a textual software code, or a machine code, or notations in graphical software languages, which specify actions to be performed by a machine, which includes, but not limited to, a computer.

"Product" as used herein, includes, but not limited to, a single Electronic Greeting Card or a collection of Electronic Greeting Cards. "Product" as used herein, includes, but is not limited to, either the service, or the code, or the user interface or the screen interactions relating to the electronic greeting cards.

Downloading the Ecard App

Now, with particular reference to the drawings, exemplary embodiments of the invention are described below. FIG. 1 depicts a flow diagram of an exemplary environment 100 for electronically acquiring and downloading an electronic greeting service mobile application (the "ecard app"). In one embodiment, environment 100 may include a portable computing device 104, an application store 106, and a Code 102 on a paper greeting card 108. The application store 106 is marked to generally represent any mobile application store, but it is to be understood that the actual identity of the application store 106, such as an App Store® or Android Marketplace®, is dependent on the operating system downloading the ecard app.

Code 102 is generally disposed on paper greeting cards, but may be disposed on any physical medium or article without deviating from the spirit of this invention. For example, Code 102 may be disposed on store signage and on advertising materials. Code 102 may be a bar code or a Quick Response (QR) code or any other type of code which functions to resolve a Uniform Resource Locator (URL) address upon scanning. A URL is a reference to an internet resource or address, such as an application store or a website. In one embodiment, Code 102 may be rendered based on the operating system which seeks to resolve the address upon scanning. Specifically, Code 102 may be rendered differently for different mobile operating systems. Alternately, Code 102 may be operating system neutral, and may be rendered similarly for any mobile operating system.

With further reference to FIG. 1, the user may wish to download the ecard app by scanning Code 102. The user may choose any known scanning program or application to perform the scanning, as long as the program or application functions to resolve an address upon scanning, such as the mobile application "Scan" (provided by QR Code City).

In one embodiment, where different Codes 102 exist for different operating systems, after the user scans the desired operating system's Code 102, the portable computing device 104 resolves the scan as a call to download the ecard app from the application store 106. The portable computing device 104 is routed to the application store 106 dedicated to the operating system identified, where the user is prompted to download the ecard app.

In one embodiment, where the Code 102 may be operating system neutral, after the user scans the Code 102, the portable computing device 104 is routed to a website 110 (not shown). Website 110 is housed on a server 112 (not shown), which further automatically interprets the user's operating system and prompts the user to download the ecard app by re-directing the portable computer device 104 to the application store 106 dedicated to the operating system identified.

In another embodiment, after the user scans the Code 102, the portable computing device 104 is routed to a website 114 (not shown) which contains links to several application stores which the user may select. Website 114 is housed on a server 112 (not shown). Once the user selects the appropriate application store link, portable computing device 104 is routed to the application store 106 dedicated to the operating system identified, where the user is prompted to download the ecard app.

In another embodiment, scanning Code 102 may also be utilized to capture statistical and analytical data about the users. For instance, the scanning program or application which is utilized for scanning Code 102 may initially direct the portable computing device 104 to a statistical aggregation site and/or an analytics site 140 (not shown), such as Google Analytics®.

In each of the embodiments described above, when the user is prompted to download the ecard app, the user may do so and install the application on the portable computing device 104 from the application store 106.

Figure 2:
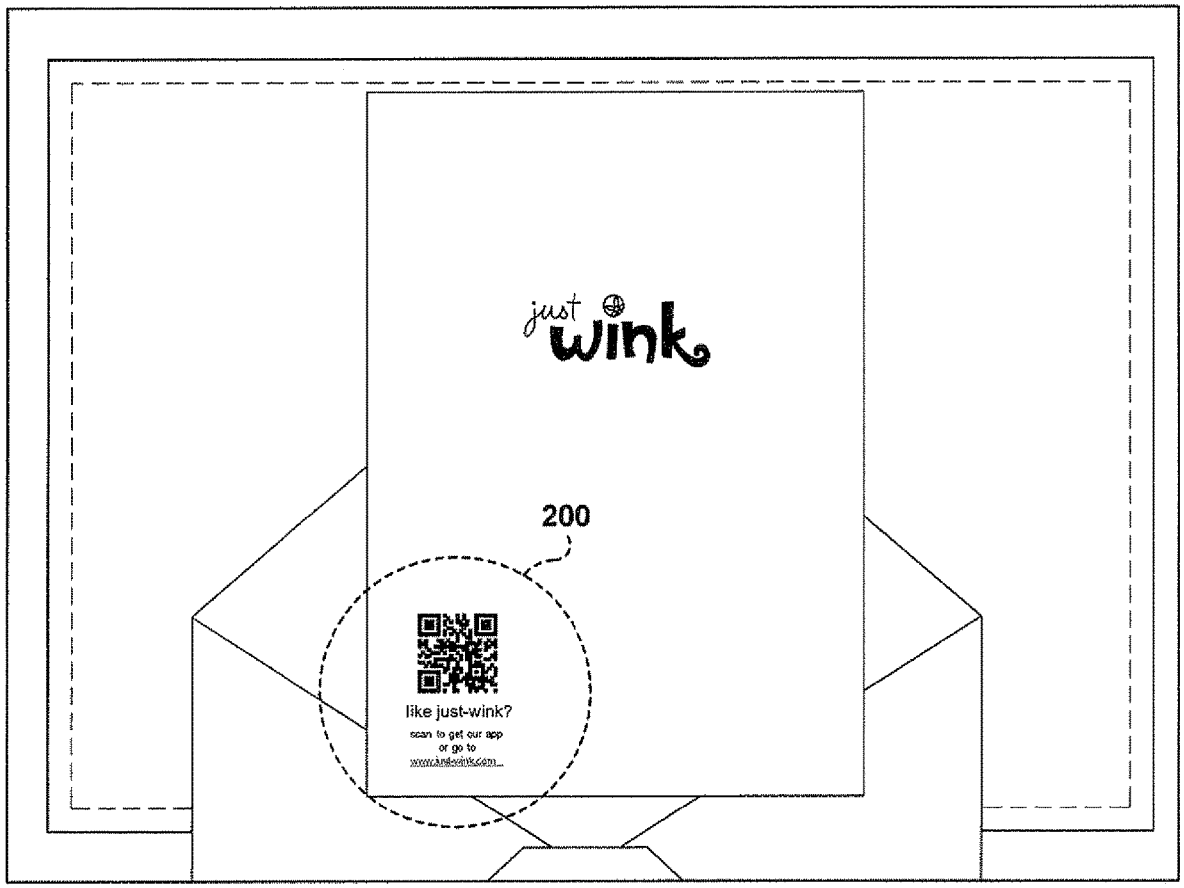
FIG. 2 shows an exemplary Code disposed on a paper greeting card.
Figure 3:
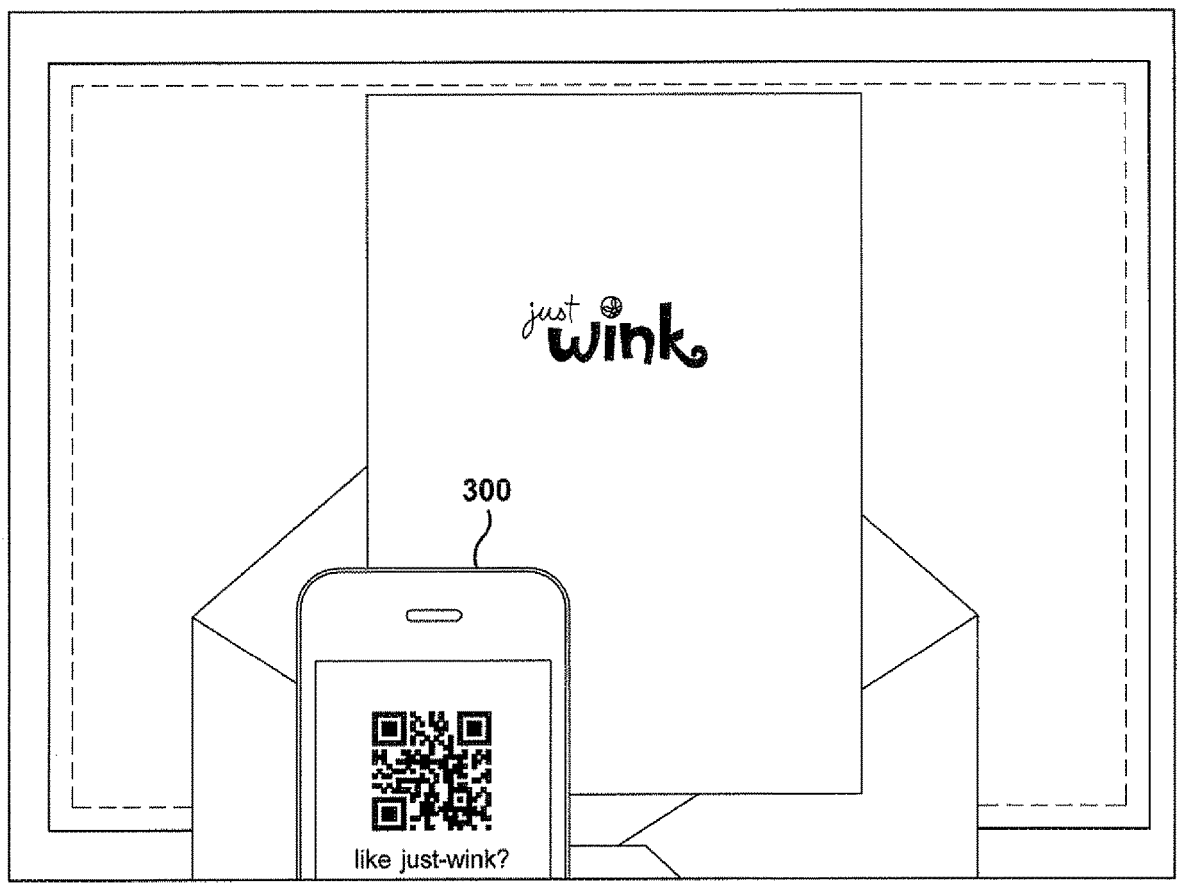
FIG. 3 shows the use of a portable computing device to scan a QR Code.
Figure 4:
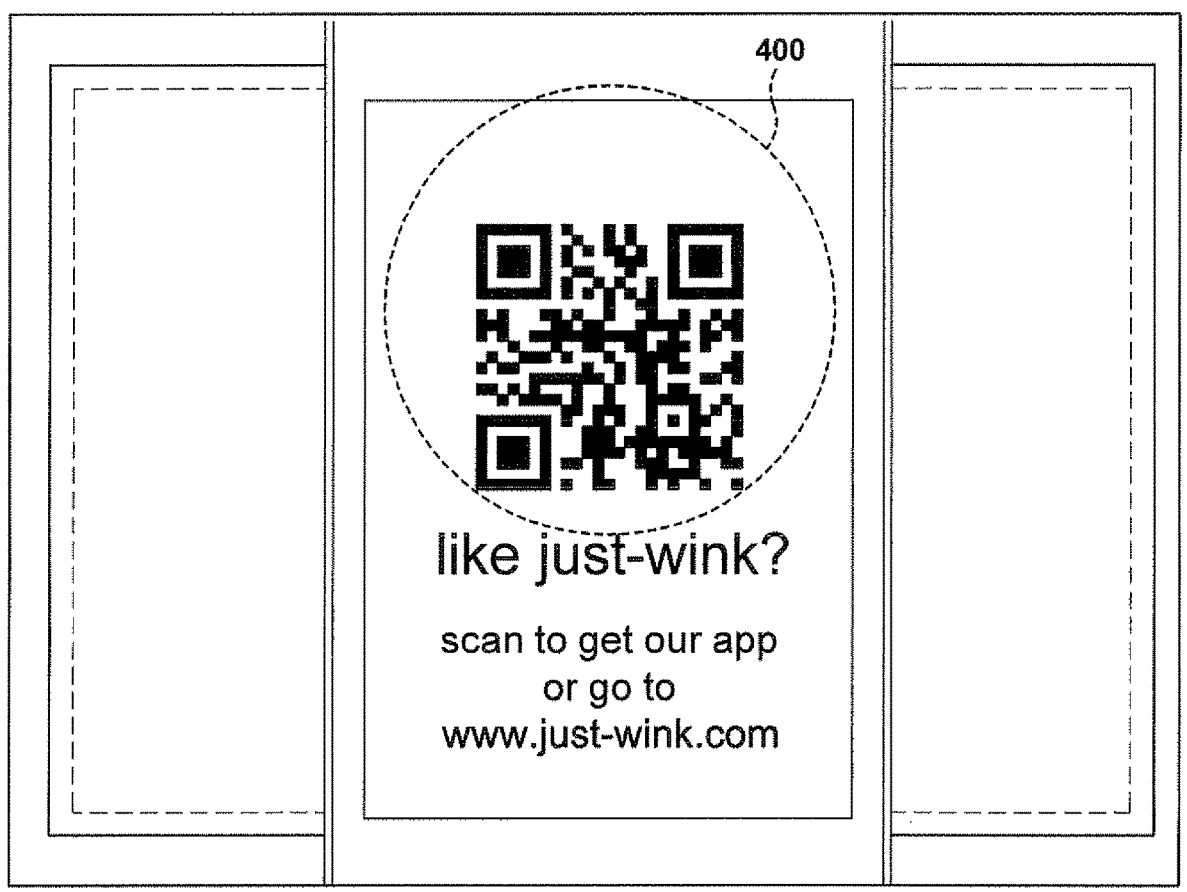
FIG. 4 shows a QR Code being captured on a portable computing device.

To further illustrate capturing a Code on a portable computing device, with reference to FIG. 2, an exemplary Code, styled QR Code 200, is disposed on a paper greeting card. With reference to FIG. 3, the user may utilize a portable computing device 300 to scan (e.g. by pointing and shooting using the portable computing device's camera) the QR Code 200. The QR Code is then captured as shown by the exemplary QR Code 400 in FIG. 4.

The various embodiments of downloading an ecard app are described in more detail below, with particular reference to flowcharts which help illustrate the embodiments.

Figure 4A:
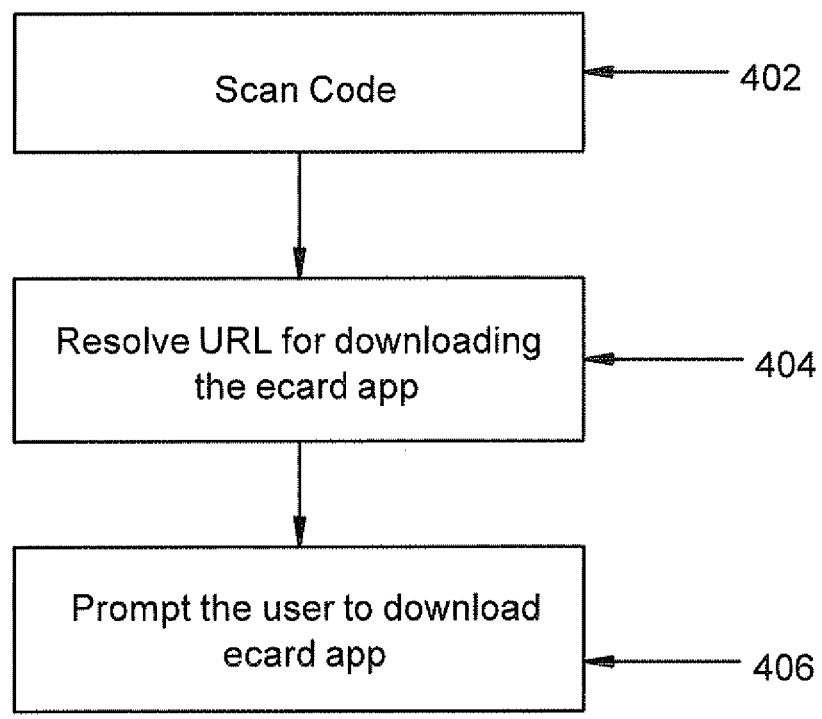

In one embodiment, with reference to FIG. 4A, different Codes 102 exist for different operating systems. After the user scans Code 102 at step 402, the portable computing device 104 resolves the URL for downloading the ecard app at step 404. At step 406, the portable computing device 104 is then routed to the application store 106 dedicated to the operating system identified, where the user is prompted to download the ecard app.

Figure 4B:
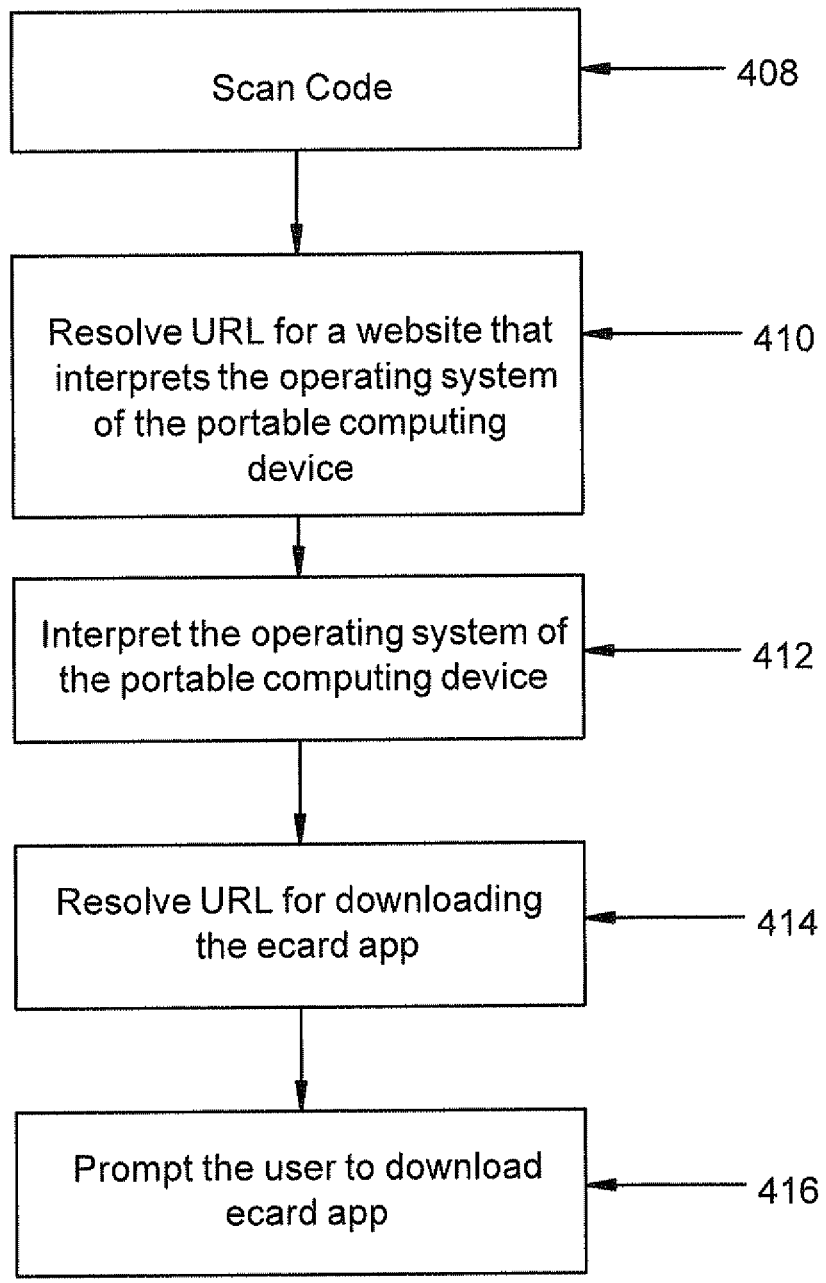

In another embodiment, with reference to FIG. 4B, Code 102 is operating system neutral. After the user scans Code 102 at step 408, the portable computing device 104 resolves the URL for a website 110 (not shown) at step 410. Website 110 is housed on a server 112 (not shown). Website 110 automatically interprets the portable computing device 104 operating system at step 412, by utilizing the header packet information provided by the portable computing device 104 browser. At step 414, the portable computing device 104 resolves the URL for downloading the ecard app. At step 416, the portable computing device 104 is then routed to the application store 106 dedicated to the operating system identified, where the user is prompted to download the ecard app. In another embodiment, after website 110 interprets the portable computing device 104 operating system at step 412, rather than the device 104 resolving a URL for downloading the app, the device 104 may be directed to another website 160 (not shown), which contains multiple download options. At website 160, the user may choose one option before proceeding to steps 414 and 416 described above, to resolve the URL for downloading the app and downloading the app respectively.

Figure 4C:
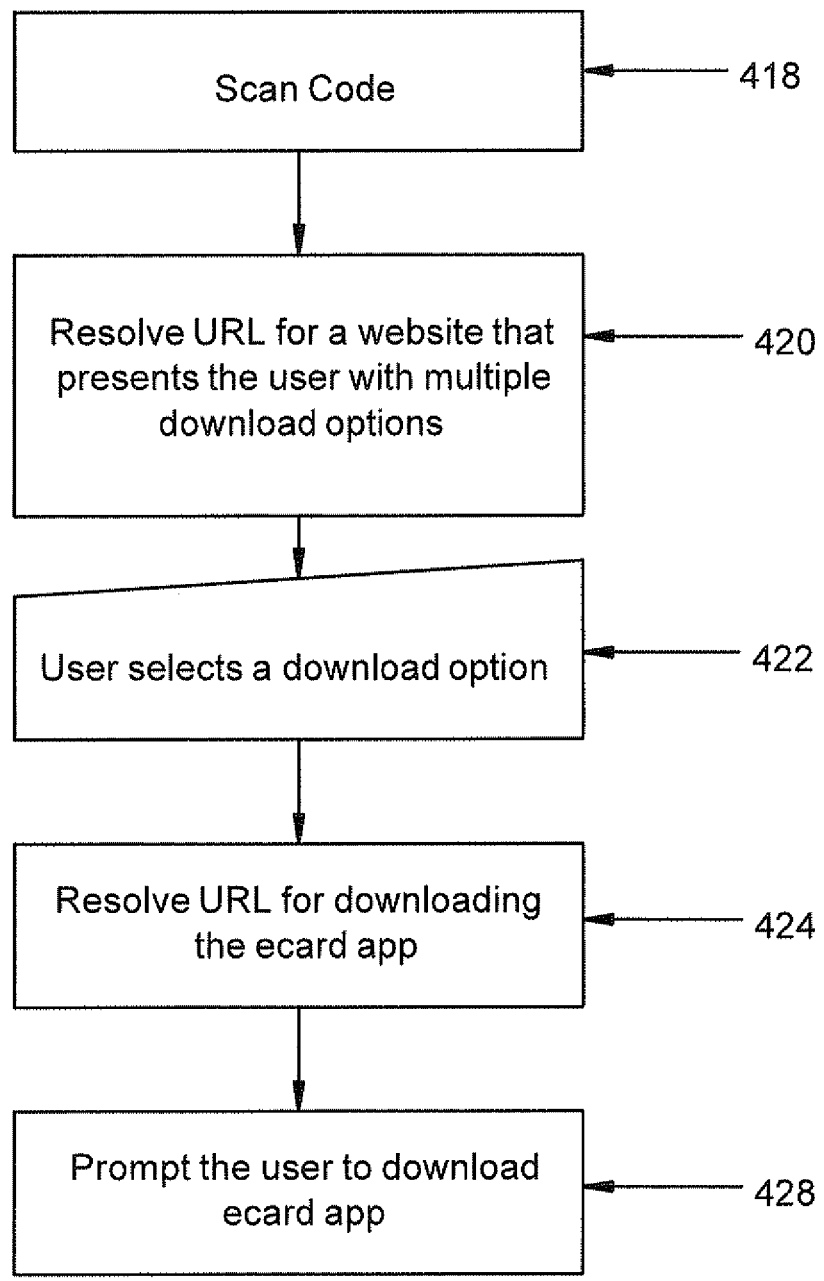

In another embodiment, with reference to FIG. 4C, Code 102 is operating system neutral. After the user scans Code 102 at step 418, the portable computing device 104 resolves the URL for a website 114 (not shown) at step 420. Website 114 is housed on a server 112 (not shown). Website 114 presents the user of the portable computing device 104 with multiple download options based on the operating system of the user. At step 422, the user selects a single download option, such as a link to the App Store®. At step 424, the portable computing device 104 resolves the URL for downloading the ecard app. At step 428, the portable computing device 104 is then routed to the application store 106 dedicated to the operating system identified, where the user is prompted to download the ecard app. Once the ecard app is downloaded into the portable computing device, much of the software comprising the app is stored within the portable computing device.

Providing Content to the Ecard App

Figure 5:
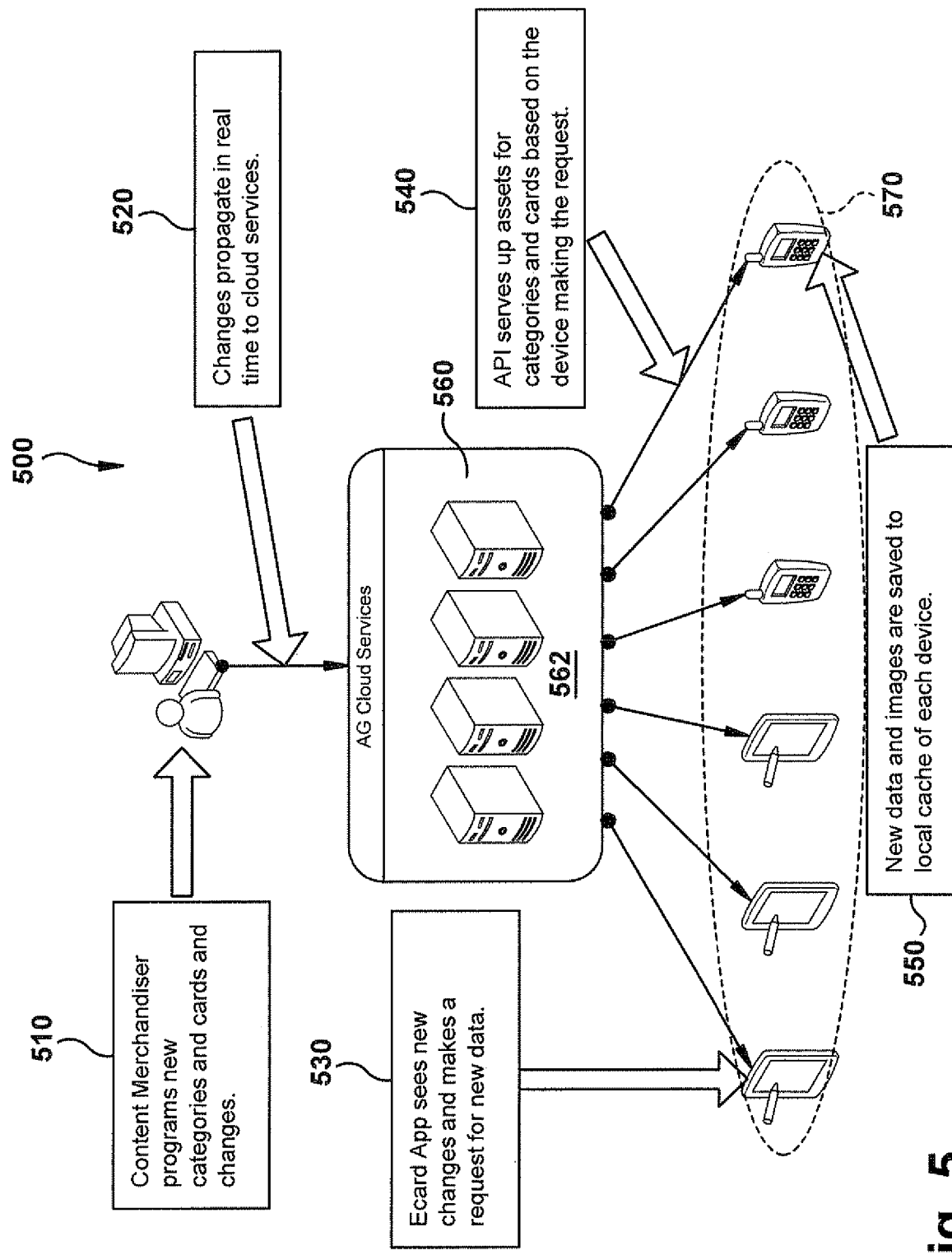
FIG. 5 depicts a flow diagram of an exemplary system environment for electronically merchandising and delivering electronic greeting cards over the internet.

Once the ecard app is downloaded to a portable computing device 104, the ecard app provides a system for merchandising and delivering electronic greeting cards. FIG. 5 depicts a flow diagram of this exemplary system environment 500 for electronically merchandising and delivering electronic greeting cards over the internet, consistent with the exemplary methods described herein. In one embodiment, system environment 500 may include a content merchandising system 510, a content delivery platform 580 (not shown), a cloud service system 560 and a plurality of portable computing devices 570.

Content merchandising system 510 may consist of any number of computers or servers that the merchandiser uses to program and create electronic greeting cards and card categories to be downloaded to users' portable computing devices. Content delivery platform 580 is the software platform which enables the content merchandiser to program and create electronic greeting cards and card categories to be downloaded to the users' portable computing devices. A content merchandiser may include the owner/host/provider of the ecard app, or a third party provider which provides content, such as card categories and electronic greeting cards, to the owner/host/provider for use in the content merchandising system 510. A cloud service system 560 is a collection of servers, including web servers 562.

Using the content merchandising system 510, a content merchandiser programs card categories and electronic greeting cards into the content delivery platform 580. Programming card categories may include, but not limited to, creating new card categories, deleting existing card categories, and modifying existing card categories. Categories may correspond to birthdays, anniversaries, or any other type of holidays or events. Similarly, programming electronic greeting cards may include, but is not limited to, creating new electronic greeting cards, deleting existing electronic greeting cards, and modifying existing electronic greeting cards.

After the card categories and/or electronic greeting cards are programmed into the content delivery platform 580, the "changes" 520 are propagated or transmitted into the cloud service system 560. Changes 520 include any edits, updates, deletions and additions to the card categories and/or electronic greeting cards. The cloud service system 560 may include or interact with a plurality of web servers 562 (not shown) that are disposed in communication with the system environment 500.

A plurality of portable computing devices 570 with the downloaded ecard app monitor the cloud service system 560 for changes 520. Once changes 520 are recognized by the plurality of portable computing devices 570, any of said devices 570 request the changes 520 from the cloud service system 560.

Depending on the type of portable computing device 570 (e.g. Tablet Computers, Smart Phones, and various brands thereof, such as Apple® or Motorola® or HP® or Android®) making the request for changes 520, an Application Programming Interface (an API) of the content delivery platform 580 serves up or transmits changes 520 that correspond to the type of portable computing device 570 making the request. The changes 520 are stored in the portable computing device 570 local cache 550, for later use. Local cache 550 in each portable computing device may assist in reducing network bandwidth, improving User Interface (UI) responsiveness, enabling offline usage and preserving battery life. When the ecard app is loaded initially, the ecard app will download a content catalog and card content through the API. The ecard app also requests card content for new categories and cards based on respective device screen sizes and resolutions (i.e., pixel density). The API provides a nearest match for the requested sizes, so that resources for a tablet computer, for example, will serve larger content than resources for smaller screened devices. In one embodiment, subsequent requests for the content changes 520 are then made by comparison to the applicable local cache 550, each time checking whether the existing content has changed. If the cache has changed, before downloading the any new changes, the app will check with the server whether or not the content has been modified. This validation step helps to prevent unnecessary requests for redundant data. In another embodiment, subsequent requests for the content changes 520 are made to the API without first checking for changes to the existing content in the local cache 550. Here, new content is simply requested from the API, and any new content provided therein by the API is cached in the local cache 550.

In one exemplary embodiment, the API 540 is utilized for the purposes of facilitating the rendering of Scalable Vector Graphics (Images) (SVG) on the portable computing devices, including external images which are stored in an SVG format. SVG format is a type of format which uses extensible markup language (XML) specifications to render static and dynamic two-dimensional vector graphics. The API is used for, but not limited to, visualization, scalable icons, scalable graphics, scalable text, scalable images, scalable dynamic text and other uses which require scalable data. The system interactions between the several SVG files, non-SVG files and the API is handled via a communication network, comprised of a portable computing device, the internet and the host server(s) that comprise the cloud 560. The communication network uses the API as the bridge between the user's portable computing device and the SVG graphics and other files that comprise the card content. Source code that comprises the app allows the user of the app to interact with and manipulate the elements within an SVG file and any non-SVG files through the API.

In several exemplary embodiments, the user interacts with, or edits, or displays, or perform actions with, or views, or adds/edits/replaces information on the user interface. The user interactions are enabled by system interactions between several SVG files, API files and the app Source Code. They include displaying, interacting with, and managing animations, loading text within SVG files, and loading dynamic text in the SVG files. Further, when the user wishes to interact with the screen of the smart phone, such user interactions are enabled by system interactions between several SVG files, API files and the app Source Code. In one exemplary embodiment, the SVG files can be scaled. Unlike the files with Joint Photographic Experts Group (JPEG) properties and/or files with Graphics Interchange Format (GIF) properties, SVG files, and especially SVG images are scalable to the size of the window where the image is viewed. After rendering, the SVG file adjusts in size and resolution to the size of the viewing window. Additionally, the SVG files are interactive. In one exemplary embodiment, the SVG files are formatted such that the resultant SVG file complies with XML specifications. The SVG files are created through text-based commands. In one exemplary embodiment, the SVG files are utilized for many purposes, including but not limited to, transformations of objects, colors of a shape or text, opacity of a shape or text, gradients of a shape or text, textures of a shape or text, filling a shape or text, stroking a shape or text (stroke), clipping a shape or text, filter effects on a shape or text, inserting symbols or images at coordinates, interactive elements, event handling within and outside the script, scripting and animation functions.

In one exemplary embodiment, a document object may be used to access an SVG file or a non-SVG file. A document object may be used to inquire into the document properties of the SVG file or a non-SVG file as well as to create new document elements within the accessed document. In one exemplary embodiment, several references within the accessed document can be retrieved using calls and pulls. In this context, calls may be viewed as requests for information and pulls may be viewed as the retrieval of said information requested. Several API methods can be used to manipulate the SVG elements or non-SVG elements, each of which is associated with a definitive property or function. The API files can also be used to register event listeners to work with the SVG files or non-SVG files. An event listener listens for events such as a 'return' call (pressing the return key) within the portable computing device. In one exemplary embodiment, an SVG file (main.svg) is pulled from one of the cloud servers 560. The pulled SVG file creates an entry point into the SVG data associated with that pulled ecard. The pulled SVG file may reference to one or more additional SVG files or non-SVG files creating a resulting file. In one exemplary embodiment, the reference from the pulled SVG file to other SVG or non-SVG file(s) is achieved through a pull mechanism via an XINCLUDE or any other XML inclusion means.

In one exemplary embodiment, the resulting file, as described above, is parsed into a product model. The product model as used herein, includes, but not limited to, a symbol library containing references to images to be used in ecards. In one exemplary embodiment, the symbol library contains references to images for ecards, which include, but are not limited to, sounds, files, static text, dynamic text, functions and images. In one exemplary embodiment, the symbol library contains references to the usage of the images (assets) which include, but are not limited to, identifying whether the image is a background, a sticker, a portion of the e-greeting card, a foreground, a font, a signature element, a text element, an image element, an audio element and an element which defines function of the image. In one exemplary embodiment, the symbol library contains a list of "scenes". The scenes may correspond to pages in a greeting card which is held in a physical (e.g. paper) medium. The list of scenes, includes, but not limited to, a front-cover scene, an inside left scene, an inside right scene, a back-cover scene and a middle page scene. In one exemplary embodiment, the scenes may be comprised mostly of references to objects in the symbol library. For instance, a front cover scene may reference a background image from the symbol library. Also, a front cover scene may reference an audio clip from the symbol library which may be used for the purposes of background audio.

In one exemplary embodiment, the product code translates the SVG file(s), the non-SVG file(s), the resultant file and any references to the symbol library into a series of "draw" calls that the application performs, which directs the application into drawing or creating a page on the portable computing device's screen. In one exemplary embodiment, the application is directed into drawing or creating a page, without identifying or "knowing" the underlying SVG data.

User Operation and Flow of Ecard App

Reference will now be made in detail to the flow of a user's operation and function of the ecard application on a portable computing device after it has been downloaded to the device. The user interactions are operated through the methods and systems described above with respect to FIG. 5.

Figure 6:
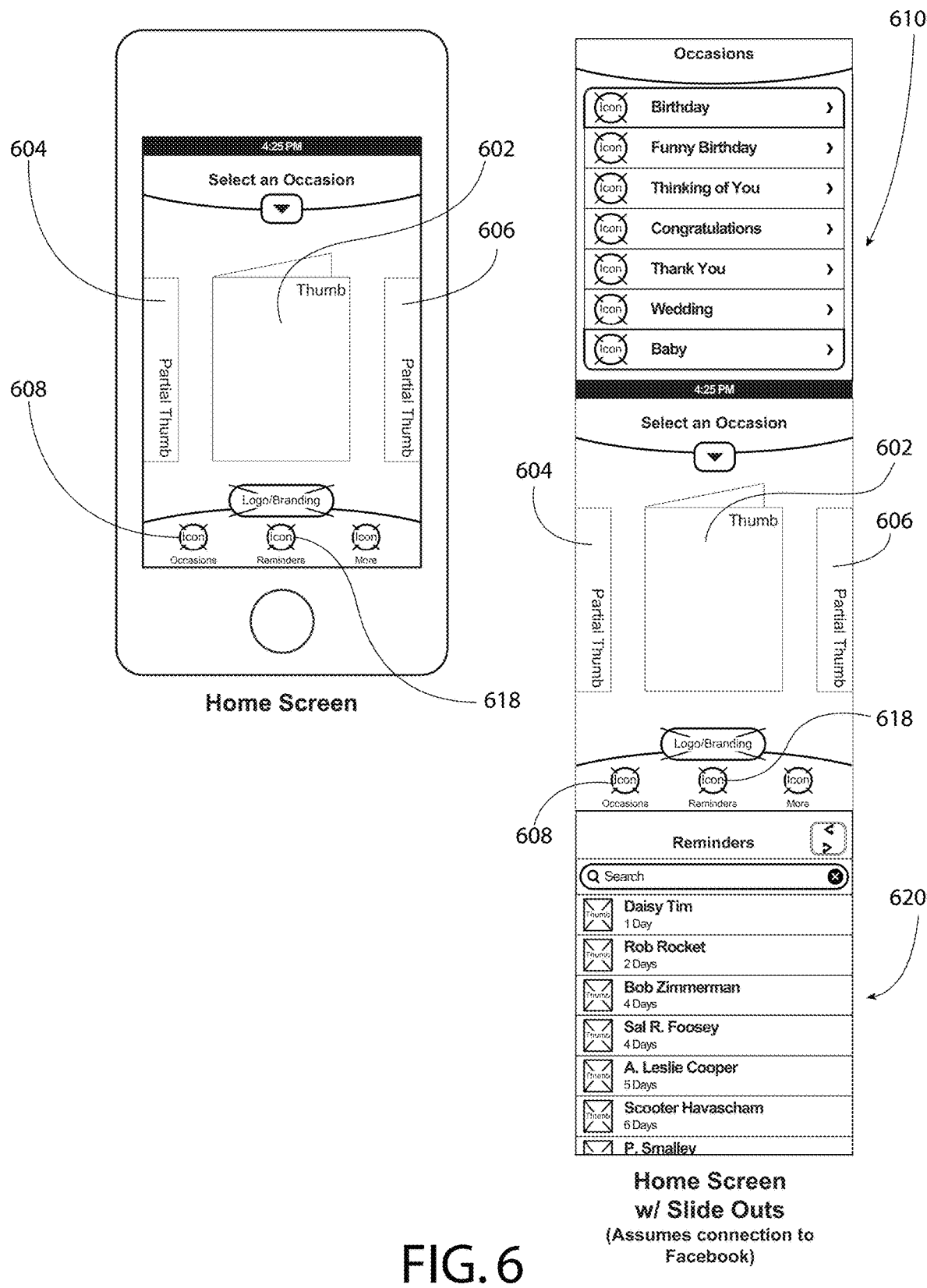

In one exemplary embodiment, the ecard app's home screen displays one or more electronic greeting cards. The user may navigate between several electronic greeting cards by interacting with the user interface. For example, as illustrated in FIG. 6, the user interface is a touch screen, and the user may tap on an electronic greeting card 606 (or any other cards, such as 602 and 604) to open the selected card's interactive view. The user may swipe his or her finger to the right or to the left to view, select and navigate between any of the electronic greeting cards available under the selected occasion. Thus, for example, the user may swipe right to move from the first electronic greeting card 606 to the last electronic greeting card, while the user may swipe left to move from the last electronic greeting card to the first electronic greeting card 606 within the selected occasion.

With further reference to FIG. 6, the ecard app may display a list of categories in response to the user interacting with the user interface. For example, in one embodiment, the user interface is a touch screen, and the user may interact with the touch screen by tapping and dragging any part of a categories graphic icon, styled Occasions 608, to view a list of primary occasions 610 for which an electronic greeting card may be created. Further, the user may, by tapping and dragging any part of the Occasions screen 608, be able to view several occasions 610, including, but not limited to, Birthday, Wedding, Thank You and Baby occasions. One of ordinary skill in the art will appreciate that any number and type of occasions may be displayed in the ecard app. For example, the user interface screen of the ecard app may display a set of 6 occasions or a set of 12 occasions as defined by the user. Selecting a single occasion will display all the electronic greeting cards available under the selected occasion. For example, as illustrated in FIG. 6, the user may single tap the Birthday occasion to view and select any of the available electronic greeting cards 602, 604, 606 under the Birthday occasion.

In one exemplary embodiment, the ecard app may display a list of all of user's event reminders. For example, with reference to FIG. 6, the user may tap the graphic icon designated to display birthday reminders 618. The tap on the reminders graphic icon 618 will reveal a view of the user's upcoming reminders 620.

Figure 7:
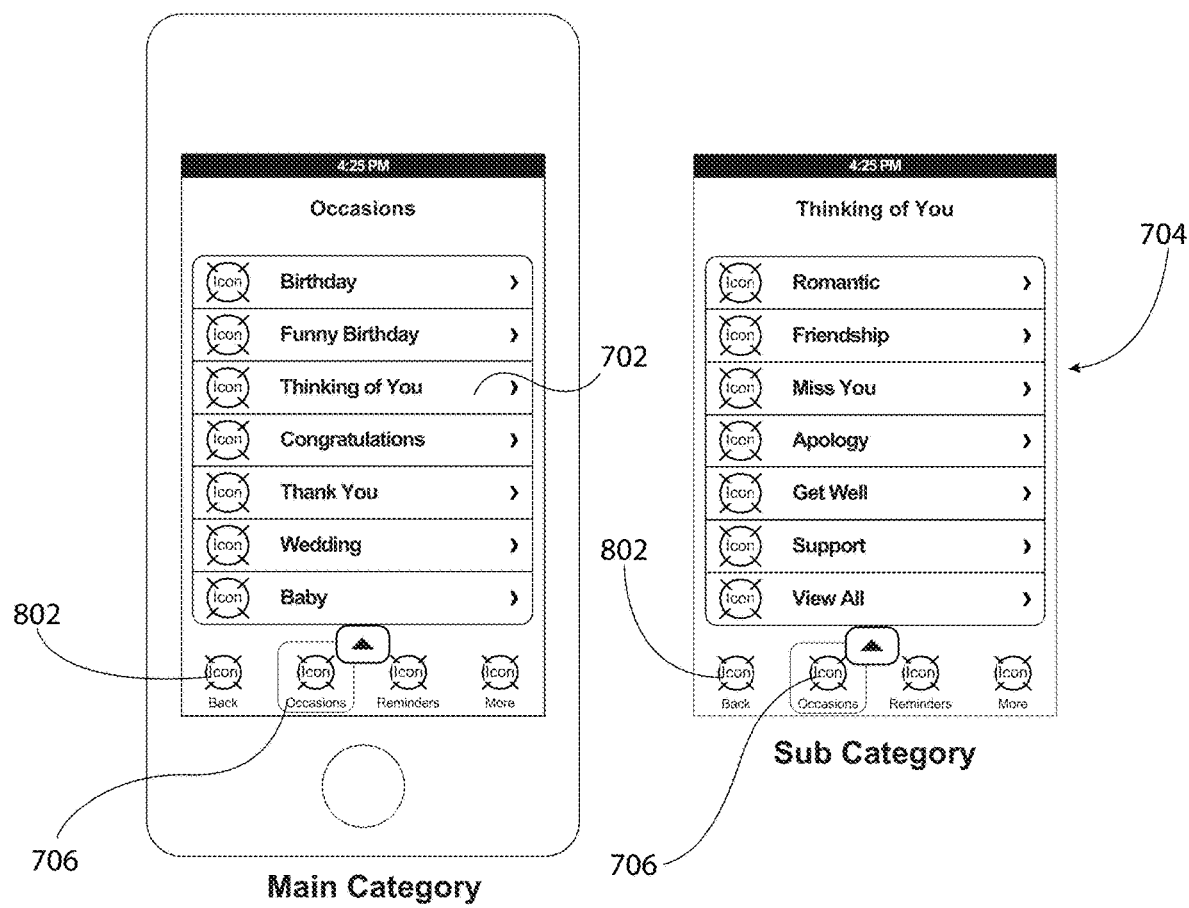

In one exemplary embodiment, the ecard app may display a list of sub categories in response to the user interacting with the user interface. For example, with reference to FIG. 7, the user interface is a touch screen, and the user may tap any occasion from the list of occasions to view said occasion's sub categories. The user may scroll through the list either vertically (portrait view) or horizontally (landscape view). To illustrate, the user may tap the occasion Thinking of You 702 to view sub categories 704, under the selected occasion 702. The user may be able to view several sub categories 704, including, but not limited to, Romantic, Friendship, Miss you and Apology. One of ordinary skill in the art will appreciate that any number of sub categories may be displayed in the ecard app. For example, the user interface screen of the ecard app may display a set of 6 sub categories or a set of 12 sub categories as defined by the user. Selecting a single sub category will display all the electronic greeting cards available under the selected sub category.

In one exemplary embodiment, the ecard app may allow the user to move back to an earlier display screen of the portable computing device, by facilitating interaction with the user interface. For example, in one embodiment, with reference to FIG. 7, the user may tap the graphic icon designated to move the user screen behind one screen. The tap on the "Back" graphic icon will reveal the user's last screen. For example, a tap on the Back graphic icon 802 takes the user from the card category (Occasions) screen to the sub category screen 704.

In one exemplary embodiment, the user may also wish to display on the screen of the portable computing device, a list of all the occasions, by interacting with the user interface. For example, with reference to FIG. 7, the user may tap the graphic icon designated to display a certain fixed number of occasions on the user screen. The tap on the Occasions graphic icon 706 will reveal a view of the most popular list of occasions or a pre-determined list of occasions.

The ecard app may display an interactive preview of an electronic greeting card on the screen of the portable computing device. For example, with reference to FIG. 8, the user may tap anywhere within a listed item 804, 806, 808, 810 (e.g. a thumbnail of an electronic greeting card), to view an interactive preview of the selected card.

In one exemplary embodiment, the ecard app may display a page view of electronic greeting cards on the screen of the portable computing device. For example, with reference to FIG. 8, the user interface is a touch screen, and the user may tap on a graphic icon 812 which allows the user to switch between a grid view 814 and a list view 864 of electronic greeting cards. One of ordinary skill in the art will appreciate that any number of views can be created within the user interface and could be displayed on the user interface.

Figure 8:
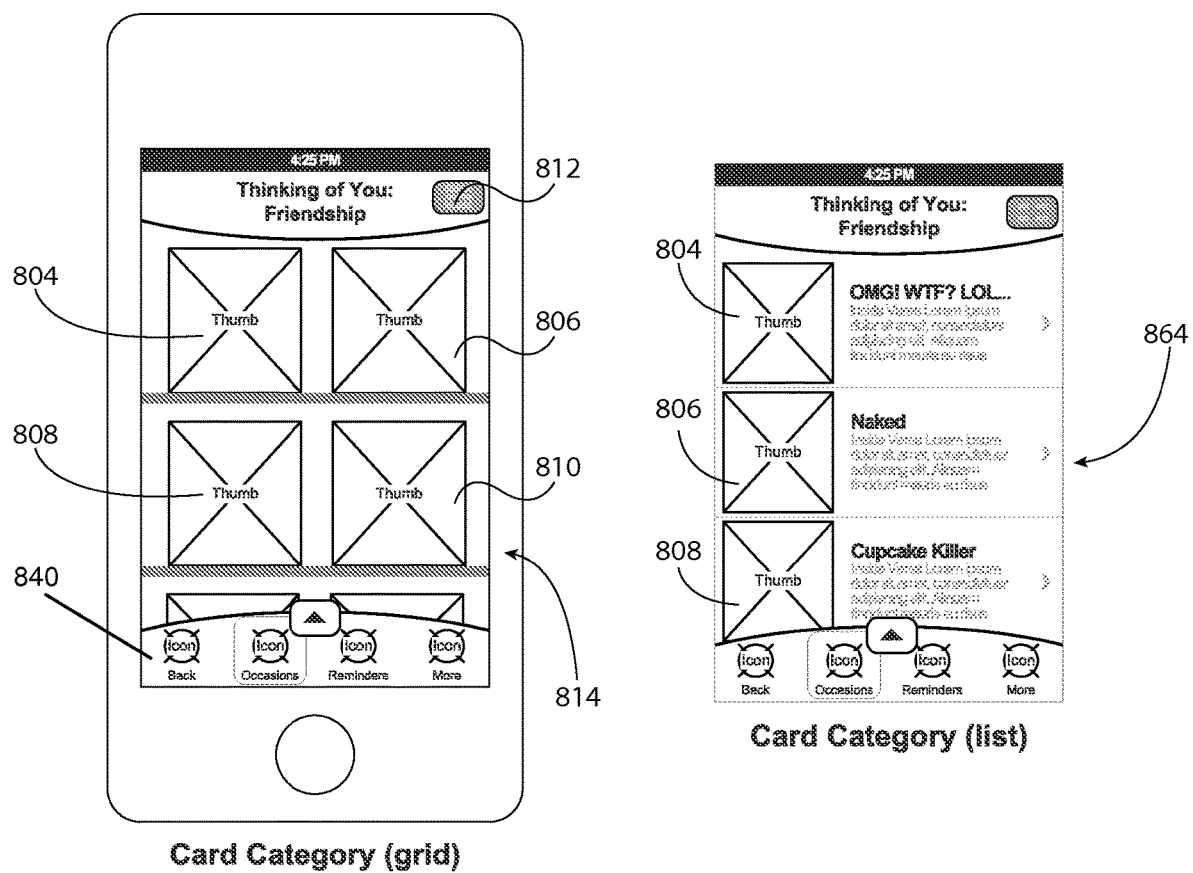

With further reference to FIG. 8, the ecard app may also display several "Options" within the interactive preview, on the screen of the portable computing device. For example, the user may tap and hold the thumbnail of an electronic greeting card 804, 806, 808 or 810, which allows the user to either view the interactive preview of the selected card or acquire options to personalize the card.

In one exemplary embodiment, the ecard app may display a navigation graphic icon bar on the screen of the portable computing device. For example, with reference to FIG. 8, the navigation graphic icon bar 840 is disposed across the bottom section of the ecard app. The navigation graphic icon bar 840 gives the user the option to navigate within the ecard application, for example, occasions, reminders, etc.

Figure 9:
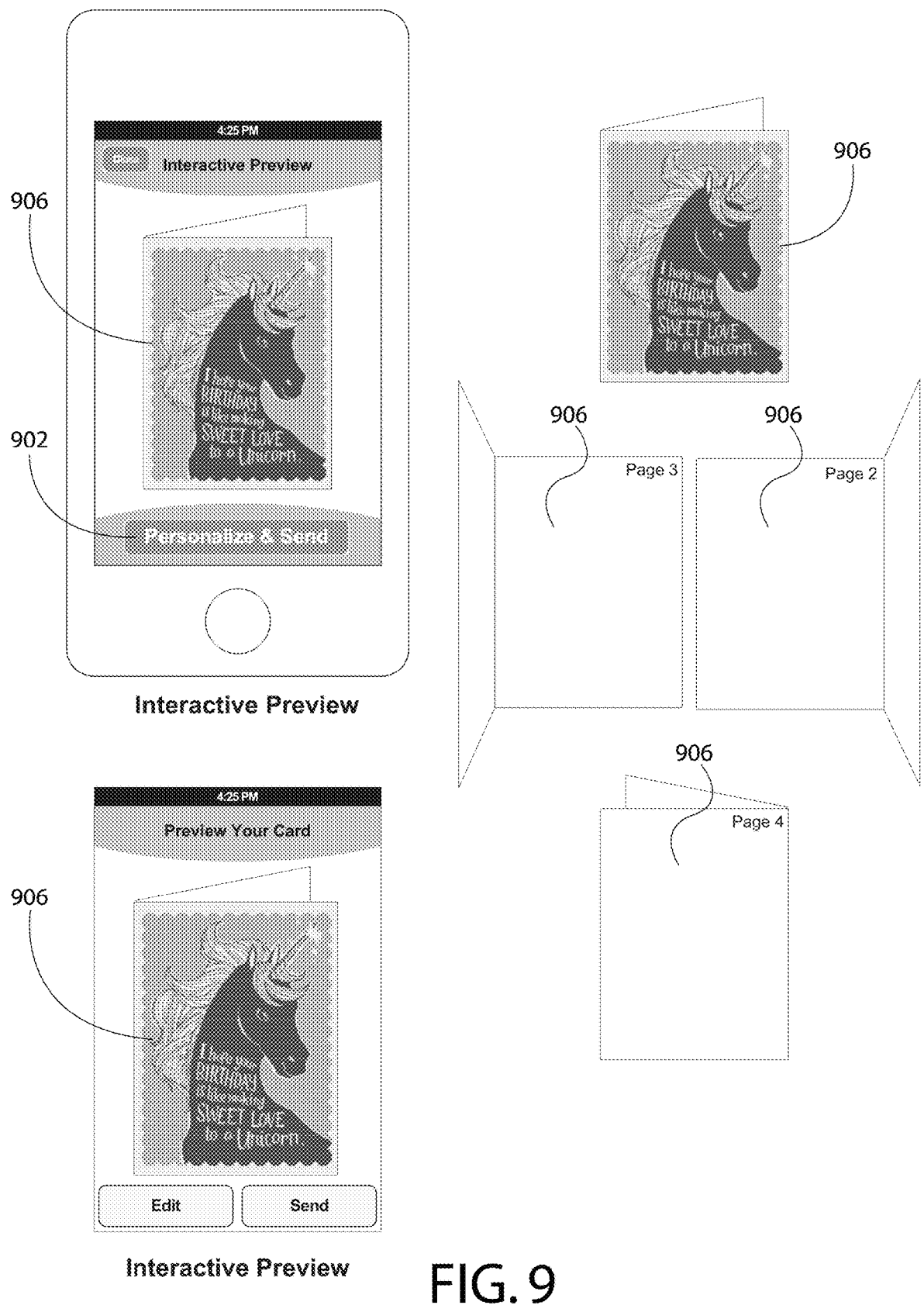

In one exemplary embodiment, the ecard app may display a Personalization Hub on the screen of the portable computing device. For example, with reference to FIG. 9, the user interface is a touch screen, and the user may tap on the Personalize and Send graphic icon 902 which allows the user to view the Personalization Hub for the selected card.

In one embodiment, there may be 4 pages within an electronic greeting card. For example, page 1 is the front cover page, page 2 is the inside left page, page 3 is the inside right page and page 4 is the back cover page of the electronic greeting card. The ecard app may also allow users to view an inside page of an electronic greeting card on the screen of the portable computing device. For example, with reference to FIG. 9, the user may tap and drag from right to left on page 1 of the electronic greeting card 906, allowing the user to view the inside right page or page 3. Thus, the electronic greeting card 906 that may be generated by the Application is a depiction of a conventional, folded four page paper card with a front page (page 1) and back page (page 4) and two inside pages (pages 2 and 3). Thus, after the card 906 is received by the recipient, the recipient may interact with the card 906 through the use of the recipient's electronic device (for example, a touch screen of a mobile or portable computing device). The recipient's interaction with the card 906 through the recipient's electronic device is defined as the recipient "pick up experience." The recipient may interact with the four pages of the card 906 by "turning the pages" with finger touches similar to turning the pages of a conventional paper card.

The ecard app may also allow the user to freeze a current position of an electronic greeting card on the screen of the portable computing device. For example, with further reference to FIG. 9, the user may tap and drag from right to left on page 1 of the electronic greeting card 906, but stop dragging less than half way, allowing the user to view the inside right page or page 3 in whatever position left open by the current open point. In a similar embodiment, the user may tap and drag the page more than the half-way point to snap the card 906/complete opening the card 906 all the way to a pre-designated full open point.

The ecard app may also allow the user to alternate viewing the inside right page and the inside left page of an electronic greeting card, or to return to a front cover page of a greeting card, or to move from and away from a back cover page on the screen of the portable computing device. For example, with further reference to FIG. 9, the user may tap and drag from right to left on page 1 of the electronic greeting card 906 which allows the user to view the inside right page or page 3 and a single tap on page 3, switches the user to view page 2. Likewise, the user viewing page 2, may, by a single tap of page 2 return to a full view of page 3. A tap and drag from left to right while viewing page 3, closes the card 906 to page 1. A single tap on page 4 returns the user to page 2.

In one exemplary embodiment, the ecard app may also allow the user to utilize or view visual cues in viewing an electronic greeting card on the screen of the portable computing device. For example, with reference to FIG. 9, the user may use visual cues, such as arrows, to move between the pages of a greeting card. The visual cues fade out from view after a pre-determined period of time. For example, with reference to FIG. 9, this period is 1.5 seconds.

Figure 10:
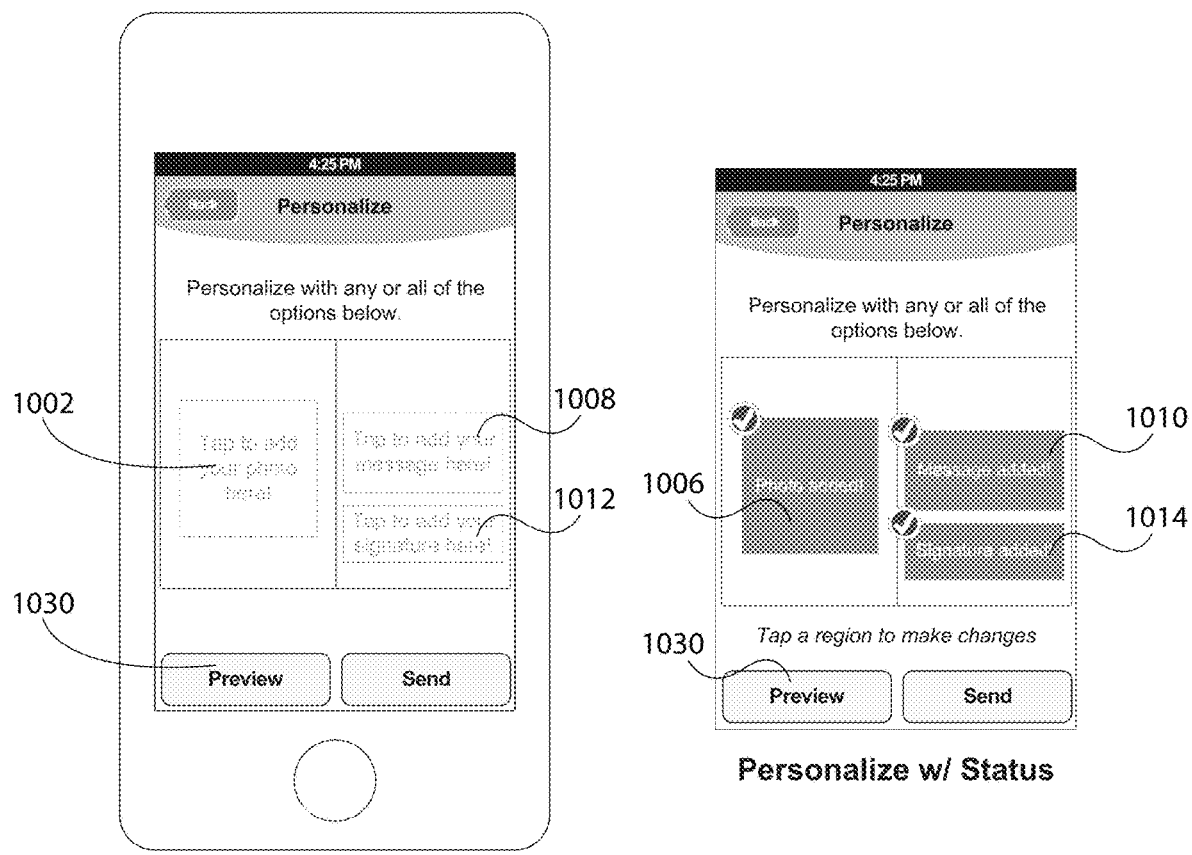
Figure 13:
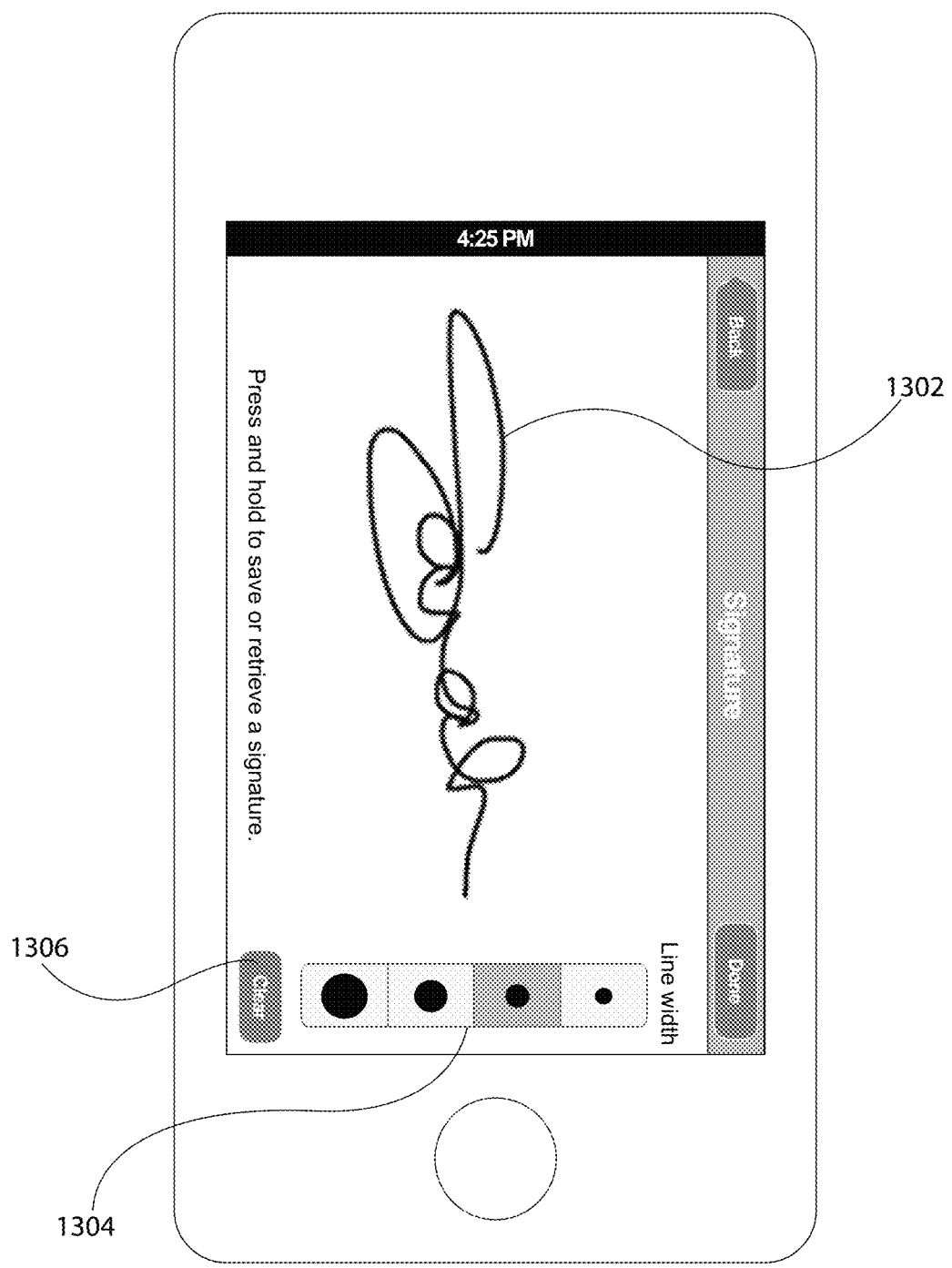

In one exemplary embodiment, the ecard app may also allow the user to add, edit, replace or remove a photo to the electronic greeting card on the screen of the portable computing device. For example, with reference to FIG. 10, the user interface is a touch screen, and the user may tap the photo area 1002 which takes the user to a photo personalization screen (not shown). Once a photo has been added at 1006, another single tap would allow the user to go back and edit, replace, or remove the photo that has been added. The ecard app may also allow the user to add, edit, replace or remove a message to the electronic greeting card on the screen of the portable computing device. For example, with further reference to FIG. 10, the user may tap the message area 1008 which takes the user to a message personalization step. Once a message 1010 has been added, another single tap would allow the user to go back and edit, replace, or remove the message that has been added. The ecard app may also allow the user to add, edit, replace or remove a signature to the electronic greeting card on the screen of the portable computing device. For example, in one embodiment, with further reference to FIG. 10, the user may tap the signature area 1012 which takes the user to a signature personalization step. Once a signature 1014 has been added, another single tap would allow the user to go back and update, clear, or redraw the signature that has been added. Further, with reference to FIG. 13, the user interface is a touch screen, and the ecard app may allow the user to control the thickness of the signature 1302 by choosing one of the thickness options 1304 presented to the user on the screen of the portable computing device. An alternative to providing signature thickness options is to provide a slide bar type icon that changes the thickness of the signature based on moving a user's finger to various positions on a slide bar. The user may shake the portable computing device side-to-side to clear any signature applied until that point. The user may also wish to single tap the 'clear signature' graphic icon 1306 to remove the signature. Further, the user may also use freeform gestures to capture the user's movements onto the portable computing device as a signature drawn in real time.

In one exemplary embodiment, the ecard app may allow the user to view several options as it relates to updates that the user makes in the user area in the electronic greeting card on the screen of the portable computing device. For example, with reference to FIG. 10, the user may tap and hold any area that has been updated, which will then present the user an action sheet with the options to delete existing changes, or make changes.

In one exemplary embodiment, the ecard app may allow the user to preview the electronic greeting card on the screen of the portable computing device. For example, in one embodiment, with reference to FIG. 10, the user may tap the preview graphic icon 1030 which then provides the user with the interactive preview screen, with the user personalization included.

Figure 11:
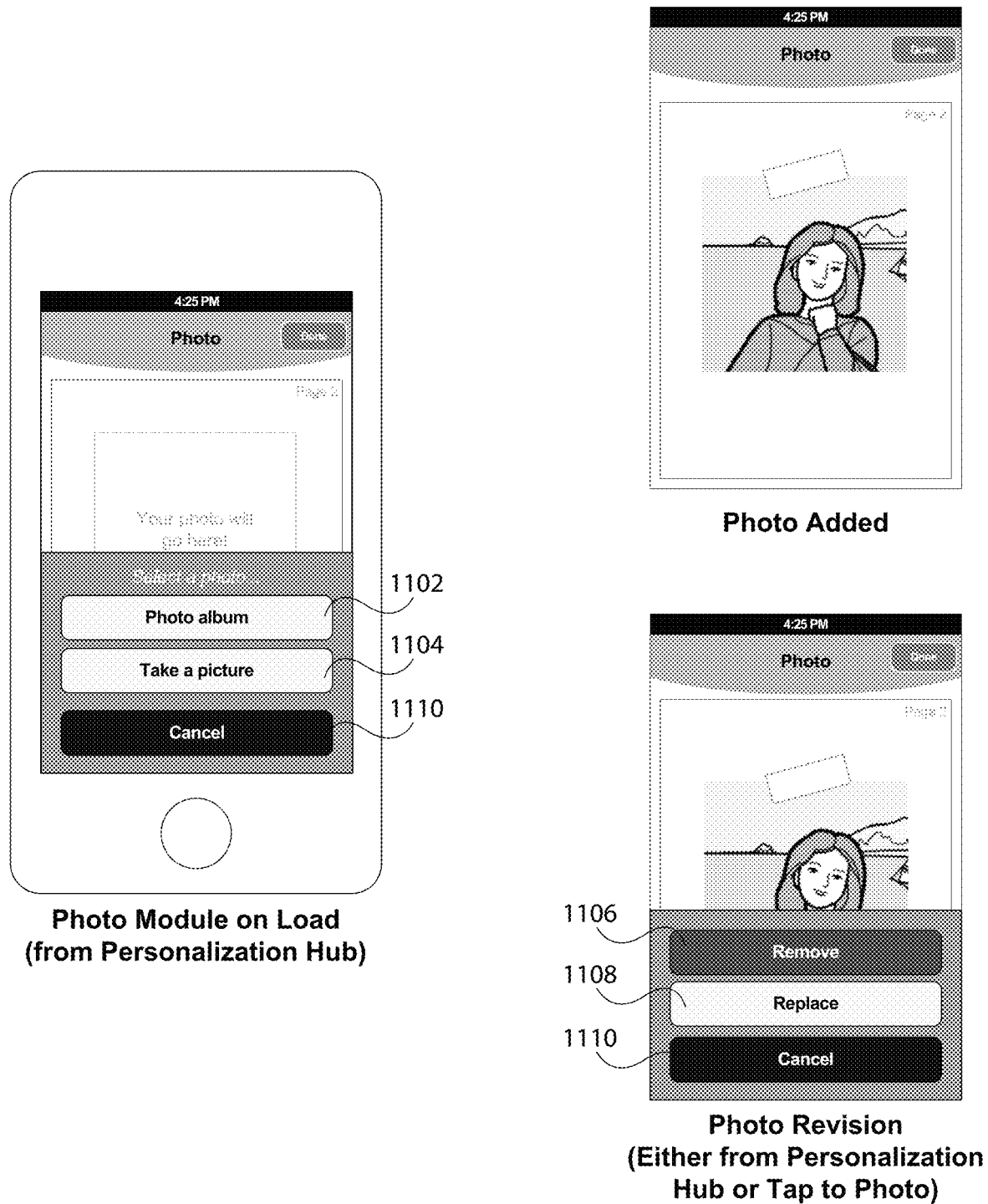

In one exemplary embodiment, the ecard app may allow the user to perform several photo-related actions with the electronic greeting card on the screen of the portable computing device. For example, with reference to FIG. 11, the user interface is a touch screen, and the user may select a photo by either choosing one from a photo album 1102 or by taking a picture 1104 with the portable computing device. Further, the user may choose to remove 1106, replace 1108, edit the photo that has already been placed on a card. The user may choose to cancel the photo inserting option 1110 into the electronic greeting card. The user may choose to use the camera interface to take a picture. Further, the user may choose to use a picture from the camera roll or picture roll associated with the portable computing device. The user may choose to tap a zoom graphic icon to zoom in and zoom out by spreading and pinching the screen respectively. With the user's fingers, as is customary with touch screen portable computing devices. The user may choose to move the photograph side-to-side by tapping and dragging on the screen. The user may choose to rotate the photo by interacting with the user screen. Further, the user may choose to select several options from a dialog/action sheet which is presented to the user who has previously added a photo and has returned to add another photo. The dialog/action sheet options include the option to remove the photo, set an animation for the photo, create a delay in an animation in the photo, replacing a photo or selecting a different photo.

Figure 12:
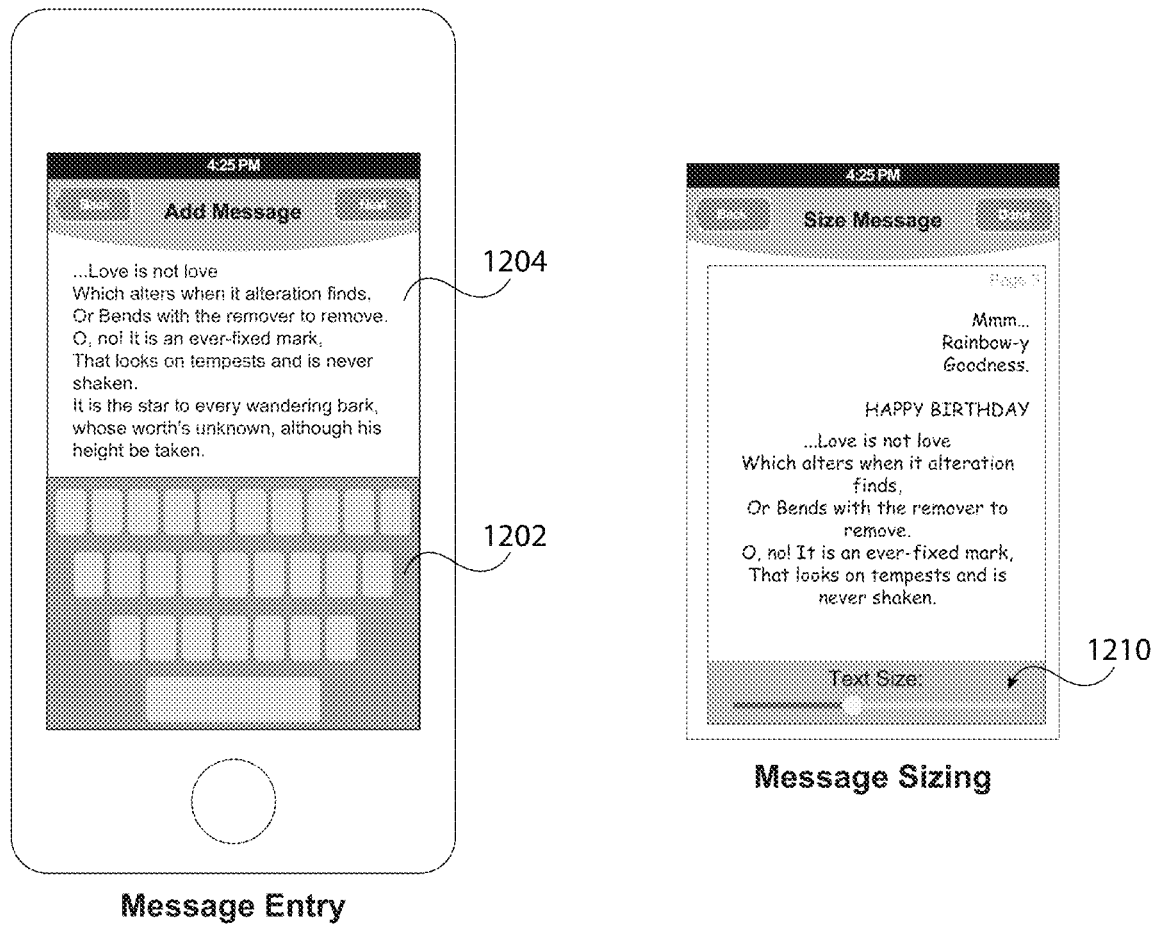

In one exemplary embodiment, the ecard app may allow the user to utilize the standard operating system text keyboard to input text associated with sending the electronic greeting card on the screen of the portable computing device. For example, with reference to FIG. 12, the user interface is a touch screen, and the user may choose to use the standard operating system text keyboard 1202 to input text 1204 on the greeting card. The user may also wish to adjust the size of a text associated with sending the electronic greeting card on the screen of the portable computing device. For example, with further reference to FIG. 12, the user may choose to tap and drag a slider 1210 which is provided on the screen and which allows the user to adjust the text size smaller or larger by moving the slider left or right respectively.

Figure 14:
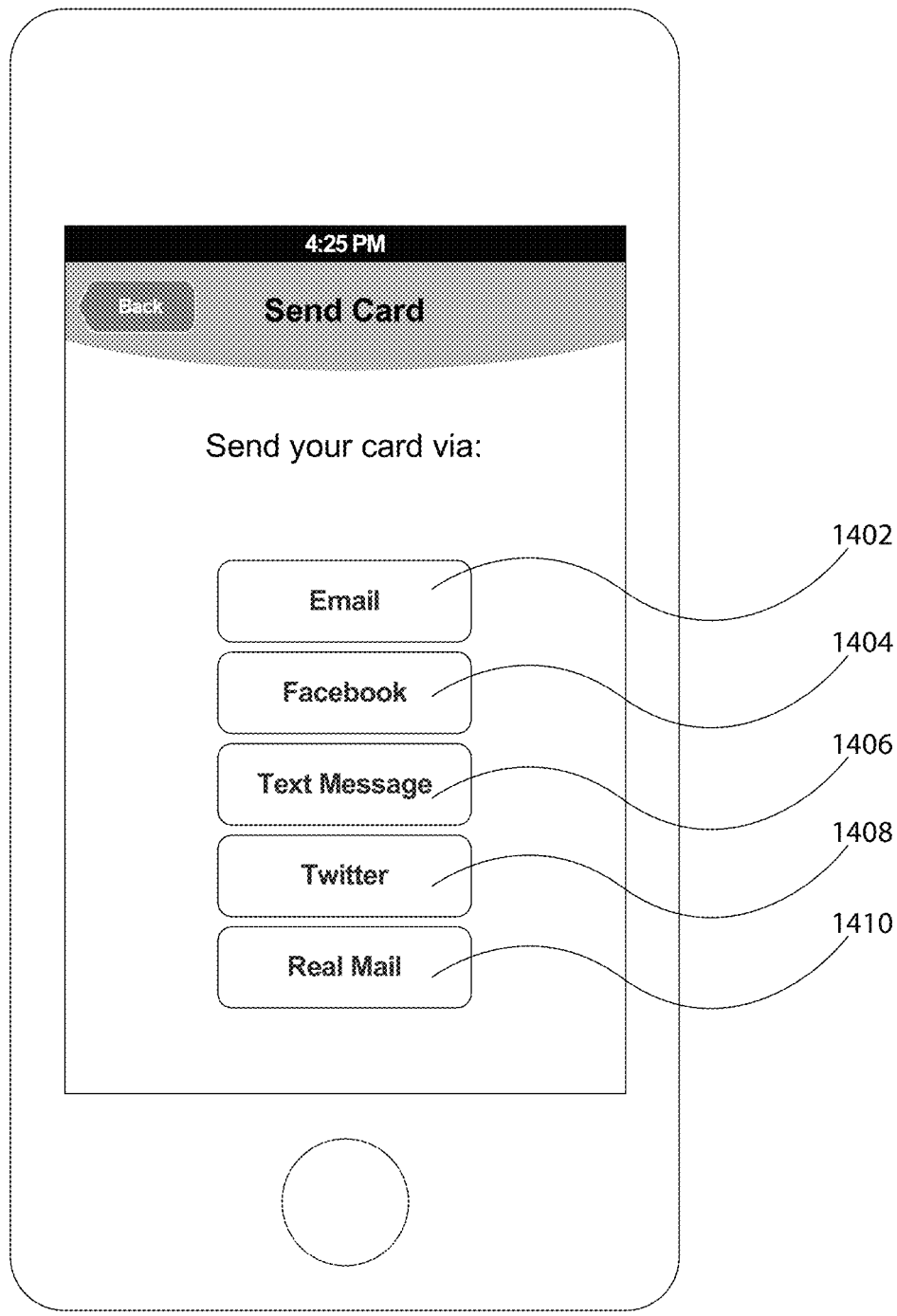

In one exemplary embodiment, the ecard app may allow the user to view the various options and media that may be used to send the electronic greeting card on the screen of the portable computing device. For example, with reference to FIG. 14, the user interface is a touch screen, and the user may single tap the email graphic icon 1402 to choose the 'Email Send' screen or single tap the Facebook® graphic icon 1404 to choose the 'Facebook Post' screen or single tap the Text Message graphic icon 1406 to choose the Text Send screen or single tap the Twitter® graphic icon 1408 to choose the 'Twitter Post' screen or single tap the Real Mail graphic icon 1410 to choose the 'Real Mail' screen. Of course, other social networking websites or any other delivery medium could be used as a choice in this menu.

Figure 15:
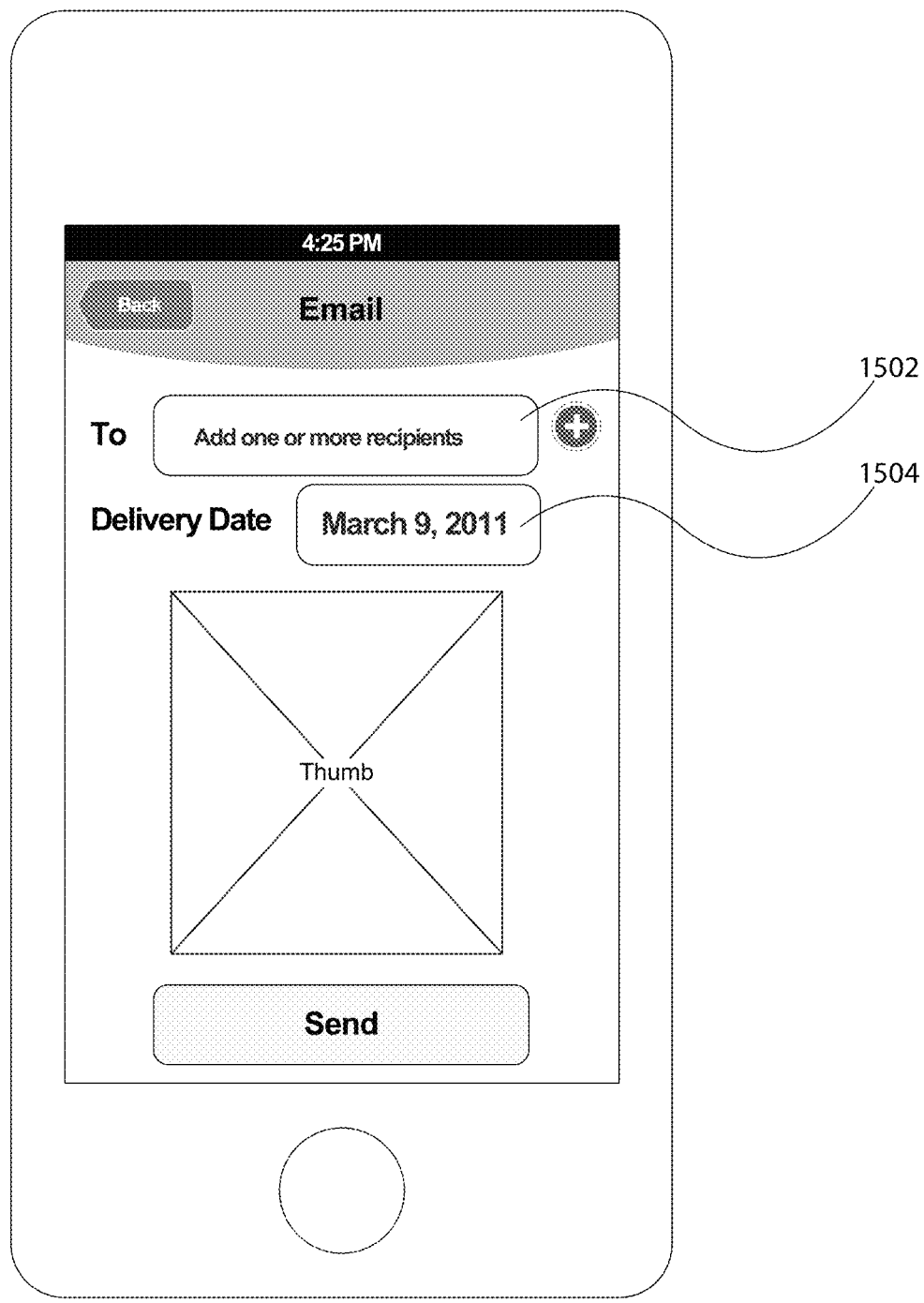

In one exemplary embodiment, the ecard app may allow the user to view the various options associated with sending the electronic greeting card as an email on the screen of the portable computing device. For example, with reference to FIG. 15, the user interface is a touch screen, and the user may single tap the 'To' graphic icon 1502 to choose the email address of the receiver of the electronic greeting card. The user may also add multiple email addresses in this field. The user may also choose a date 1504 to send the email or choose the default date provided by the app. The user may also choose a birthday for the receiver of the electronic greeting card. The user may tap the send graphic icon which sends the electronic greeting card to the recipient of the electronic greeting card over the internet. The user may also see a message which notifies the user of the send status of the electronic greeting card.

In one exemplary embodiment, the ecard app may allow the user to view the various options associated with sending the electronic greeting card to a social networking website such as Facebook®. For example, with reference to FIG. 16, the user interface is a touch screen, and the user may access the user's 'friends' 1602 on 'Facebook®' by tapping the 'My friend's wall' graphic icon 1604 on the user interface. Further, the user may choose a 'friend' from the list of friends 1602 on the Facebook screen, which then prepopulates said friend's name 1606 in the follow-up screen 1608 where the user may enter a personalized message 1610. Further, the user may 'post' the electronic greeting card on the wall of another user or non-user. Further, the user may personalize the 'post' on the 'friend's' wall by adding a message to the electronic greeting card by utilizing the standard operating system keyboard. The user may also see a message which notifies the user of the send status of the electronic greeting card.

Figure 17:
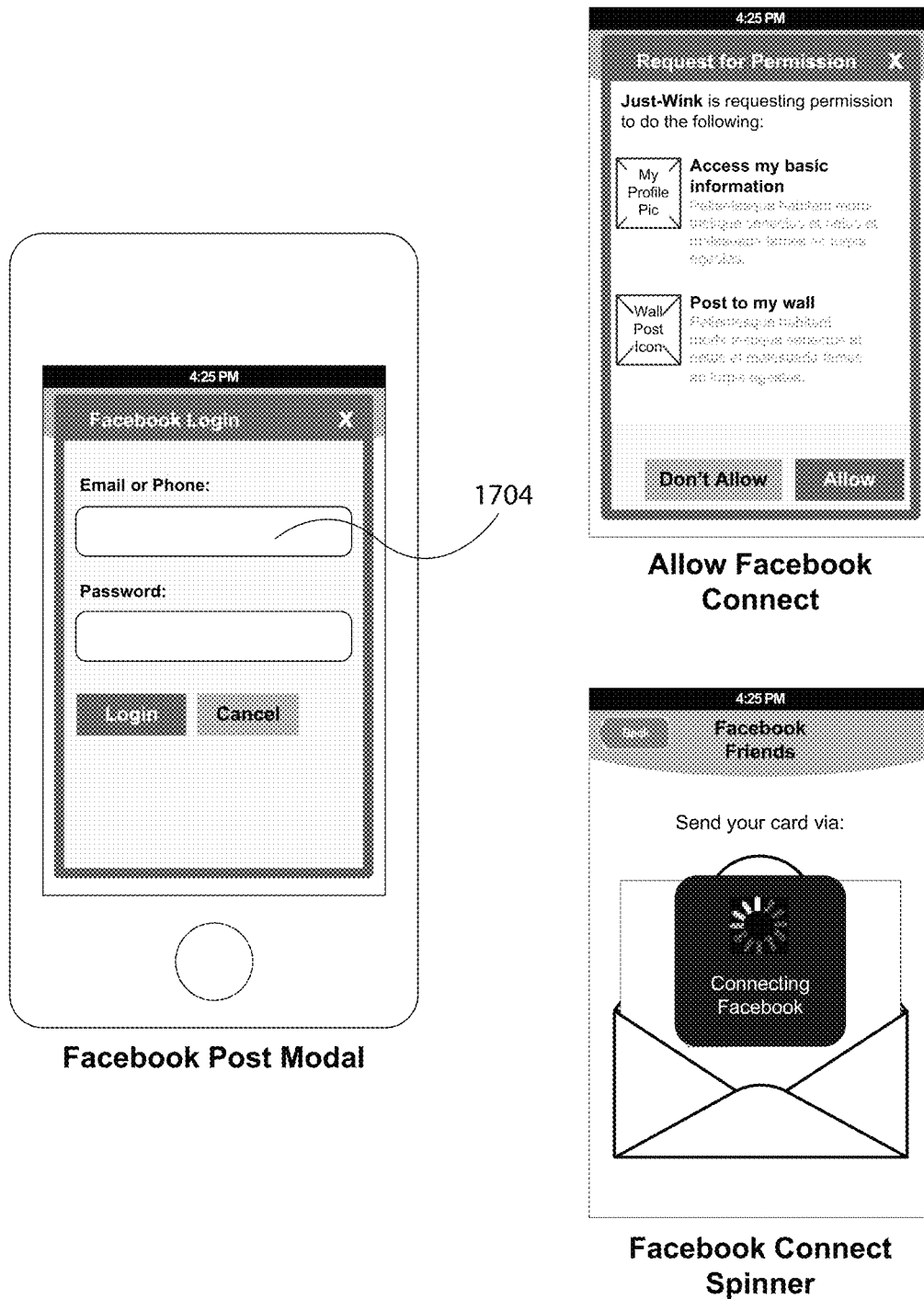

In one exemplary embodiment, the ecard app may allow the user to login to Facebook® with reference to sending the electronic greeting. For example, with reference to FIG. 17, the user interface is a touch screen, and the user may utilize the standard operating system keyboard to enter the email address, or phone 1704 associated with the Facebook® account and the password associated with the Facebook® account of the sender of the electronic greeting card. Further, with reference to FIG. 17, The options that are available to the user can be expanded at a later date and may include any options provided by 'Facebook Connect®', a service of Facebook®, or another social networking service or website.

Figure 18:
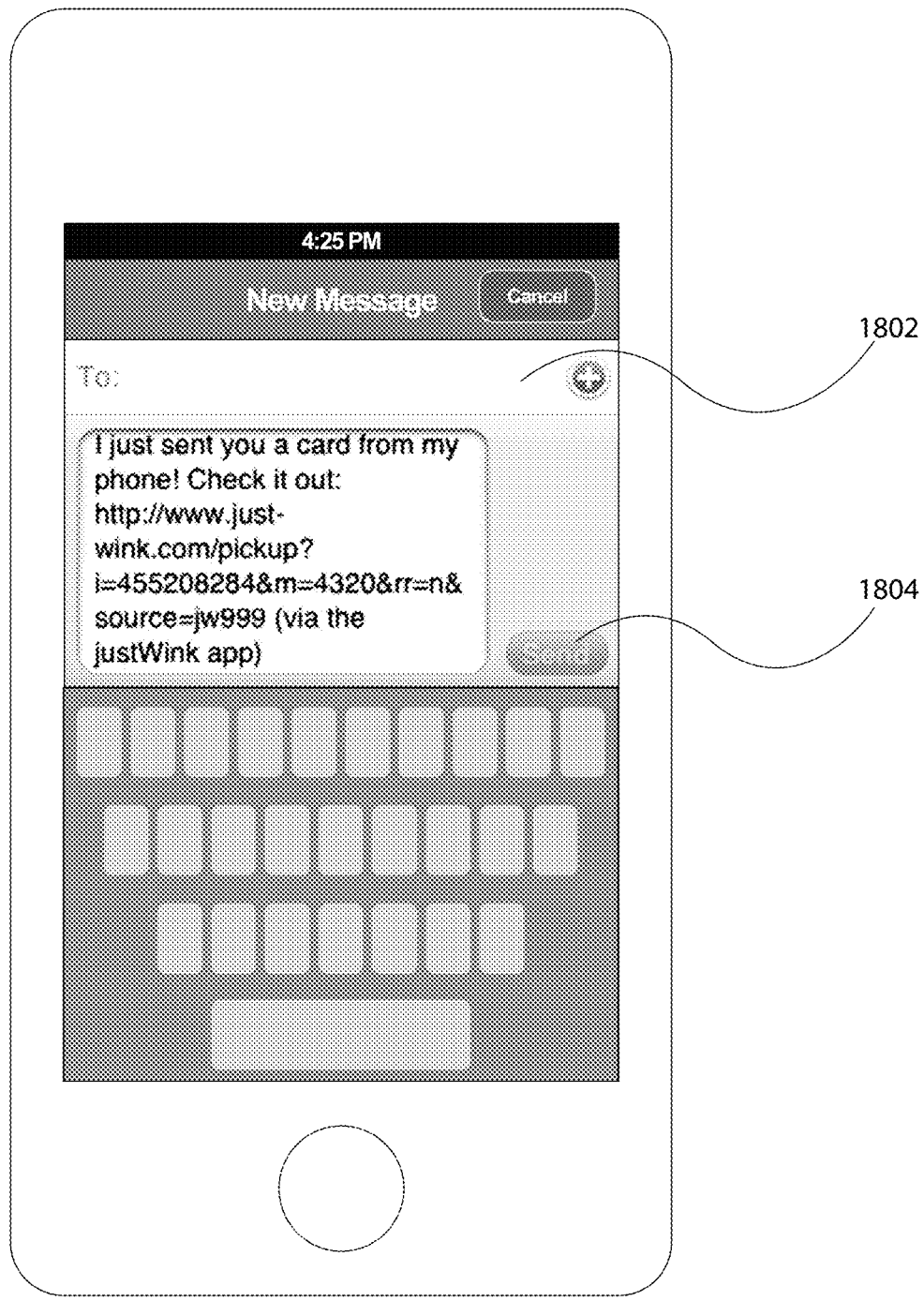

In one exemplary embodiment, the ecard app may allow the user to view the various options associated with sending the electronic greeting card utilizing the SMS Text Send on the screen of the portable computing device. For example, with reference to FIG. 18, the user interface is a touch screen, and the user may tap the 'To' field 1802 to open a numeric keyboard for the user to manually enter a phone number. The user interface may prompt the user of an invalid number if the phone number does not meet the field limits set by the user interface software program or the user interface app. The 'To' field 1802 may also allow the user to add multiple phone numbers either manually or via selecting phone numbers from the user's portable computing device utilizing the portable computing device's native phone number database, a phone book for instance. The user may send the electronic greeting utilizing the SMS Text Send service by tapping the Send graphic icon 1804. The user may also see a message which notifies the user of the send status of the electronic greeting card.

Figure 19:
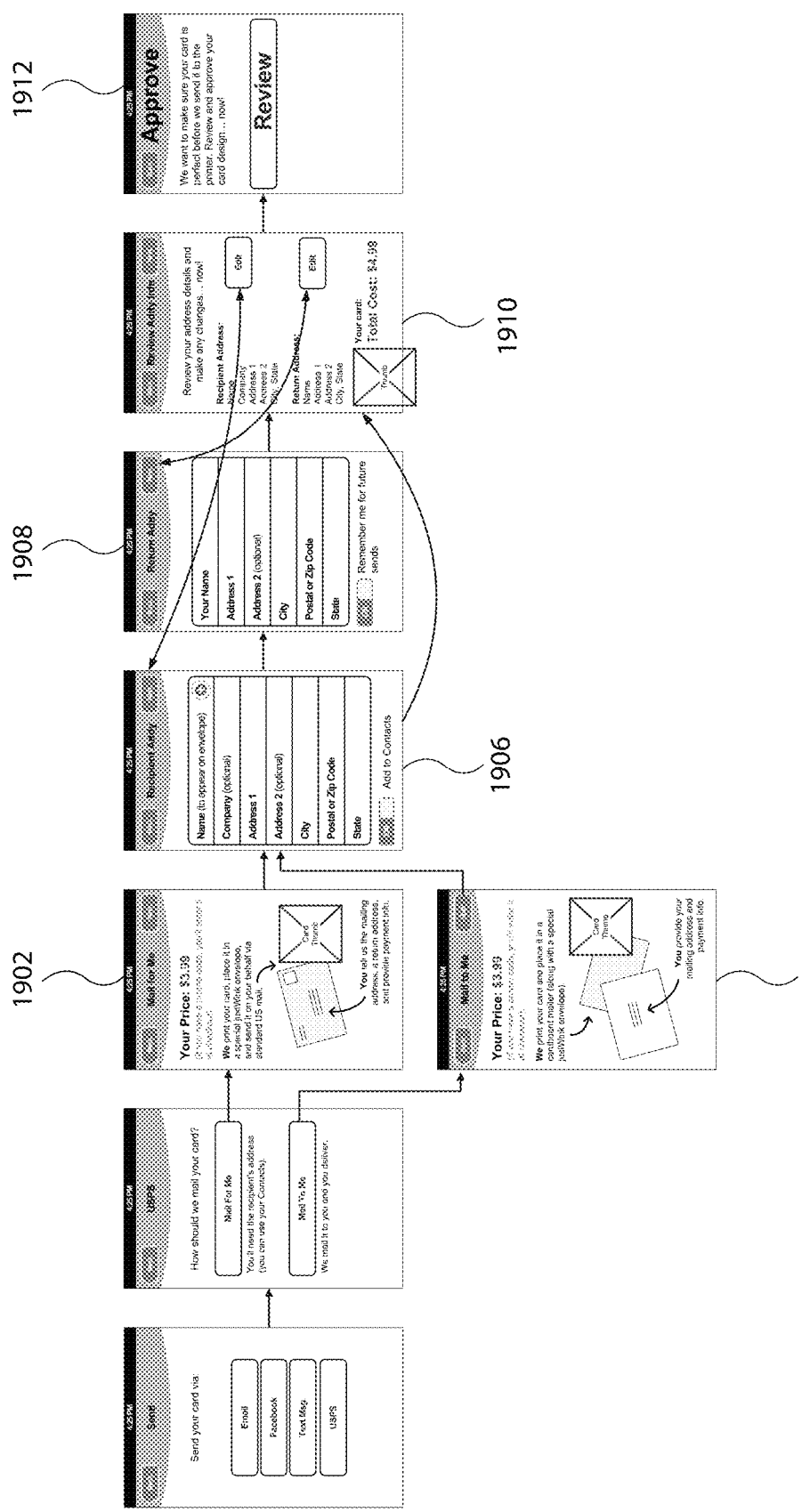

In one exemplary embodiment, the ecard app may allow the user to send the electronic greeting card to a recipient by utilizing an option on the screen of the portable computing device. For example, with reference to FIG. 19, the user interface is a touch screen, and the user may select an option from 'Mail for Me' 1902 or 'Mail to Me' 1904. This option allows the user to have the electronic greeting card printed as a conventional paper card and sent to the user or recipient by the conventional U.S. Mail. In either option, the user is initially prompted to enter address details 1906 of the recipient. The user is further prompted to enter address details 1908 of the user. The user is then prompted to review the address details of both the recipient and the user at 1910, with a further option to review 1912 and approve the personalized greeting card.

Figure 20:
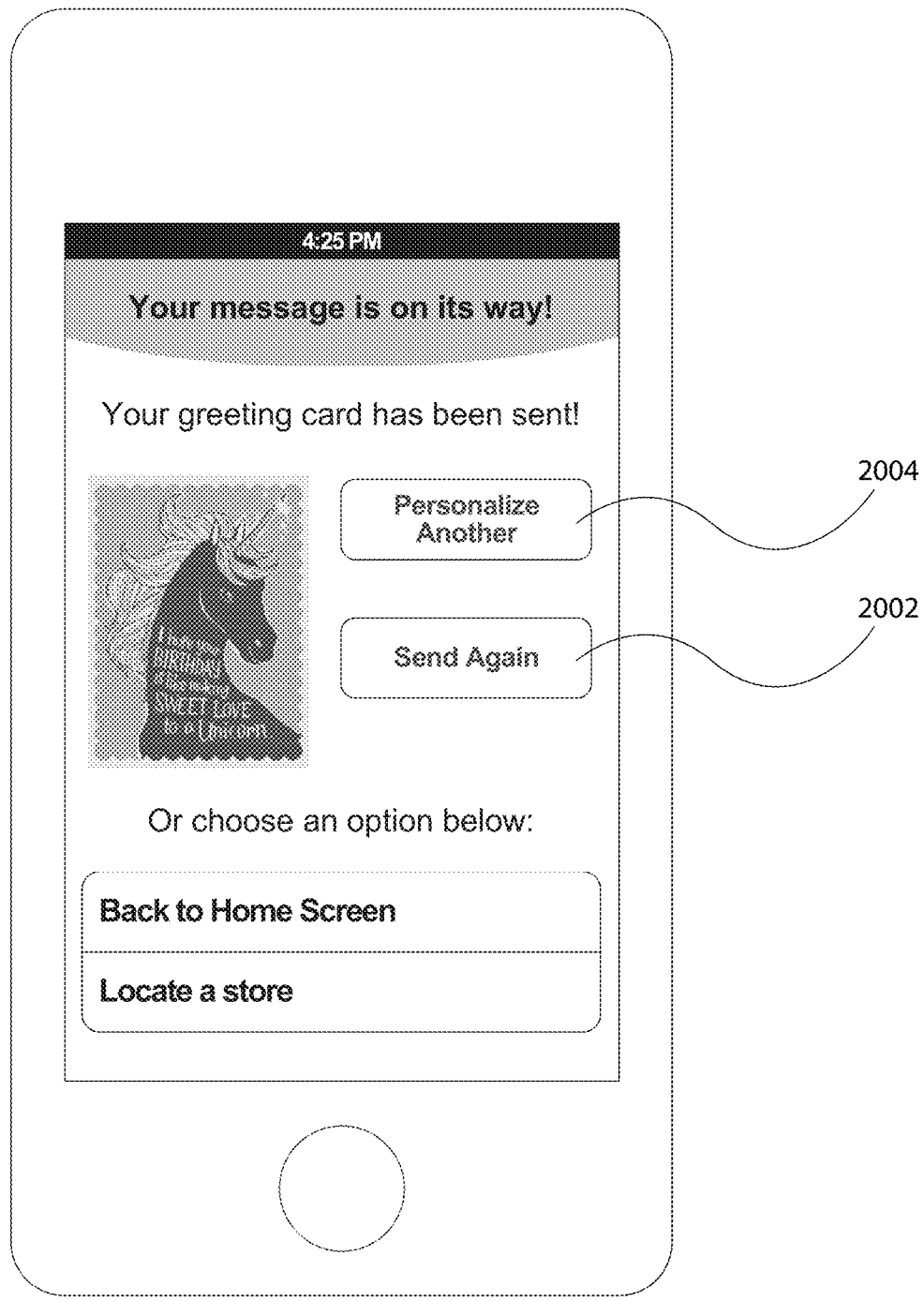

In one exemplary embodiment, the ecard app may allow the user to send the electronic greeting card to multiple users by utilizing an option on the screen of the portable computing device. For example, with reference to FIG. 20, the user interface is a touch screen, and the user may tap the 'Send Again' graphic icon 2002 to send the same electronic greeting card to other users and non-users. The user may also choose to send a previously personalized electronic greeting card to another or the same recipient, by further personalizing the electronic greeting card, as illustrated by 'Personalize Another' 2004 in FIG. 20.

Figure 21:
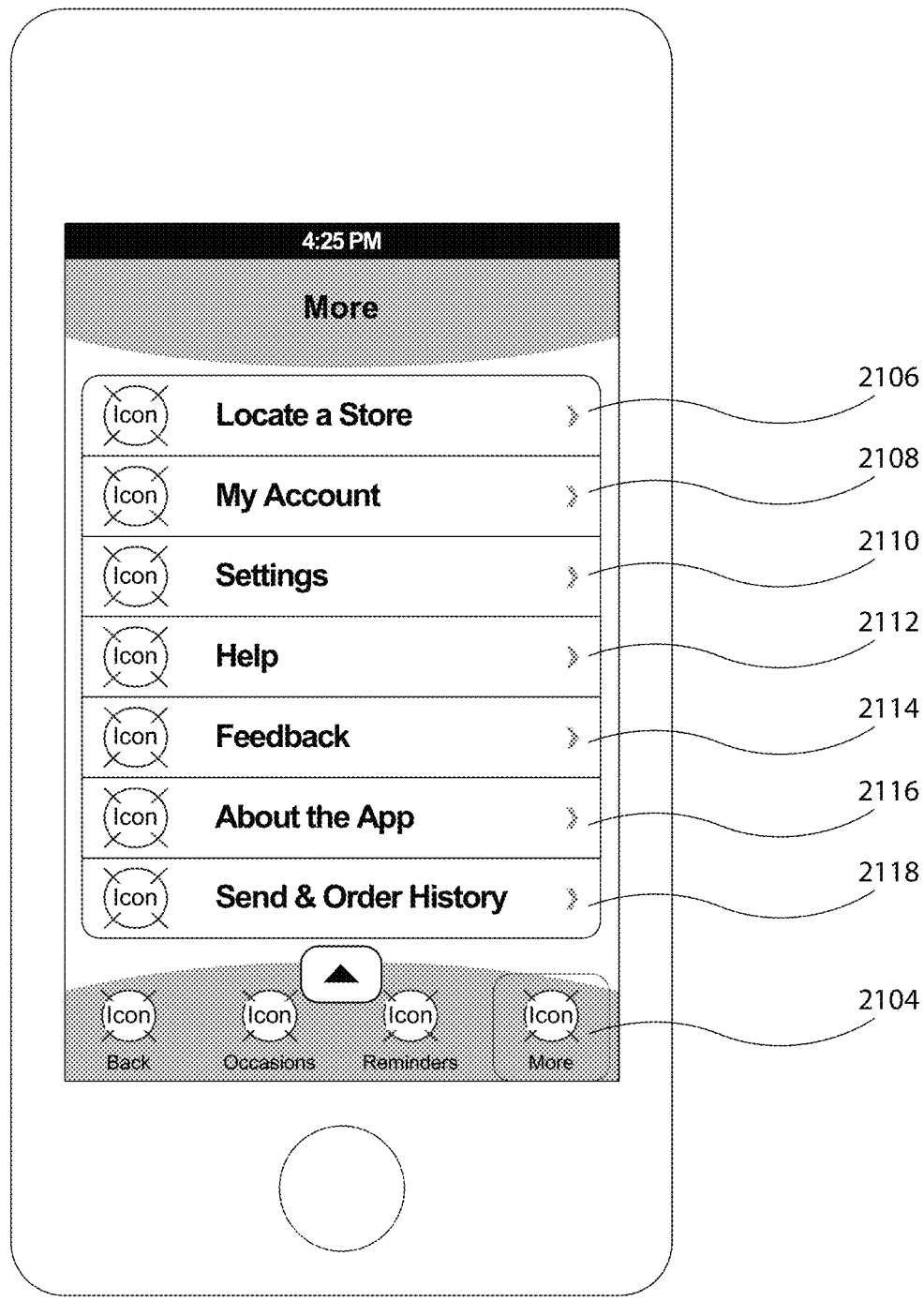
Figure 33:
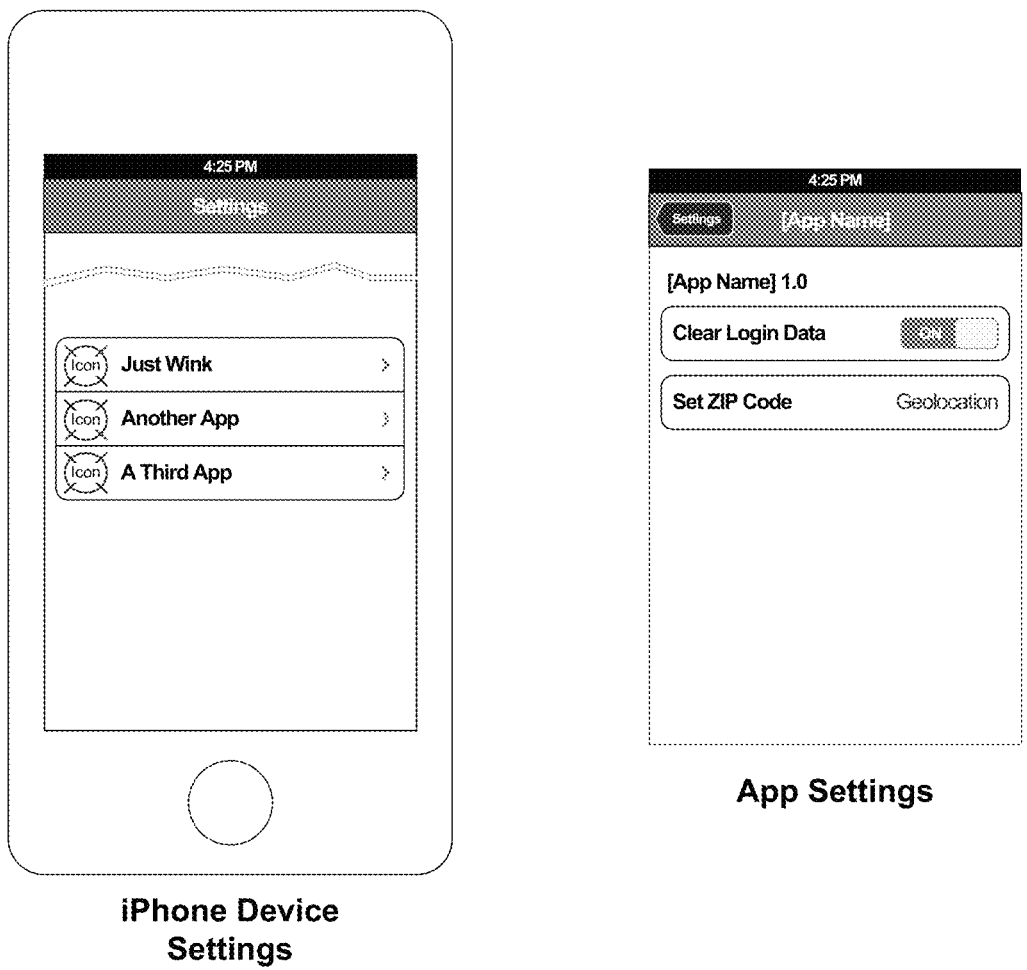

In one exemplary embodiment, the ecard app may allow the user to view and use the electronic greeting service's information by utilizing an option on the screen of the portable computing device. For example, with reference to FIG. 21, the user may view a list of service information by selecting a 'More' graphic icon 2104. A single tap of the 'Locate a Store' graphic icon 2106 takes user to the Store Locator screen, a described in FIG. 22. A single tap of the 'My Account' graphic icon 2108 takes the users to the Account Management screens as described in FIG. 24. A single tap of the Setting graphic icon 2110 takes the users to a Setting screen as shown in FIG. 33. A single tap of the Help graphic icon 2112 takes the users to the Help screen as shown in FIG. 29B. A single tap of the Feedback graphic icon 2114 takes the users to the Survey screen as shown in FIG. 29C. A single tap of the About the App graphic icon 2116 takes the users to the About the App screen as shown in FIG. 29A. A single tap of the Sales and Order History graphic icon 2118 takes the users to a Send an Order History screen as described in FIG. 28.

In one exemplary embodiment, the user may wish to locate a store by utilizing an option on the screen of the portable computing device. For example, with reference to FIG. 22, the user interface is a touch screen, and the user may input a zip code 2202 using the standard on-screen keyboard 2204, to view a list of all stores 2206 in the user's geographic proximity, as defined by the software program or as defined by the app. In one embodiment, the user has the option to view a list of stores 2206 that sell paper greeting card versions of the electronic greeting cards available within the ecard application. The user may also tap the Map graphic icon to view the listed results as pin points on a map and may also tap the Map graphic icon to view a single result as a pin point on the map. The user may also tap a list item to see a detailed view of the result's information, as illustrated in screen 2220. The user may also tap and hold the result to view the options associated with the result, such as 'View Location Details' and 'Show Driving Directions.' The ecard app may prompt the user to give permission to use the user's existing location on the geographic GPS positioning system or by way of the user's proximity to a telecommunications tower to locate stores in the geographic proximity of the user. The ecard app may also disable the prompt after three affirmative responses from the user to the said prompt.

Figure 23:
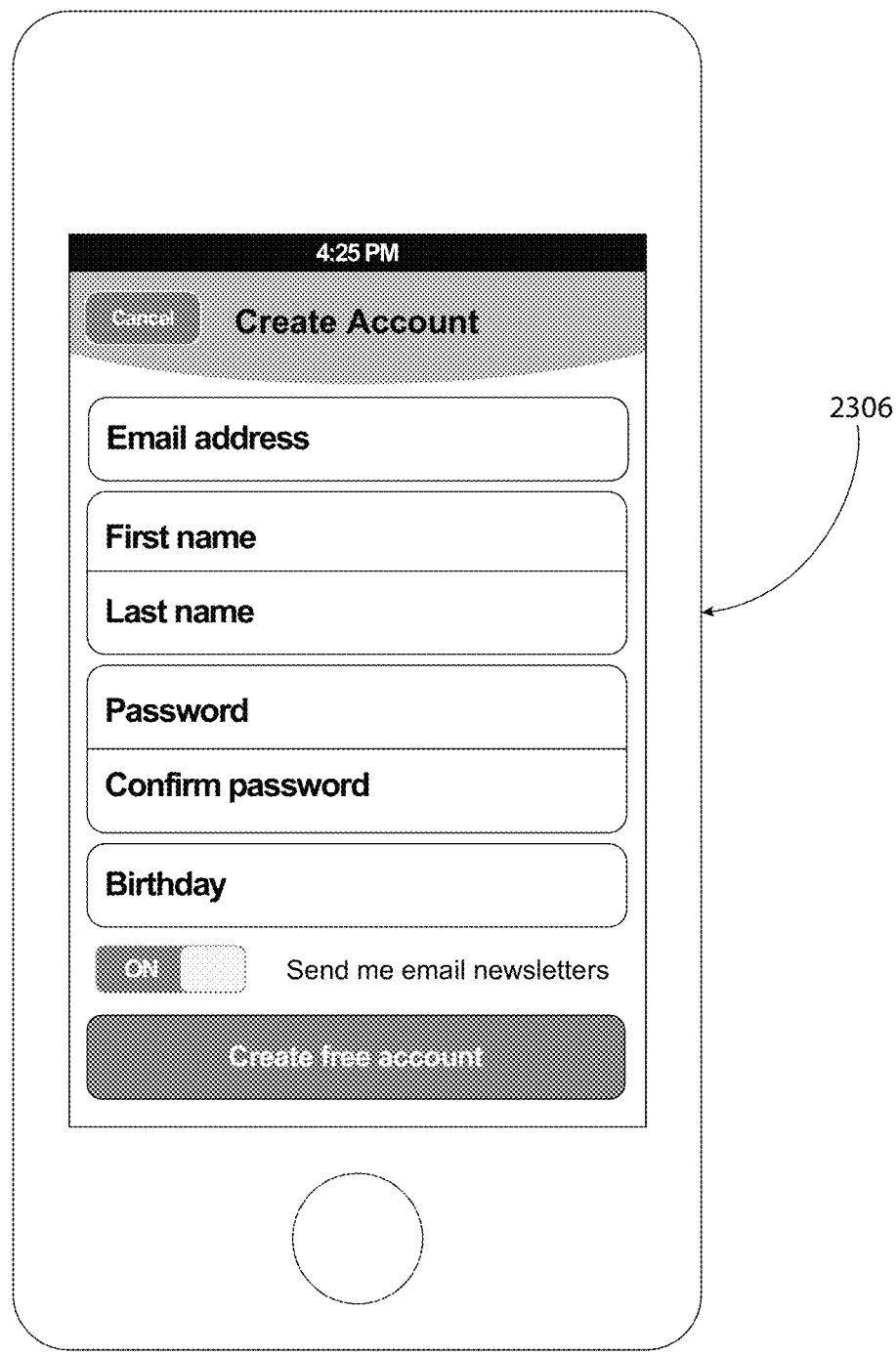
Figure 24:
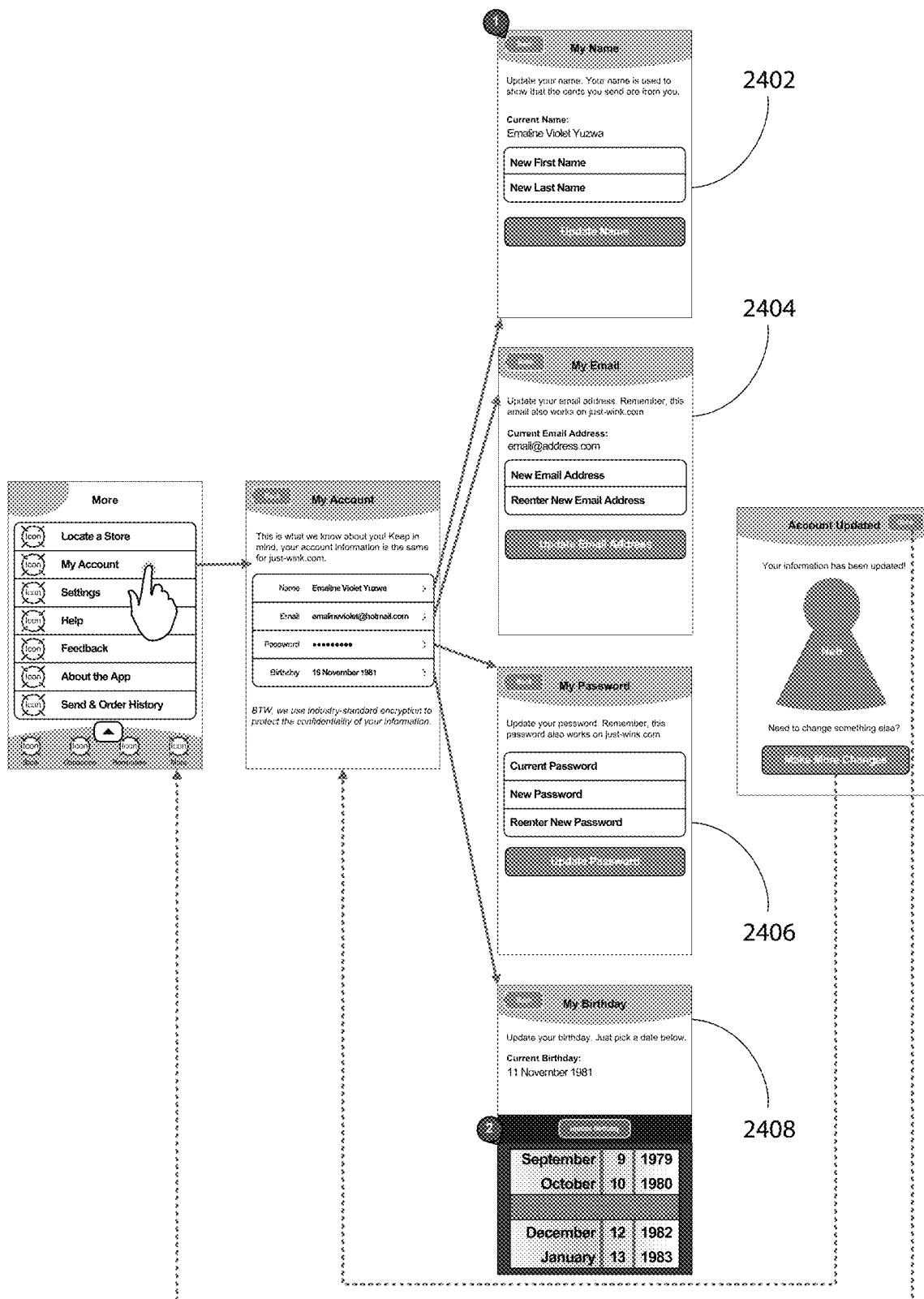
Figure 25:
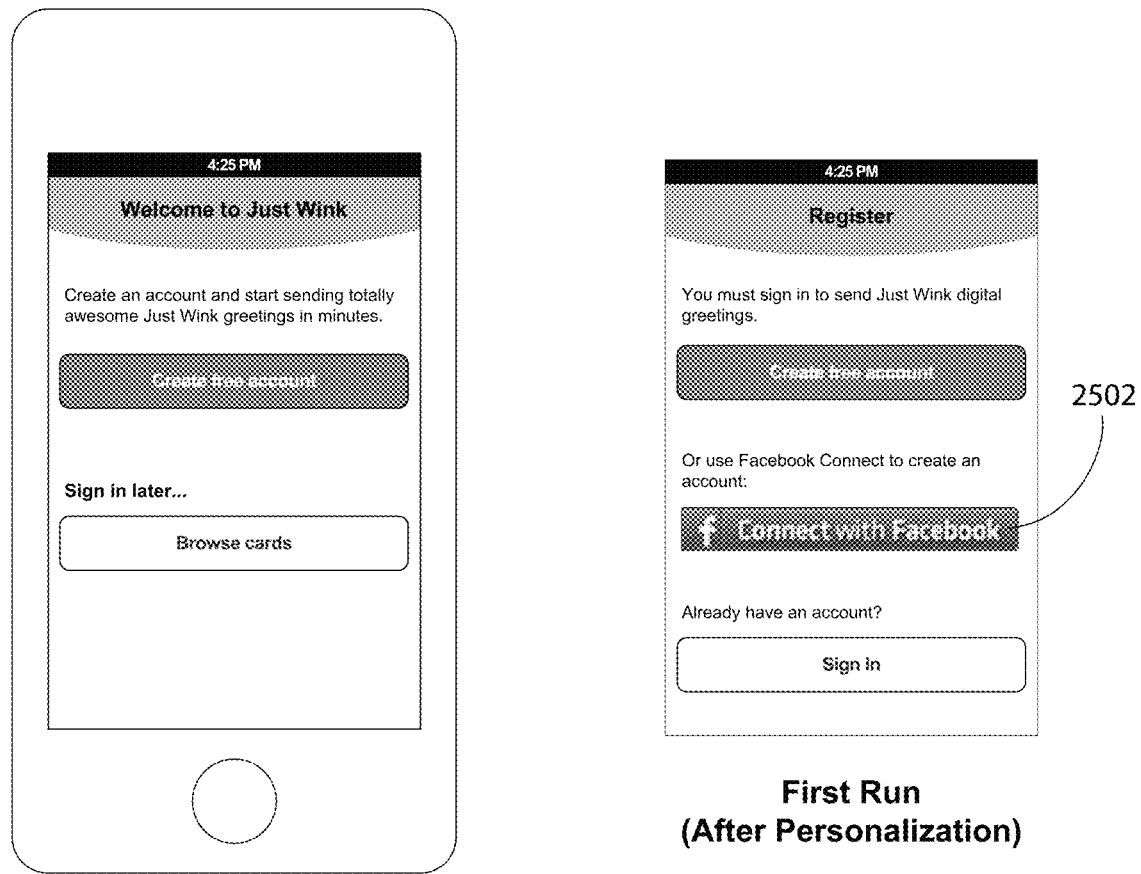
Figure 26:
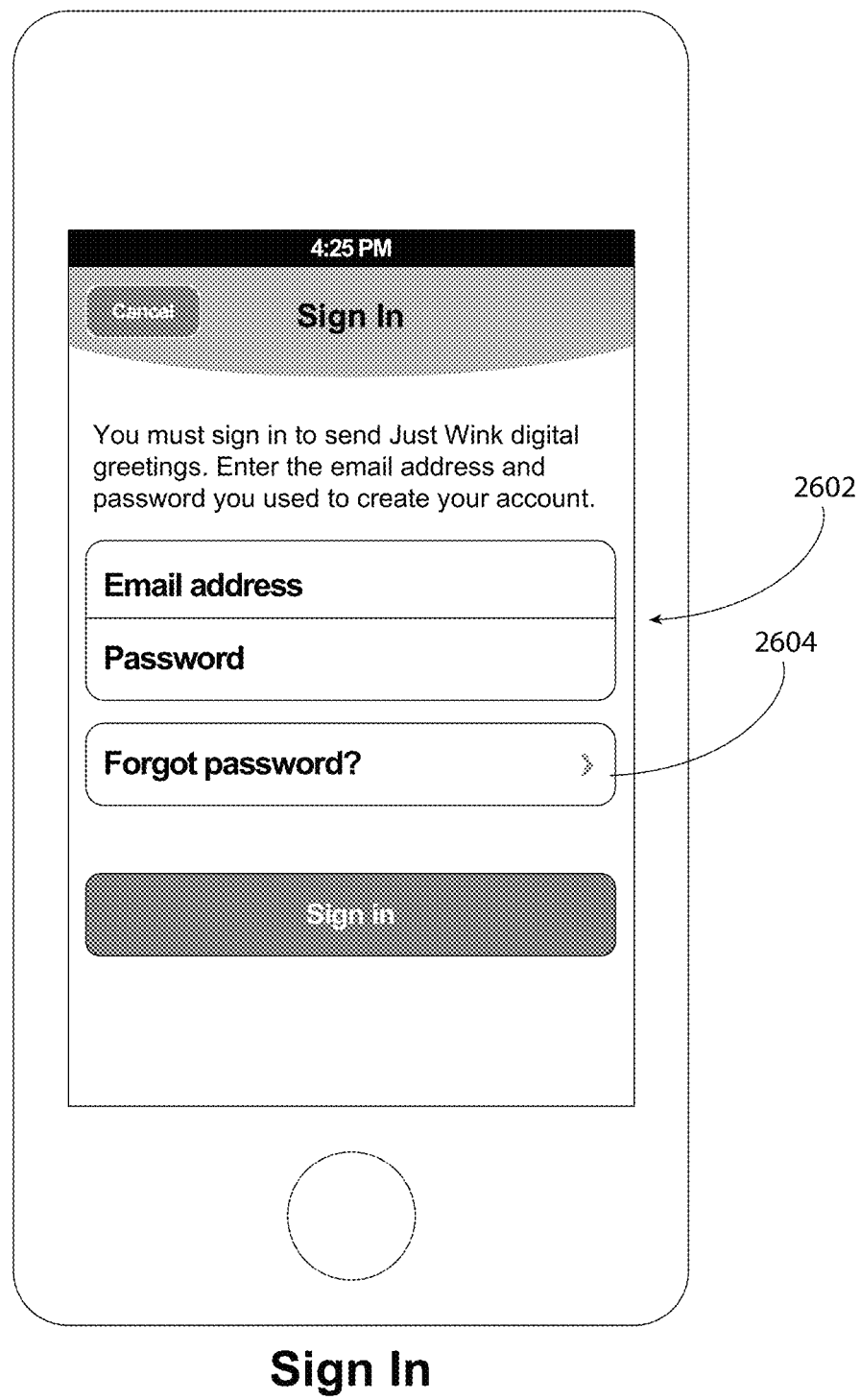
Figure 27:
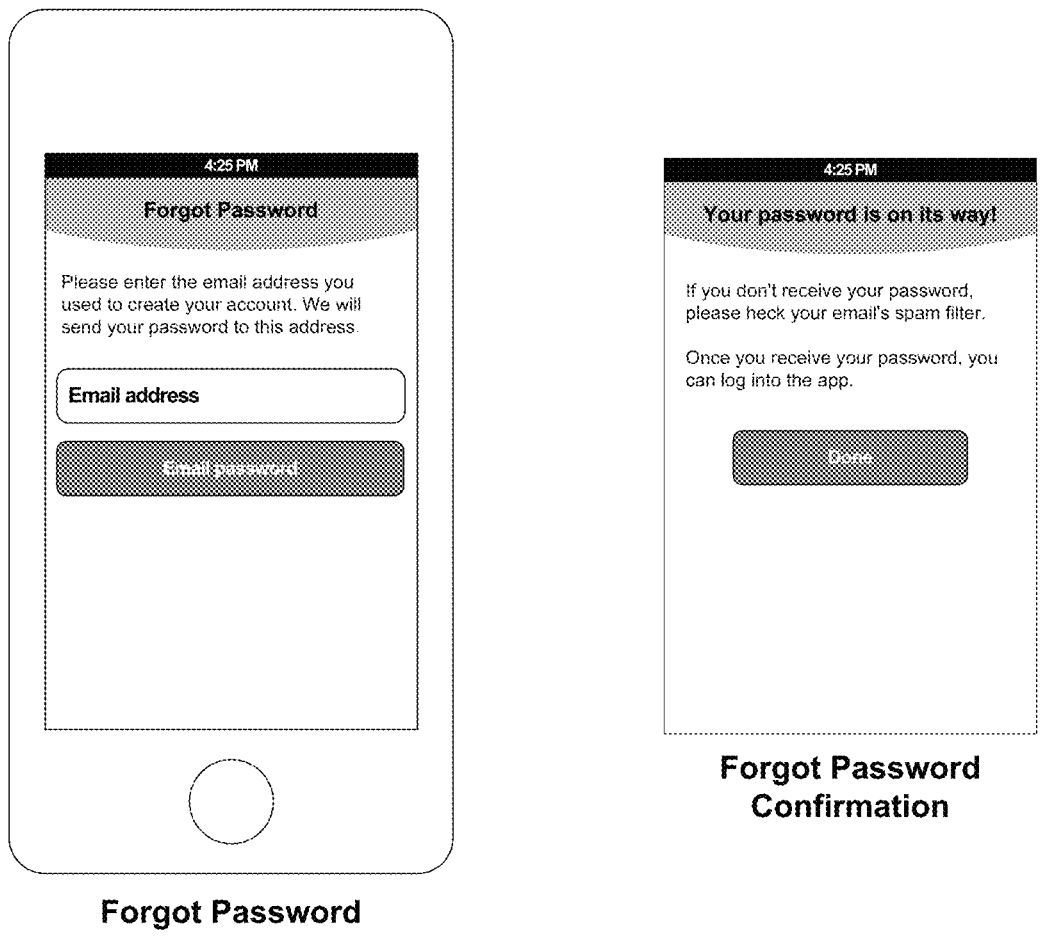

In one exemplary embodiment, the ecard app may allow the user to create a user account, or to browse electronic greeting cards, or to login using Facebook® or other social networking website, or login to an existing user account or request a replacement password by utilizing a corresponding option on the screen of the portable computing device. For example, with reference to FIGS. 23 through 27, the user may choose to create an account by providing the user interface with an email address, first name, last name, password and a birthday (collectively, 2306); all of which might be chosen using the operating system's native keyboard platform. Options to allow the user to sign up for a newsletter, or to catch errors while registering are also provided. The user may also choose to create an account by utilizing the 'Facebook Connect®' feature 2502 which links the software program or the mobile app with the developer tools provided by 'Facebook®'. The user may also choose to login to the electronic greeting service by entering the login information 2602 created in the said Create step above in FIG. 23. The user may also choose to request the electronic greeting service to email the user a copy of the password by utilizing the 'Forgot Password' feature 2604 provided by the software program or the mobile app (See FIG. 27 for further illustration). In one embodiment, as shown in FIG. 24, the user also has the option to revise and edit their name 2402, email address 2404, password 2406, and the birthday 2408, entered either in the Create step of FIG. 23, or entered through any subsequent logins to the ecard app.

In one exemplary embodiment, the ecard app may allow the user to view the user's account information, particularly order history, by utilizing an option on the screen of the portable computing device. For example, with reference to FIG. 28, the user interface is a touch screen, and the user may utilize the 'My Cards' feature to view a list of sent and/or scheduled cards 2806 under each occasion and sub category. A vertical swipe of the list of sent and/or scheduled cards reveals older items under each of the occasions or sub categories. The user may also choose to delete electronic greeting cards from this menu at 2804. Deleting a scheduled card stops the card from being sent in the future, in addition to removing it from the current list on display.

In one exemplary embodiment, the ecard app may allow the user to view more information about the application, to view helpful answers to frequently asked questions, and to interact with the ecard app via a feedback/survey mechanism. With reference to FIG. 29A, the user interface is a touch screen, and the user may utilize the on-screen graphic icons to view information pertaining to the electronic greeting card service, including, but not limited to, About the product/company 2904, Terms of Service of the Mobile Application 2906, Privacy Policy 2908 of the service and the Mobile Application, as well as other legal, technical and corporate information as is made available to the user in the future. With reference to FIG. 29B, the user interface is a touch screen, and the user may utilize the on screen graphic icon to find answers 2910 to frequently asked questions. With reference to FIG. 29C, the user interface is a touch screen, and the user may utilize the on screen graphic icon to render feedback or participate in a survey 2916 for the ecard app.

Figure 30:
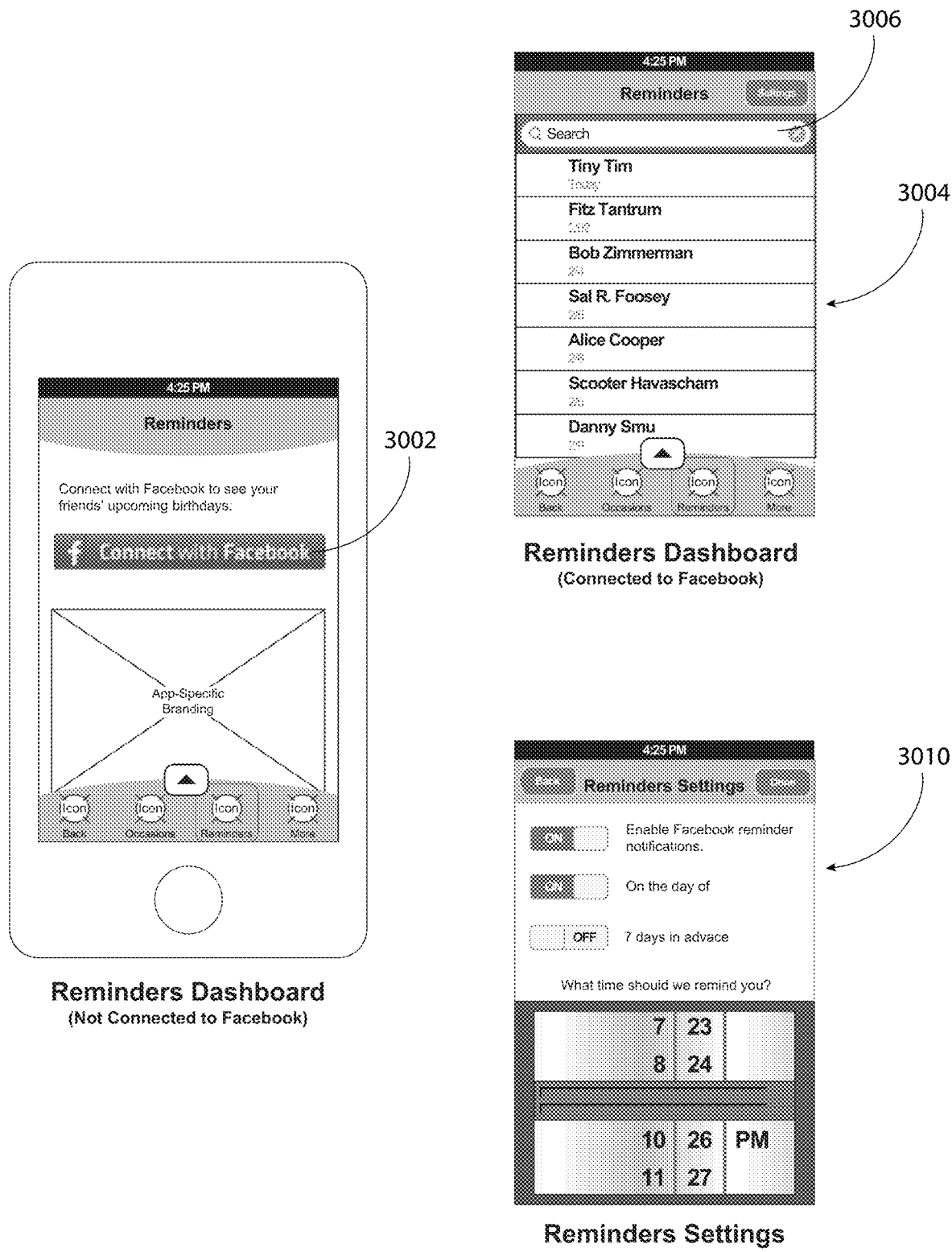

In one exemplary embodiment, the ecard app may allow the user to open the 'Connect with Facebook®' prompt to personalize and login to the electronic greeting service using the Facebook login credentials. With reference to FIG. 30, the user may use the operating system's native keyboard function to login to Facebook® using Facebook Connect® 3002 and to view and search 3006 a list of the user's 'Friends' 3004 on Facebook®. The user also has the ability to narrow down the list of Friends 3004 by selecting from an Auto-Suggest feature of Facebook®. The user may also choose to display the list of Friends in either ascending or descending order of the Birthday, with the dates calculated by the software program to be the closest or farthest date from today's date respectively. The user has the ability to set reminders 3010 to enable Facebook® to send reminders to the user based on a friend's birthday on Facebook®. Further, the user has the ability to set reminders 3010 such that the user receives a notification of the reminder from outside the ecard application. The notification of the reminder may be set at varying time intervals, for example, a notification on the day of the reminder, and a notification seven days in advance of the reminder.

Figure 32:
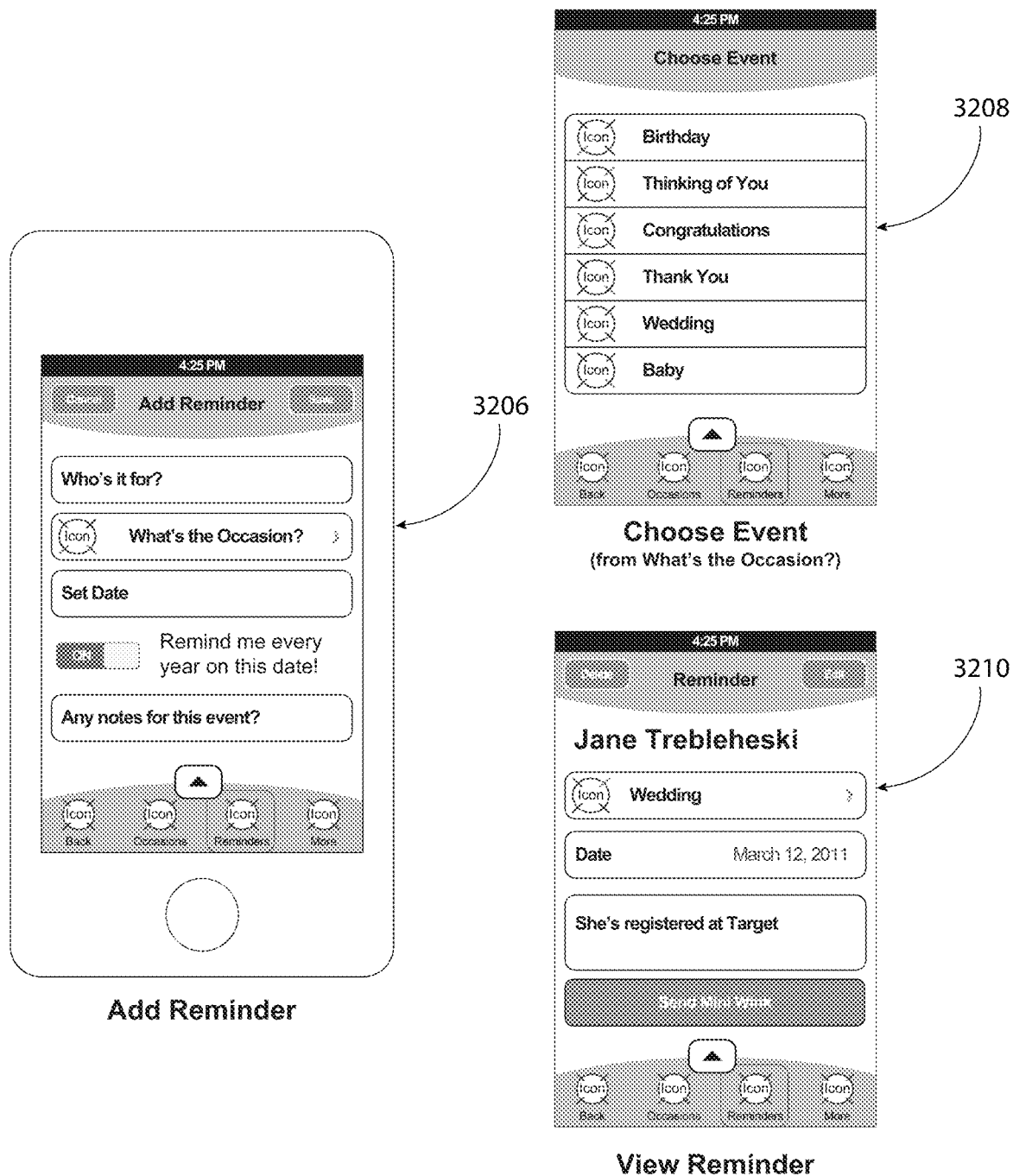

In one exemplary embodiment, as referenced in FIG. 31, the ecard app may allow the user to view reminders created locally 3102 in the ecard app, as well as via the Facebook® application 3104. As referenced in FIG. 32, the ecard app also allows the user to create a reminder 3206, add an associated event to the reminder 3208, and viewing the reminder 3210.

FIG. 33 shows an exemplary embodiment of ecard app's settings, including the settings as they pertain to a portable computing device's operating system and to the ecard app.

Figure 34:
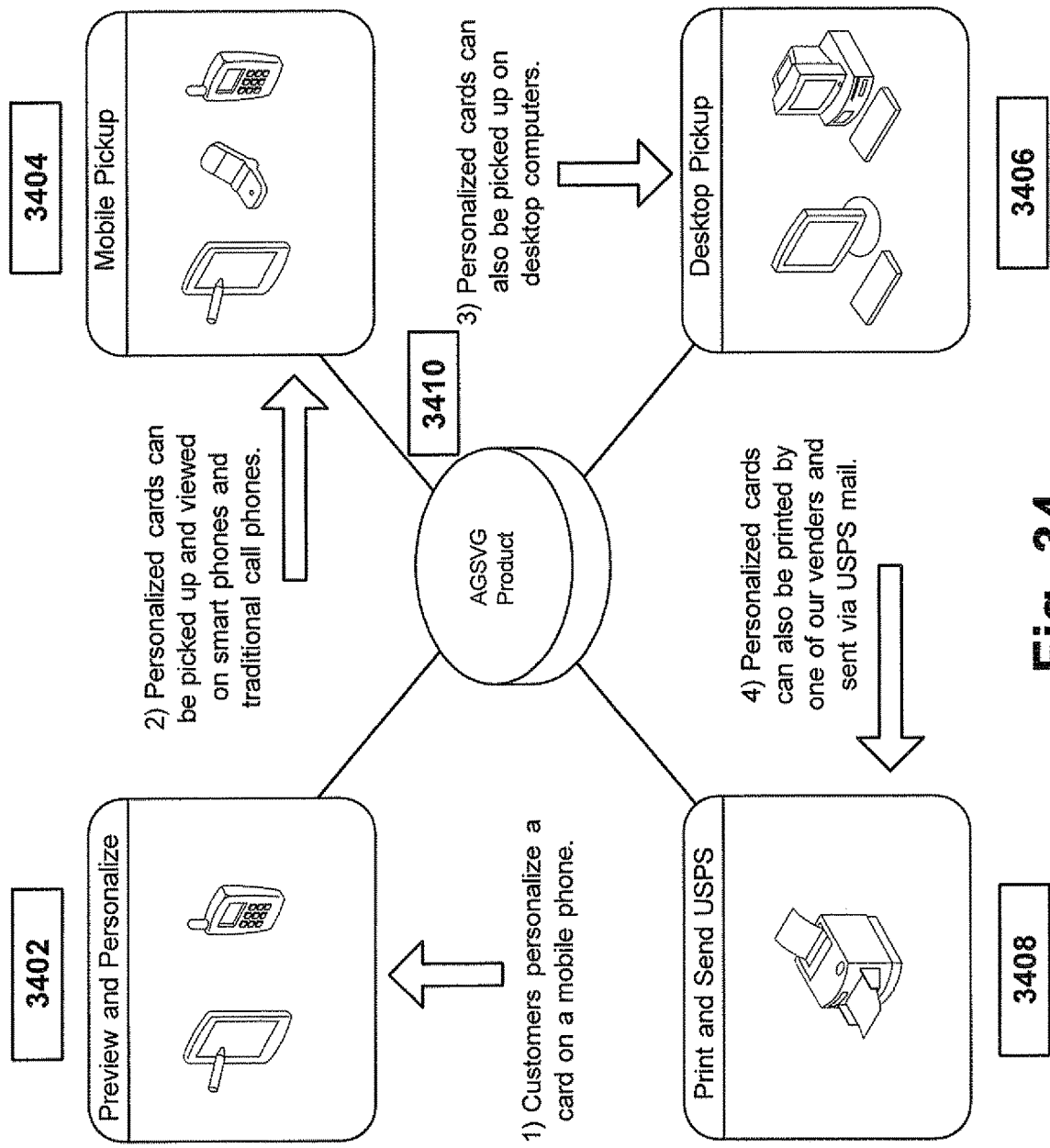
FIG. 34 depicts a flow diagram for electronically personalizing and delivering electronic greeting cards over the internet.

FIG. 34 describes the potential life cycle of an electronic greeting card as illustrated in the ecard app. As described in FIG. 34, the ecard app allows the user to preview and personalize an electronic greeting card at 3402. The personalized electronic greeting cards may be picked up by and interacted with the recipient users on their mobile devices, at 3404, or on their desktop computers, at 3406. ecard app also allows the users to receive personalized greeting cards through the United States Postal Service (USPS), as shown at 3408. The interactions between the personalization and viewing of the electronic greeting card is facilitated by the API and SVG content, 3410, described earlier with reference to FIG. 5.

Figure 35:
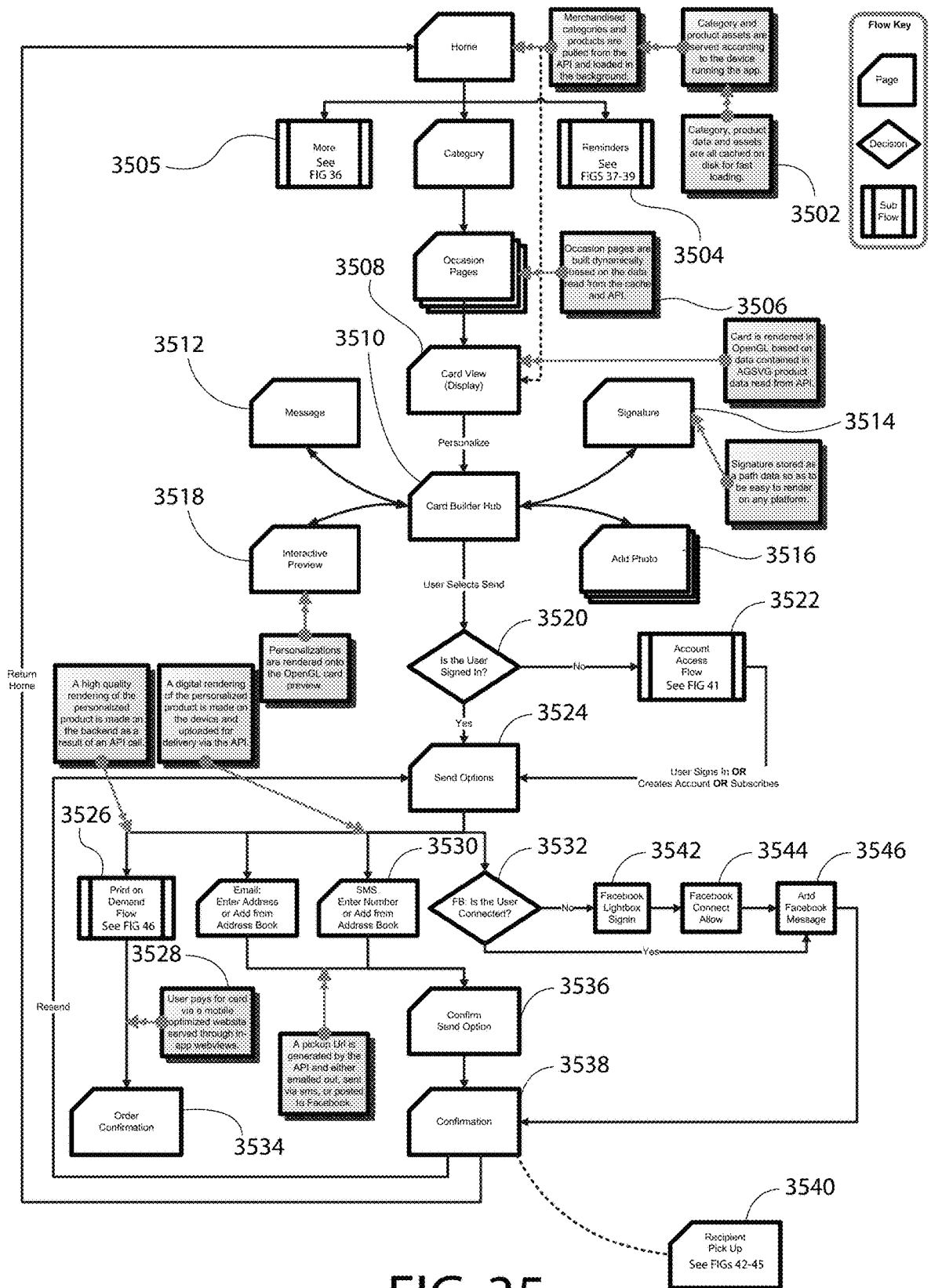
FIGS. 35 through 46 show several flow diagrams which describe the application and logic flow in the ecard app.

FIG. 35 is a flow chart describing the "Send Flow" in the ecard app. At 3502, category, product data and content or assets are all cached on the portable computing device's disk for fast loading. Further, the category and product assets are served according to the device running the ecard app and the merchandised categories of cards are pulled from the API and loaded in the background. This is the 'Home' screen. In addition to viewing the Categories of cards, the user has an option to either login to the Reminders area 3504 (See FIG. 37-39), or to view additional information in follow-up pages 3505 (See FIG. 36). At 3506, the Occasion pages are built dynamically based on the data read from the cache and the API. At 3508, a single selected electronic greeting card is presented for view. At 3510, the user enters the Personalization step by entering into the Card Builder Hub. At 3512, the user personalizes the 'message' portion of the electronic greeting card. At 3514, the user personalizes the 'signature' portion of the electronic greeting card. At 3516, the user personalizes the 'photo' portion of the electronic greeting card. At 3518, the user is presented with an interactive preview of the personalized electronic greeting card. If the user chooses to send the personalized greeting card at 3518, the user progresses to 3520, where the user's sign on status is checked. If the user is not signed in, the user access flow at 3522 is described by FIG. 41.

Figure 41:
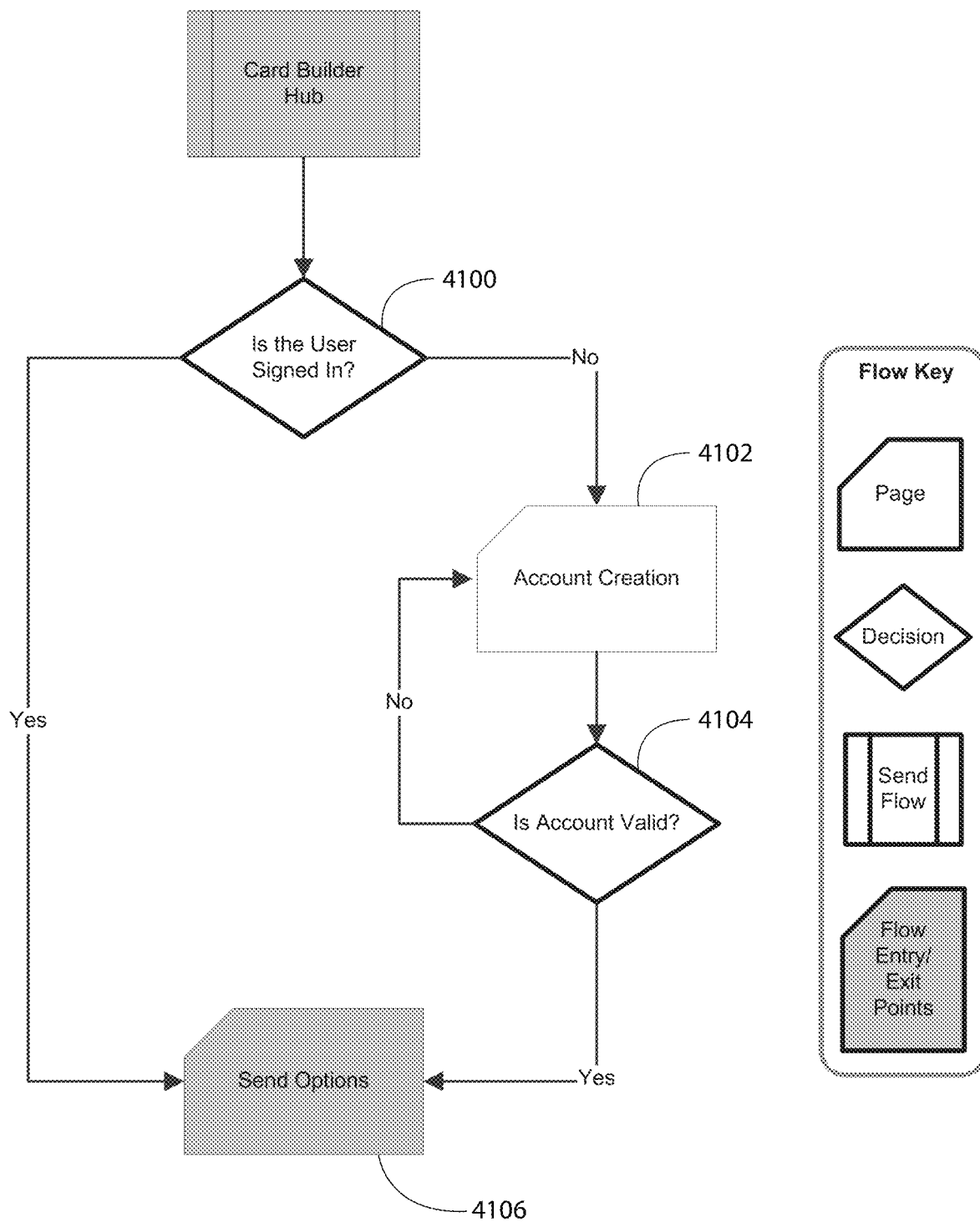

As described in FIG. 41, if a user, who chooses to send the personalized greeting is signed in, the user is directed to the Send Options 4106, which is further described in FIG. 35, at step 3524. If a user, who chooses to send the personalized greeting is not signed in, at 4100, the user is directed to create a new account at 4102. The new account is checked for validity at 4104, failing which, the user is directed back to 4102. If the new account's validity is checked positively, the user is directed to the Send Options 4106, which is further described in FIG. 35, at step 3524.

Figure 46:
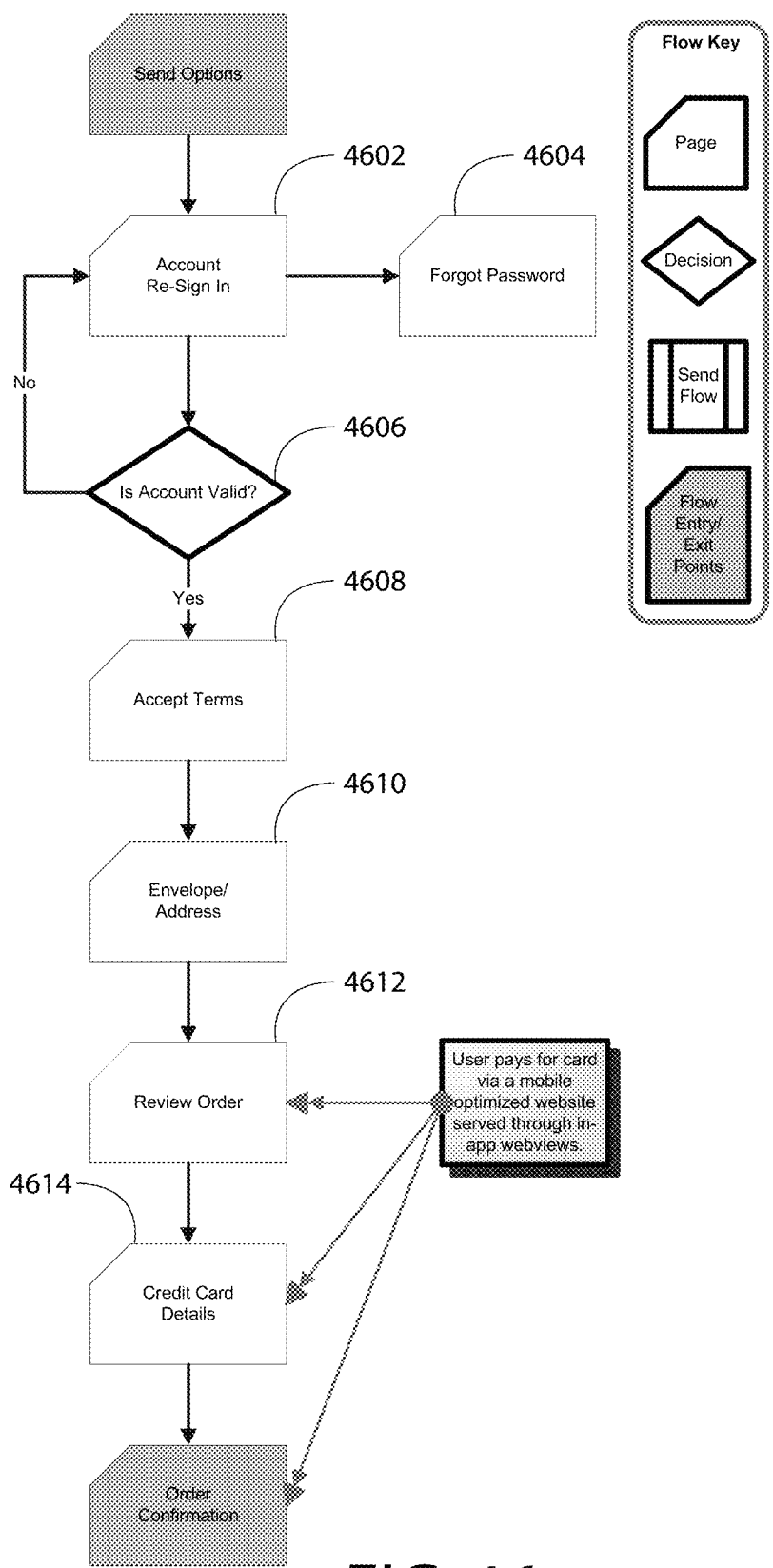

With reference to step 3524 in FIG. 35, the user is presented with an option to Print on Demand at 3526. The Print on Demand option is further discussed in FIG. 46. As described in FIG. 46, the user is prompted to sign in to the ecard app account at 4602. A 'Forgot Password' feature is made available to the user at 4604. If the user account validity is checked positively at 4606, the user is moved along to 4608, where the user is prompted to agree to the terms of service of the ecard app. If the user account validity is checked negatively at 4606, the user is moved back to 4602 for re-signing in to the user's ecard app account. At 4608, the user is prompted to accept the terms of the ecard app, accepting which, the user is moved to 4610, where the user enters sender and receiver address information. At 4612, the user reviews the order and pays for the order at 4614. The order confirmation step 3534 ends in the flow diagram in FIG. 35.

In FIG. 35, the user is presented with an option to send the electronic greeting card via email at 3528. The user is prompted to confirm their choice of send medium (email) at 3536, and a confirmation of the sent email is received at 3538. Similarly, the user is presented with an option to send the electronic greeting card via SMS (text message) at 3530. The user is prompted to confirm their choice of send medium (email) at 3536, and a confirmation of the sent email is received at 3538. In either option, when a receiving user picks up the electronic greeting card at 3540, confirmation of pickup is transmitted back to the user via step 3538.

With further reference to FIG. 35, the user is presented with an option to send the electronic greeting card via Facebook® or some other social networking website at 3532. If the user is connected to Facebook®, the user is prompted to enter their personal message at 3546. If the user is not connected to Facebook®, the user is prompted to sign into the service at 3542 and 3544.

Figure 36:
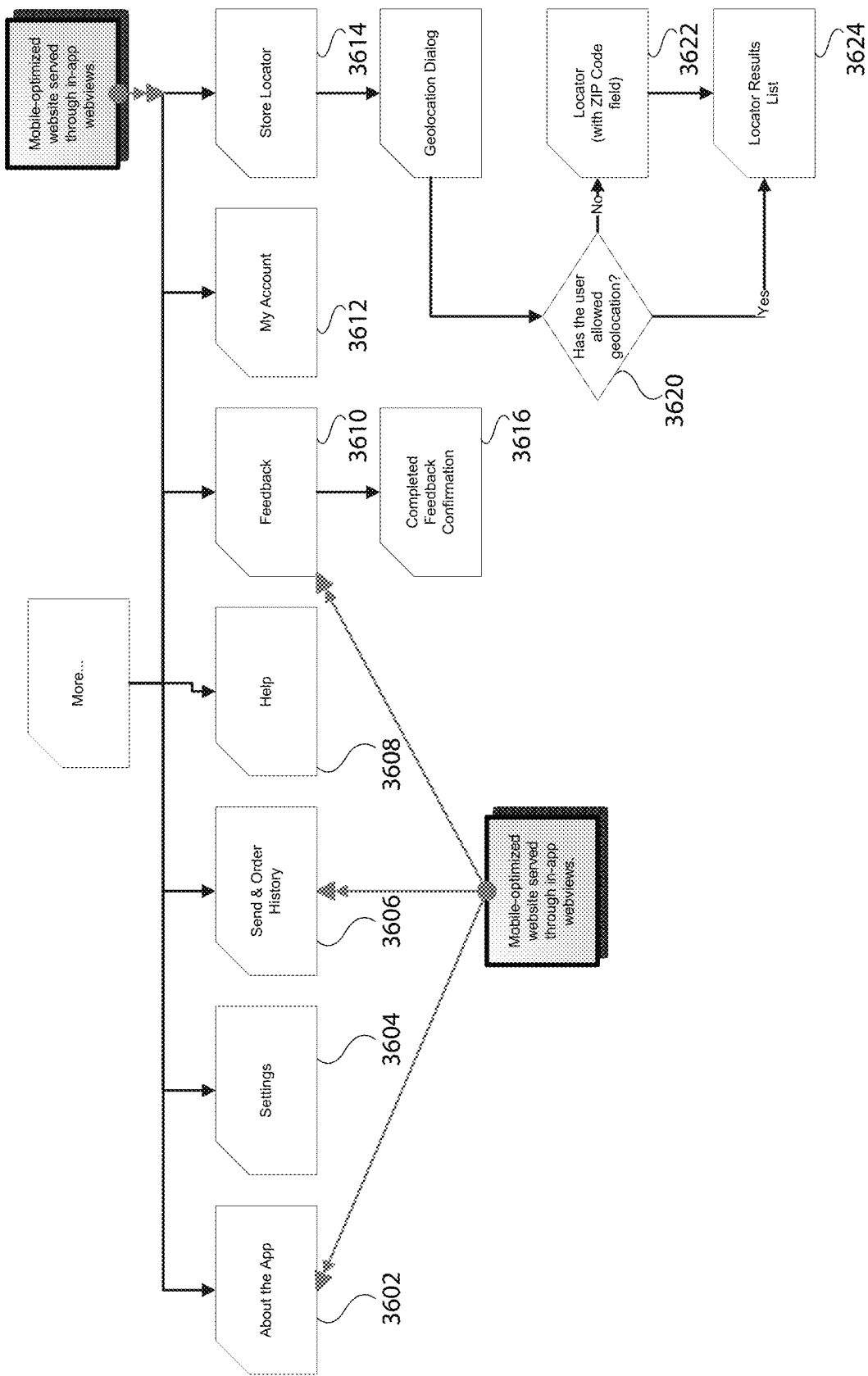

With reference to FIG. 36, the user has access to more navigation flows in the ecard app. At 3602, the user has the option to obtain more information about the ecard app. At 3604, the user has the option to change the application settings. At 3606, the user has the option to review sales and order history. At 3608, the user has the option to review 'help' information. At 3610, the user has the option to provide feedback, which is completed and confirmed in 3616. At 3612, the user has access to the user account. At 3614, the user has the option to locate a store. With reference to locating a store, at 3620, the geo location permissions are checked. If there is no permission for geo location at 3620, the user is prompted to enter a zip code to locate a store, at 3622. If permission for geo location is given at 3620, the user is provided with a list of results at 3624.

Figure 37:
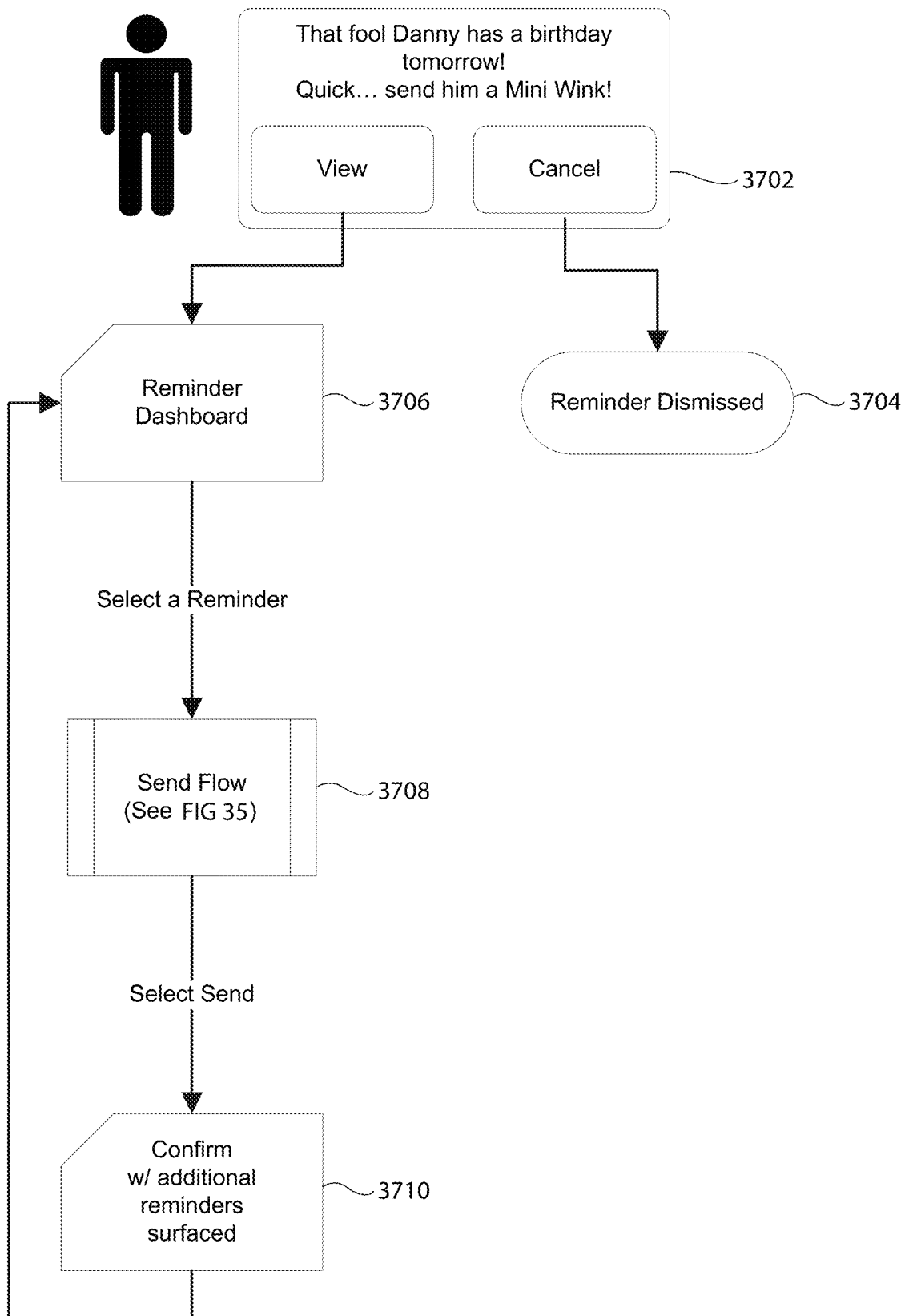
Figure 38:
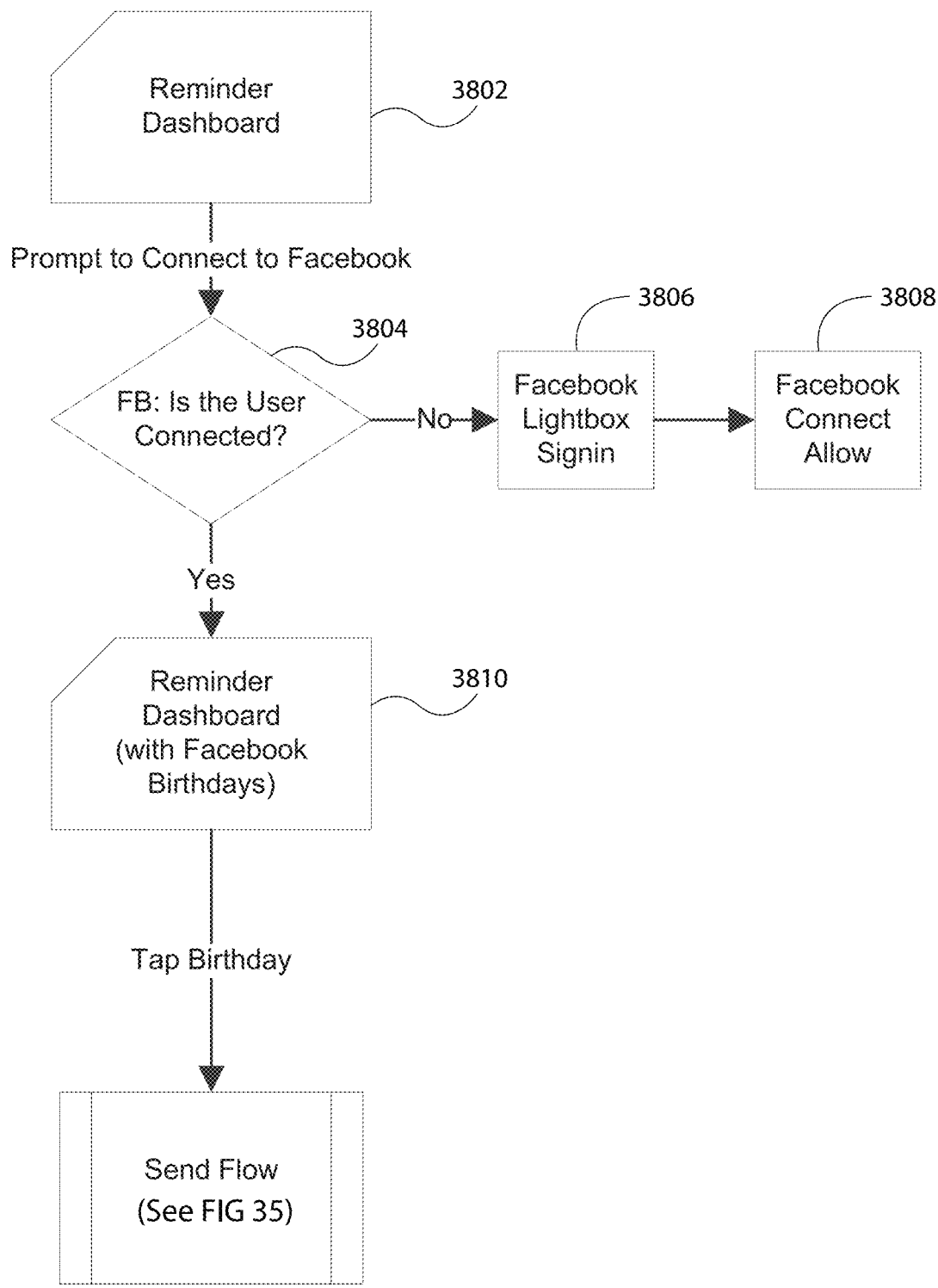
Figure 39:
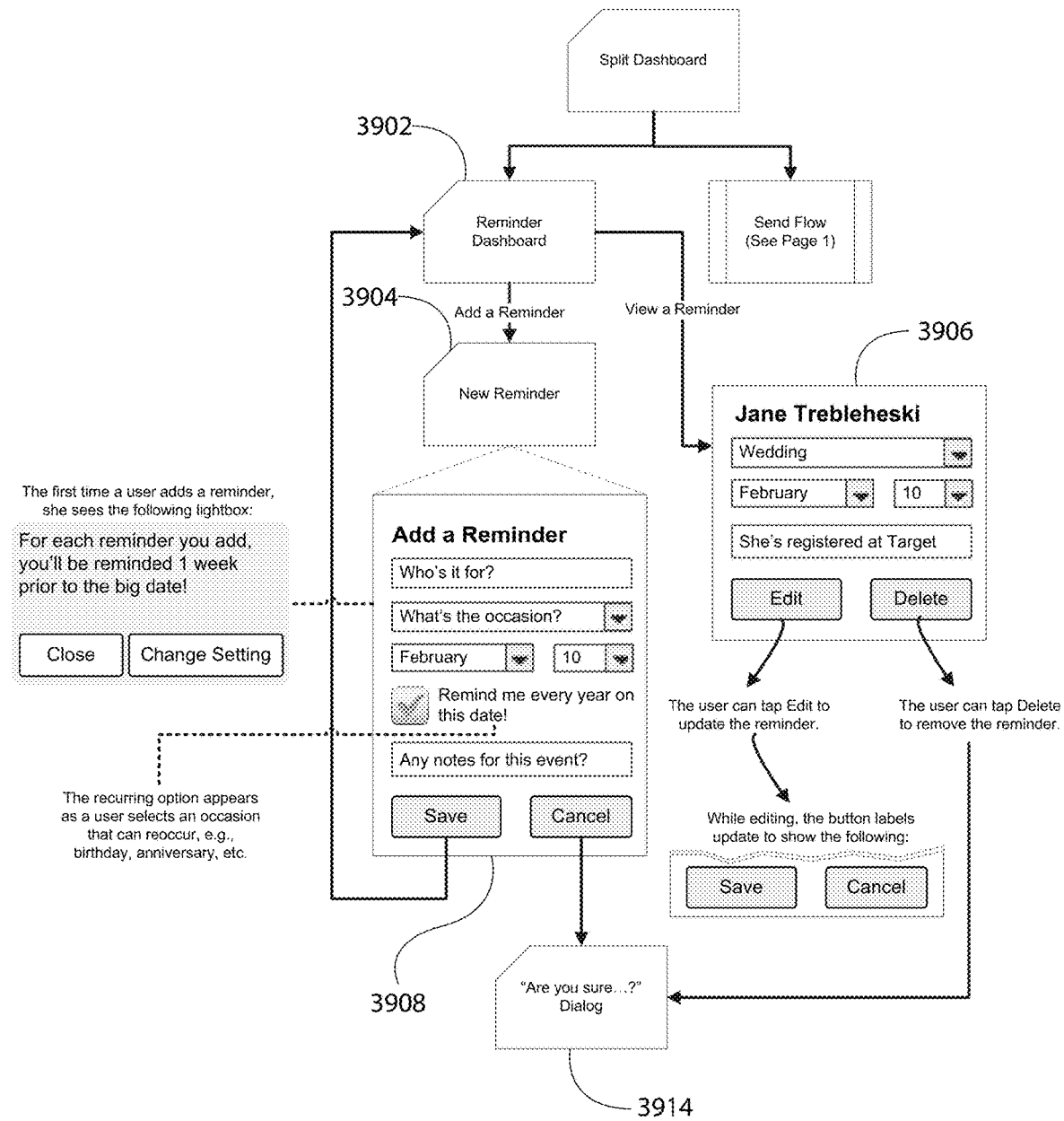
Figure 40:
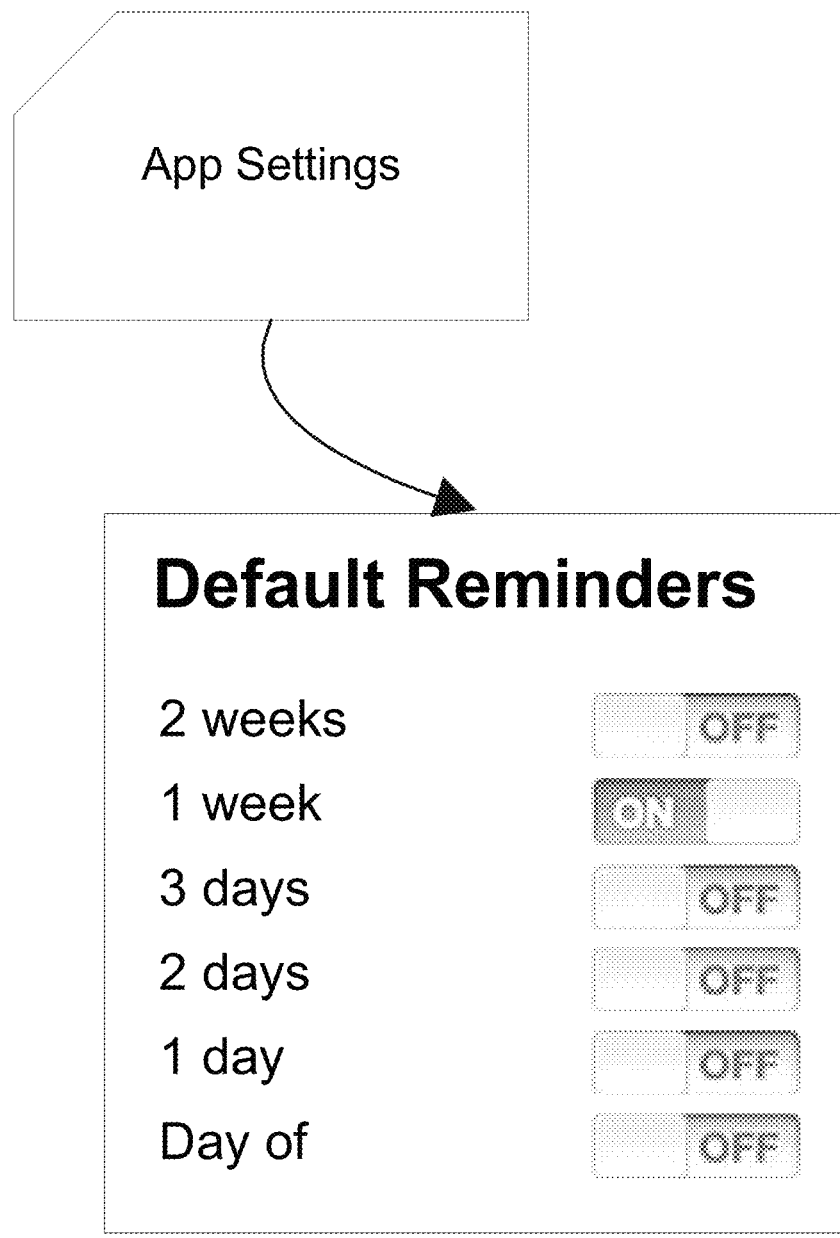

FIGS. 37 through 40 disclose the flows of reminders in the ecard app. With reference to FIG. 37, the user is reminded with a notification at 3702. The user may wish to cancel the notification at 3704. At 3706, the user chooses to enter the reminder dashboard. At 3708, the user chooses to select a reminder to send an electronic greeting card. At this point, the flow of the ecard app is identical to the flow described in FIG. 35. At 3710, the user is prompted to confirm the send medium, with an option to view additional reminders. In FIG. 38, the user logs in to the reminder dashboard at 3802. A check of the user's login status is checked at 3804. If not logged in, the user is prompted to connect to Facebook® at 3806 and 3808. At 3810, the user is logged in to the reminder dashboard with the user's Facebook® login information (Facebook® reminders). When the user chooses to tap a 'birthday' in Facebook®, the user is directed to the send flow as described in FIG. 35. In FIG. 39, the user is provided the option to either view or add a reminder. At 3902, the user is at the reminder dashboard. At 3904, the user makes a choice to add a reminder. At 3908, a prompt for a new reminder is provided to the user, wherein the user enters additional details for adding a new reminder. At 3914, the user is prompted to verify their selection to cancel the new reminder. At 3906, the user makes a choice to view a reminder and views information as it pertains to an existing reminder. FIG. 40 shows the various default reminder settings of the ecard app.

Figure 42:
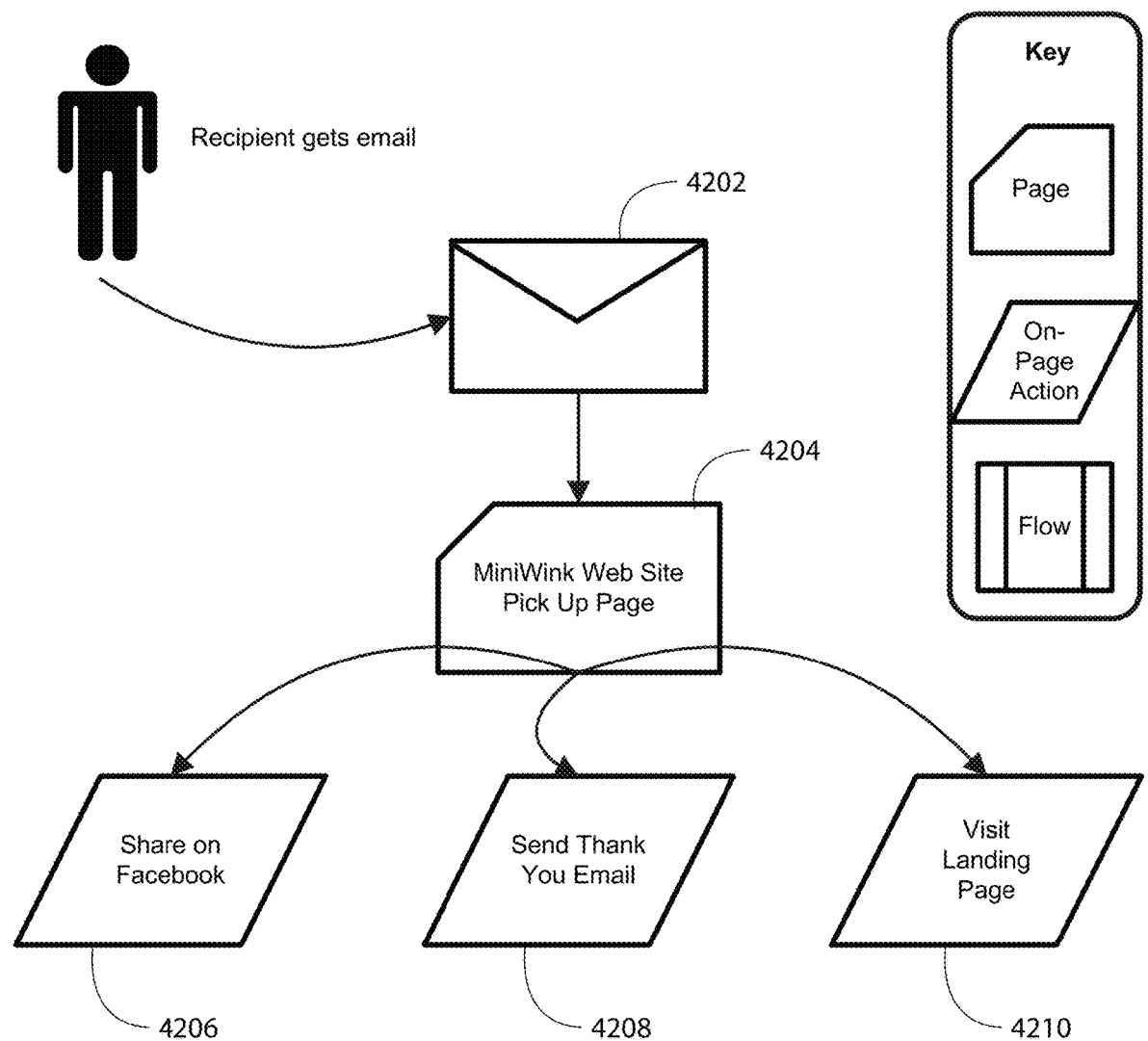
Figure 43:
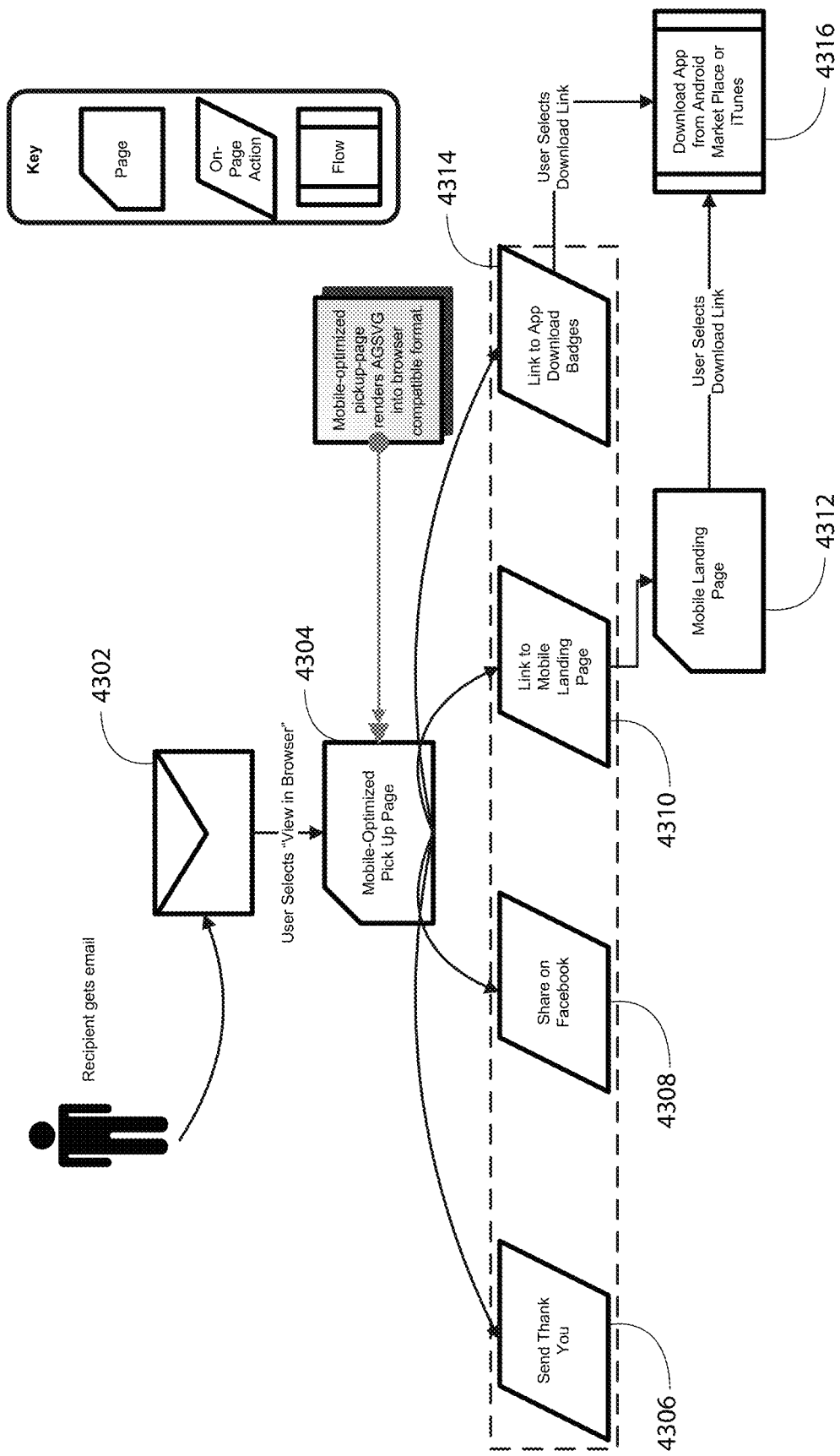

FIGS. 42 through 45 show the various pick up flows of the recipient. FIG. 42 shows the recipient receiving an electronic greeting card at 4202. The recipient picks up the electronic greeting card at 4204. At 4206, the recipient has an option to share their receipt on Facebook®. At 4208, the recipient has an option to thank the their receipt via email. At 4210, the recipient has an option to visit a landing page for the ecard app. In FIG. 43, the recipient receives an electronic greeting card at 4302. At 4304, the recipient views the electronic greeting card on a mobile optimized page. At 4306, the recipient has the opportunity to send a thank you note. At 4308, the recipient has the opportunity to share the card on Facebook®. At 4310, the recipient is linked to a mobile landing page, and at 4312, the recipient lands on the mobile landing page. At 4314, the recipient is linked to an area to download the ecard app or any other mobile application, and at 4316, the recipient downloads the ecard app or any other mobile application.

Figure 44:
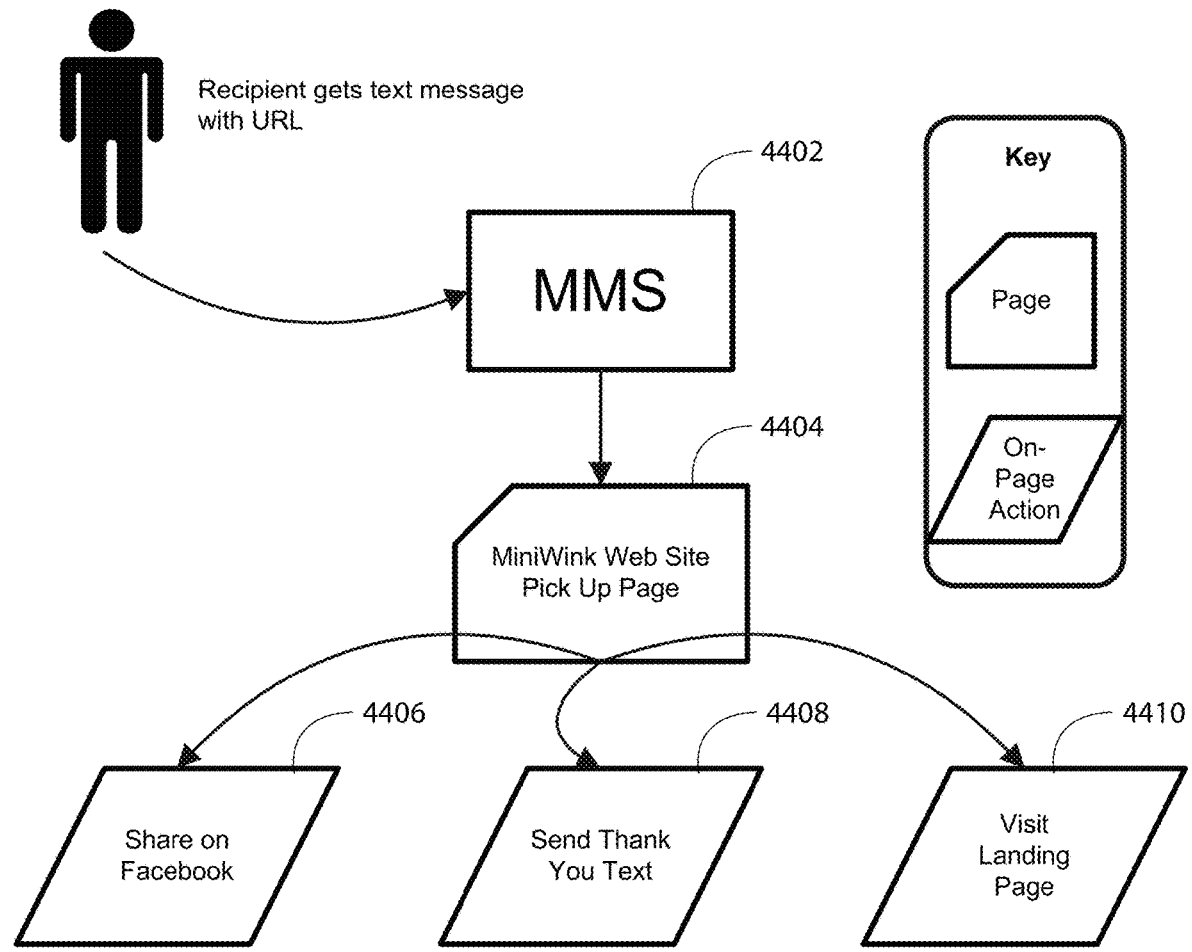

FIG. 44 shows the recipient receiving the electronic greeting card at 4402. At 4404, the recipient views the electronic greeting card on the ecard app's web site. At 4406, the recipient has the opportunity to share the card on Facebook®. At 4408, the recipient has the opportunity to send a thank you text. At 4410, the recipient visits a mobile landing page.

Figure 45:
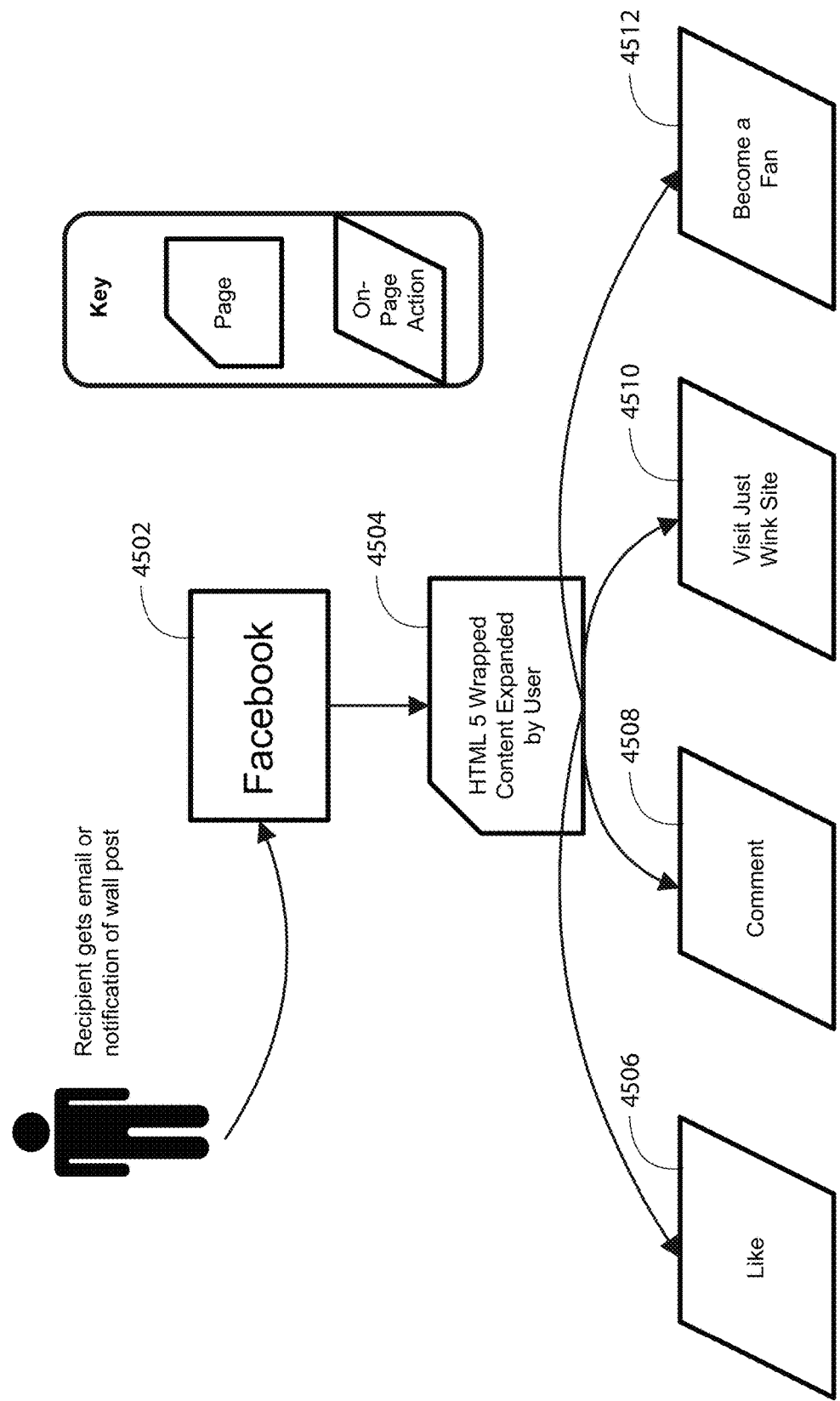

FIG. 45 shows the recipient receiving the electronic greeting card, either via email or via a Facebook® 'wall post', at 4502. The recipient's electronic greeting card pick up experience is based on the operating system and/or browser of the device being used to pick up and view the electronic greeting card. At 4504, for example, the recipient views the electronic greeting card on a HTML 5 wrapped content page for iOS® operating system enabled devices. For Android® operating system enabled devices, at 4504, the recipient views the electronic greeting card using JavaScript. Similarly, for a recipient viewing the electronic greeting card on a web browser, the pick up experience is Flash driven. At 4506, the recipient has the opportunity to 'like' the card on Facebook®. At 4508, the recipient has the opportunity to 'comment' on the card on Facebook®. At 4510, the recipient has the opportunity to visit the ecard app site. At 4512, the recipient has the opportunity to 'become a fan' of the ecard app on Facebook®.

The above description of specific embodiments has been given by way of example. From the disclosure given, those skilled in the art will not only understand the general inventive concepts and attendant advantages, but will also find apparent various changes and modifications to the structures and methods disclosed. For example, the general inventive concepts are not typically limited to any particular interface between a user and the user's mobile computing device. Thus, for example, use of alternative user input mechanisms, such as voice commands and keyboard entries, are within the spirit and scope of the general inventive concepts. As a further example, the general inventive concepts are not typically limited to downloading the electronic greeting card application by scanning a code on a paper greeting card. The electronic greeting card application can also be downloaded to the portable computing device directly from the server through an online, internet, consumer decision or transaction to download the app from an app store without purchasing or scanning a paper greeting card. As another example, although the embodiments disclosed herein have been primarily directed to a portable computing device, the general inventive concepts could be readily extended to a personal computer (PC) or other relatively fixed console computers, and may be pursued with reference to a website and/or other online or offline mechanisms. Further, other social networking sites other than those specifically described herein may be used as delivery media for ecards. It is sought, therefore, to cover all such changes and modifications as fall within the spirit and scope of the general inventive concepts, as described and claimed herein, and equivalents thereof.

The invention and embodiments are accomplished through software programs that reside as an app on the portable computing device and the web servers and computers of the merchandising and card system described herein. The interactive description below of this ecard creation system further describes the functions and logic flow of those exemplary software programs.

The invention claimed is:

1. An electronic greeting card system including an application downloadable to a portable computing device comprising:
   a server;
   a paper greeting card;
   a code printed on the paper greeting card;
   an electronic greeting card application program that is downloaded to the portable computing device from the server in response to the portable computing device scanning the code on the paper greeting card;
   a category of greeting cards provided by the electronic greeting card application;
   a greeting card within the category of greeting cards, wherein the greeting card comprises four pages, with at least one of the four pages having an option to customize, and each of the four pages being electronically movable by a recipient by a touch of a finger; and a means for selecting a medium to be used to send the greeting card from a group of sending media provided by the electronic greeting card application.

2. The system of claim 1 wherein the medium to be used to send the greeting card is email.

3. The system of claim 1 wherein the medium to be used to send the greeting card is social networking.

4. The system of claim 1 wherein the medium to be used to send the greeting card is text message.

5. The system of claim 1 wherein the medium to be used to send the greeting card is postal mail.

6. The system of claim 1 wherein the server is part of a network of servers in a cloud computing environment.

7. The system of claim 1 wherein the code is a bar code.

8. The system of claim 7 wherein the bar code is a two-dimensional bar code.

9. The system of claim 1 wherein the category of greeting cards has a sub category of greeting cards.

10. The system of claim 1 wherein the greeting card is rendered using scalable vector graphics.

11. An electronic greeting card application for a portable computing device, comprising:
   a category of greeting cards;
   at least one greeting card within the category of greeting cards, wherein the at least one greeting card comprises four pages, with at least one of the four pages having an option to customize, and each of the four pages being electronically movable by a recipient by a touch of a finger;
   a means for previewing the greeting card; and
   a means for selecting a medium to be used to send the greeting card.

12. The electronic greeting card application of claim 11 wherein the category of greeting cards has a sub category of greeting cards.

13. The electronic greeting card application of claim 11 wherein the greeting cards within the category of greeting cards can be viewed as a grid.

14. The electronic greeting card application of claim 11 wherein the greeting cards within the category of greeting cards can be viewed as a list.

15. The electronic greeting card application of claim 11 wherein at least one of the four pages of the greeting card is customized by adding an electronic signature.

16. The electronic greeting card application of claim 11 wherein at least one of the four pages of the greeting card is customized by adding a personalized message.

17. The electronic greeting card application of claim 11 wherein at least one of the four pages of the greeting card is customized by adding a digital photograph.

18. The electronic greeting card application of claim 11 wherein the medium to be used to send the greeting card includes sending the greeting card via email.

19. The electronic greeting card application of claim 11 wherein the medium to be used to send the greeting card includes sending the greeting card via social networking.

20. The electronic greeting card application of claim 11 wherein the medium to be used to send the greeting card includes sending the greeting card via text message.

21. The electronic greeting card application of claim 11 wherein the medium to be used to send the greeting card includes sending the greeting card via postal mail.

22. The electronic greeting card application of claim 11 further including an option to locate a store.

23. The option to locate a store of claim 22 further including the option to locate a store based on a zip code.

24. The option to locate a store of claim 22 further including the option to locate a store that sells paper version of the electronic greeting card.

25. The electronic greeting card application of claim 11 further including an option to set user reminders.

26. The option to set user reminders of claim 25 further including the option to connect to a social networking site to set user reminders.

27. The option to set user reminders of claim 25 further including the option to create user reminders from within the electronic greeting card application.

28. The option to set user reminders of claim 25 further including the option to receive a reminder notification on the day of the reminder, from outside the electronic greeting card application.

29. The option to set user reminders of claim 25 further including the option to receive a reminder notification seven days in advance of the reminder, from outside the electronic greeting card application.

30. The electronic greeting card application of claim 11 wherein the greeting cards are rendered using scalable vector graphics.

* * * * *